United States Patent
Tsukuba

(10) Patent No.: US 10,728,552 B2
(45) Date of Patent: Jul. 28, 2020

(54) IMAGE PROCESSING APPARATUS AND METHOD

(71) Applicant: SONY CORPORATION, Tokyo (JP)

(72) Inventor: Takeshi Tsukuba, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/325,312

(22) PCT Filed: Sep. 15, 2017

(86) PCT No.: PCT/JP2017/033527
§ 371 (c)(1),
(2) Date: Feb. 13, 2019

(87) PCT Pub. No.: WO2018/061837
PCT Pub. Date: Apr. 5, 2018

(65) Prior Publication Data
US 2019/0208203 A1    Jul. 4, 2019

(30) Foreign Application Priority Data

Sep. 30, 2016 (JP) ................................ 2016-193687

(51) Int. Cl.
*H04N 19/12* (2014.01)
*H04N 19/46* (2014.01)
(Continued)

(52) U.S. Cl.
CPC ........... *H04N 19/12* (2014.11); *H04N 19/147* (2014.11); *H04N 19/159* (2014.11);
(Continued)

(58) Field of Classification Search
CPC ...... H04N 19/70; H04N 19/12; H04N 19/147; H04N 19/159; H04N 19/176; H04N 19/46
See application file for complete search history.

(56) References Cited

U.S. PATENT DOCUMENTS

2014/0056362 A1* 2/2014 Mrak ................... H04N 19/176
375/240.18

FOREIGN PATENT DOCUMENTS

| GB | 2509670 A | 7/2014 |
|---|---|---|
| JP | 2014-523175 A | 9/2014 |

(Continued)

OTHER PUBLICATIONS

Aug. 13, 2019, European Search Report issued for related EP Application No. 17855793.0.

(Continued)

*Primary Examiner* — Obafemi O Sosanya
(74) *Attorney, Agent, or Firm* — Paratus Law Group, PLLC

(57) ABSTRACT

There is provided an image processing apparatus and method that make it possible to suppress reduction of the encoding efficiency. Encoded data is decoded, and based on a value of a transform skip identifier obtained by the decoding, execution of an inverse primary vertical transform and execution of an inverse primary horizontal transform are controlled. Further, based on a value of a transform skip identifier, execution of a primary horizontal transform and execution of a primary vertical transform are controlled, and the transform skip identifier is encoded. The present disclosure can be applied, for example, to an image processing apparatus, an image encoding apparatus, an image decoding apparatus or the like.

20 Claims, 49 Drawing Sheets

Three pre-defined transform candidate sets (LUT_TransformSetToTrasformType)

| | Transform SetIdx | Transform Candidates | |
|---|---|---|---|
| | | pt_{hor,ver}_flag==0 | pt_{hor,ver}_flag==1 |
| Transform Set | 0 | DST-VII | DCT-VIII |
| | 1 | DST-VII | DST-I |
| | 2 | DST-VII | DCT-V |
| | 3 | DCT-II | DST-VII |

(51) Int. Cl.
*H04N 19/147* (2014.01)
*H04N 19/176* (2014.01)
*H04N 19/159* (2014.01)
*H04N 19/70* (2014.01)

(52) U.S. Cl.
CPC .......... *H04N 19/176* (2014.11); *H04N 19/46* (2014.11); *H04N 19/70* (2014.11)

(56) References Cited

FOREIGN PATENT DOCUMENTS

| | | |
|---|---|---|
| JP | 2014-535247 A | 12/2014 |
| WO | WO 2015/053115 A1 | 4/2015 |

OTHER PUBLICATIONS

Chen et al., Algorithm Description of Joint Exploration Test Model 3, Joint Video Exploration Team (JVET) of ITU-T SG 16 WP 3 and ISO/IEC JTC/SC 29/WG 11, May 26-Jun. 1, 2016, pp. 1-34, $3^{rd}$ Meeting: Geneva, CH.

Lorcy et al., Proposed improvements to the Adaptive multiple Core transform, Joint Video Exploration Team (JVET) of ITU-T SG 16 WP 3 and ISO/IEC JTC 1/SC 29/WG 11, May 26-Jun. 1, 2016, pp. 1-4, $3^{rd}$ Meeting: Geneva, CH.

Mrak et al., Transform skip mode, Joint Collaborative Team on Video Coding (JCT-VC) of ITU-T SG16 WP3 and ISO/IEC JTC1/SC29/WG 11, Jul. 14-22, 2011, pp. 1-6, $6^{th}$ Meeting: Torino, IT.

* cited by examiner

F I G. 1

Three pre-defined transform candidate sets (LUT_TransformSetToTrasformType)

| Transform Set | | Transform Candidates | |
|---|---|---|---|
| | Transform SetIdx | pt_{hor,ver}_flag==0 | pt_{hor,ver}_flag==1 |
| | 0 | DST-VII | DCT-VIII |
| | 1 | DST-VII | DST-I |
| | 2 | DST-VII | DCT-V |
| | 3 | DCT-II | DST-VII |

FIG. 2

| Transform Type | Basis function $T_i(j)$, $i, j = 0, 1, \ldots, N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$, where $\omega_0 = \begin{cases} \sqrt{\dfrac{2}{N}} & i=0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$, where $\omega_0 = \begin{cases} \sqrt{\dfrac{2}{N}} & i=0 \\ 1 & i \neq 0 \end{cases}$, $\omega_1 = \begin{cases} \sqrt{\dfrac{2}{N}} & j=0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |
| DST-IV | $T_i(j) = \sqrt{\dfrac{2}{N}} \cdot \sin\left(\dfrac{\pi \cdot (i+1/2) \cdot (j+1/2)}{N}\right)$ |
| Identity Transform (IDT) | $T_i(j) = \begin{cases} 1 & i=j \\ 0 & i \neq j \end{cases}$ |

FIG. 3

Selected (H)orizontal and (V)ertical transform sets for each Intra prediction mode (LUT_IntraModeToTransformSet)

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| H(=0) | 2 | 1 | 0 | 1 | 0 | 1 | 0 | 1 | 0 | 0 | 0 | 0 | 0 | 1 | 0 | 1 | 0 | 1 |
| V(=1) | 2 | 1 | 0 | 1 | 0 | 1 | 0 | 1 | 2 | 2 | 2 | 2 | 2 | 1 | 0 | 1 | 0 | 1 |
| Intra Mode | 18 | 19 | 20 | 21 | 22 | 23 | 24 | 25 | 26 | 27 | 28 | 29 | 30 | 31 | 32 | 33 | 34 | 35 (=Inter or IBC) |
| H(=0) | 0 | 1 | 0 | 1 | 0 | 1 | 2 | 2 | 2 | 2 | 2 | 1 | 0 | 1 | 0 | 1 | 0 | 0 |
| V(=1) | 0 | 1 | 0 | 1 | 0 | 1 | 0 | 0 | 0 | 0 | 0 | 1 | 0 | 1 | 0 | 1 | 0 | 0 |

F I G . 4

| Transform Set | log2TBSize -2 | 0 (=4x4) Transform Type | | 1 (=8x8) Transform Type | | 2 (=16x16) Transform Type | | 3 (=32x32) Transform Type | |
|---|---|---|---|---|---|---|---|---|---|
| | | II | V | II | V | II | V | II | V |
| | 0 | DST-VII | DST-VII | DCT-V | DST-VII | DST-VII | DST-VII | DCT-V | DST-VII |
| | 1 | DST-I | DCT-V | DST-VII | DCT-V | DCT-V | DCT-V | DST-VII | DST-VII |
| | 2 | IDT | DST-VII | DST-IV | DST-VII | DST-VII | DST-VII | DST-VII | DCT-V |
| | 3 | DST-IV | DST-IV | DCT-VIII | DST-VII | DST-I | DST-VII | DCT-V | DCT-V |

F I G. 5

| TRANSFORM SKIP IDENTIFIER ts-idx | semantics |
|---|---|
| 0 (=NO_TS) | IN TARGET TRANSFORM BLOCK, TWO-DIMENSIONAL ORTHOGONAL TRANSFORM IS APPLIED (2D TRANSFORM SKIP OR 1D TRANSFORM SKIP IS NOT APPLIED) |
| 1 (=2D_TS) | IN TARGET TRANSFORM BLOCK, TWO-DIMENSIONAL ORTHOGONAL TRANSFORM (ONE-DIMENSIONAL ORTHOGONAL TRANSFORM IN HORIZONTAL DIRECTION, AND ONE-DIMENSIONAL ORTHOGONAL TRANSFORM IN VERTICAL DIRECTION) IS SKIPPED (2D TRANSFORM SKIP) |
| 2 (=1D_H_TS) | IN TARGET TRANSFORM BLOCK, ONE-DIMENSIONAL ORTHOGONAL TRANSFORM IN HORIZONTAL DIRECTION IS SKIPPED |
| 3 (=1D_V_TS) | IN TARGET TRANSFORM BLOCK, ONE-DIMENSIONAL ORTHOGONAL TRANSFORM IN VERTICAL DIRECTION IS SKIPPED |

FIG.17

| | Descriptor |
|---|---|
| residual_coding(x0, y0, log2TBWSize, log2TBHSize, cIdx) { | |
|   if(ts_enabled_flag && !transquant_bypass_flag && | |  ⎫ SYN11
|   (log2TBSize <= log2MaxTSSize)) | |
|     ts_idx[x0][y0][cIdx] | ae(v) | ⎫ SYN12
|   ...syntaxes related to last_pos_[x, y], | |
|   coeff_sbk_flag/sig_flag/gr1_flag/gr2_flag/coeff_abs_level_remaining/coeff_sign_flag... | |
|   if(apt_flag[x0][y0]&& !transquant_bypass_flag && ts_idx[x0][y0][cIdx]!=2D_TS | | ⎫ SYN13
|   && isLuma && numSig >= ptNumSigTH) | |
|     pt_idx | ae(v) | ⎫ SYN14
|   ... | |
| } | |

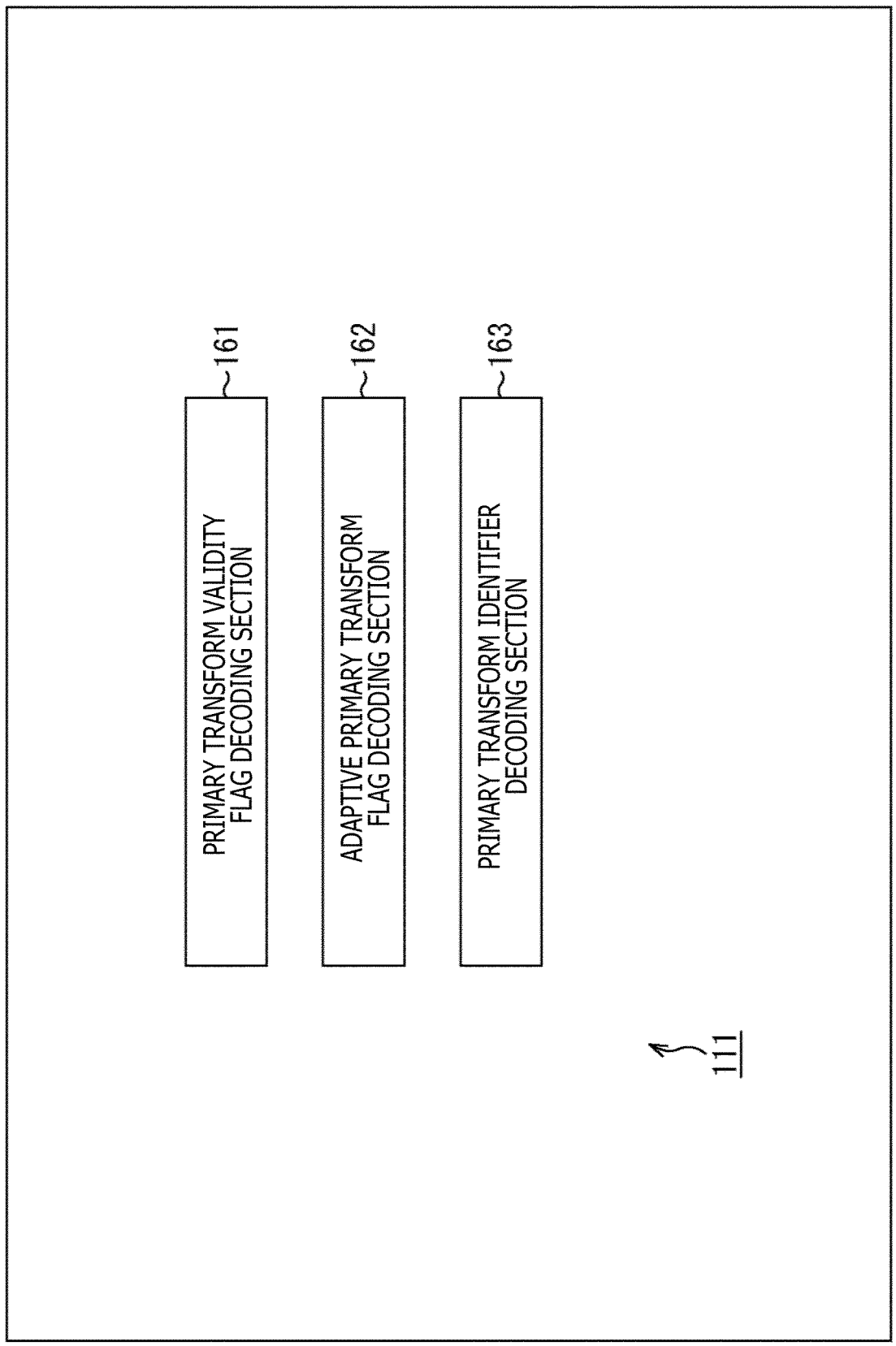

FIG. 23

| | Descriptor |
|---|---|
| transform_tree(x0, y0, xBase, yBase, log2TBWSize, log2TBHSize) { | |
| ...syntaxes related to transform_unit(including residual_coding) | |
| if(st_enabled_flag && (!transquant_bypass_flag \|\| ts_idx==NO_TS) | | ⎫ SYN19
| && numSig>=stNumSigTH) | |
| st_idx[x0][y0] | ae(v) | ⎫ SYN20
| } | |

FIG. 25

| | Descriptor |
|---|---|
| residual_coding(x0,y0,log2TBWSize,log2TBHSize,cIdx) { | |
| ...syntaxes related to last_pos_[x,y], | |
| coeff_sbk_flag/sig_flag/gr1_flag/gr2_flag/coeff_abs_level_remaining/coeff_sign_flag... | |
| if((ts_idx[x0][y0][cIdx]==NO_TS ‖ ts_idx[x0][y0][cIdx]==1D_V_TS) && !transquant_bypass_flag && isLuma && apt_flag[x0][y0] && numSig>=ptNumSigTH) | |
|     pt_hor_flag | ae(v) |
| if((ts_idx[x0][y0][cIdx]==NO_TS ‖ ts_idx[x0][y0][cIdx]==1D_H_TS) && !transquant_bypass_flag && isLuma && apt_flag[x0][y0] && numSig>=ptNumSigTH) | |
|     pt_ver_flag | ae(v) |
| ... | |
| } | |

SYN15, SYN16, SYN17, SYN18

IMAGE PROCESSING APPARATUS AND METHOD

CROSS REFERENCE TO PRIOR APPLICATION

This application is a National Stage Patent Application of PCT International Patent Application No. PCT/JP2017/033527 (filed on Sep. 15, 2017) under 35 U.S.C. § 371, which claims priority to Japanese Patent Application No. 2016-193687 (filed on Sep. 30, 2016), which are all hereby incorporated by reference in their entirety.

TECHNICAL FIELD

The present disclosure relates to an image processing apparatus and method, and particularly to an image processing apparatus and method that make it possible to suppress reduction of the encoding efficiency.

BACKGROUND ART

In the past, adaptive primary transforms (AMT: Adaptive Multiple Core Transforms) have been disclosed in which, for each of a primary transform PTor in a horizontal direction (also called primary horizontal transform) and a primary transform PTver in a vertical direction (also called primary vertical transform), a primary transform is adaptively selected from a plurality of different orthogonal transforms (for example, refer to NPL 1).

It is to be noted that also it is disclosed in NPL 1 that, for each of a horizontal direction (x direction) and a vertical direction (y direction), a transform set TransformSet including orthogonal transforms that become candidates for a primary transform is (uniquely) determined (selected) on the basis of a correspondence table (intra prediction mode information) between mode information and transform sets. Also it is disclosed that a definition of a transform set is determined on the basis of a transform block size and mode information (for example, refer to NPL 2).

CITATION LIST

Non Patent Literature

[NPL 1]
JVET-C1001, Algorithm description of Joint Exploration Test Model 3, published 2016 Jul. 2, url: http://phenix.int-evry.fr/jvet/doc_end_user/documents/3_Geneva/wg11/JVET-C1001-v3.zip

[NPL 2]
JVET-C0022, Proposed improvements to the Adaptive multiple core transform, published 2016 May 16, url: http://phenix.int-evry.fr/jvet/doc_end_user/documents/3 Geneva/wg11/JVET-C0022-v4.zip

SUMMARY

Technical Problem

However, the existing method has a limitation that one-dimensional transform skip can be selected only in the case of a specific transform block size and intra prediction mode number. Accordingly, in the case where it is better in the point of view of rate distortion to select one-dimensional transform skip of skipping an orthogonal transform in a horizontal or vertical direction than to perform two-dimensional orthogonal transform, since the encoder side cannot select the one-dimensional transform skip, there is the possibility that the encoding efficiency may reduce.

The present disclosure has been made in view of such a situation as described above and makes it possible to suppress the reduction of the encoding efficiency.

Solution to Problem

An image processing apparatus of a first aspect of the present technology is an image processing apparatus including a decoding section configured to decode encoded data, an inverse primary vertical transform controlling section configured to control, based on a value of a transform skip identifier obtained by the decoding of the encoded data by the decoding section, execution of an inverse primary vertical transform that is an inverse primary transform in a vertical direction for transform coefficient data transformed from image data, and an inverse primary horizontal transform controlling section configured to control, based on the value of the transform skip identifier, execution of an inverse primary horizontal transform that is an inverse primary transform in a horizontal direction for the coefficient data transformed from the image data.

The inverse primary vertical transform controlling section can control the execution of the inverse primary vertical transform such that, where the transform skip identifier indicates that a one-dimensional transform in the vertical direction is not to be skipped, the inverse primary vertical transform for the transform coefficient data is executed, but where the transform skip identifier indicates that a one-dimensional transform in the vertical direction is to be skipped, the inverse primary vertical transform for the transform coefficient data is omitted.

The inverse primary horizontal transform controlling section can control the execution of the inverse primary horizontal transform such that, where the transform skip identifier indicates that a one-dimensional transform in the horizontal direction is not to be skipped, the inverse primary horizontal transform for the transform coefficient data is executed, but where the transform skip identifier indicates that a one-dimensional transform in the horizontal direction is to be skipped, the inverse primary horizontal transform for the transform coefficient data is omitted.

The image processing apparatus can further include a selection section configured to select an orthogonal transform that is to be applied to the inverse primary vertical transform and the inverse primary horizontal transform.

The selection section can select an orthogonal transform to be applied as the inverse primary vertical transform based on a vertical transform set identifier and a primary vertical transform designation flag obtained by the decoding of the encoded data by the decoding section; and select an orthogonal transform to be applied as the inverse primary horizontal transform based on a horizontal transform set identifier and a primary horizontal transform designation flag obtained by the decoding of the encoded data by the decoding section.

The decoding section can derive the primary vertical transform designation flag and the primary horizontal transform designation flag from a primary transform identifier in response to the value of the transform skip identifier.

The decoding section can derive, where the transform skip identifier indicates that a two-dimensional transform is not to be skipped, the primary vertical transform designation flag and the primary horizontal transform designation flag by processing the primary transform identifier as a 2-bit bin string, and can derive, where the transform skip identifier indicates that a one-dimensional transform in the vertical direction or the horizontal direction is not to be skipped, the primary vertical transform designation flag and the primary horizontal transform designation flag by processing the primary transform identifier as a 1-bit bin string.

The decoding section can decode the primary vertical transform designation flag and the primary horizontal transform designation flag included in the encoded data.

Where the transform skip identifier indicates that a one-dimensional transform in the vertical direction or the horizontal direction or a two-dimensional transform is not to be skipped, the decoding section can omit decoding of a secondary transform identifier and set the secondary transform identifier to a value that indicates that a secondary transform is not to be performed.

An image processing method of the first aspect of the present technology is an image processing method including decoding encoded data, controlling, based on a value of a transform skip identifier obtained by the decoding of the encoded data, execution of an inverse primary vertical transform that is an inverse primary transform in a vertical direction for transform coefficient data transformed from image data, and controlling, based on the value of the transform skip identifier, execution of an inverse primary horizontal transform that is an inverse primary transform in a horizontal direction for the coefficient data transformed from the image data.

An image processing apparatus of a second aspect of the present technology is an image processing apparatus including a primary horizontal transform controlling section configured to control execution of a primary horizontal transform that is a primary transform in a horizontal direction for residual data between an image and a prediction image based on a value of a transform skip identifier, a primary vertical transform controlling section configured to control, based on a value of the transform skip identifier, execution of a primary vertical transform that is a primary transform in a vertical direction for the residual data between the image and the prediction image, and an encoding section configured to encode the transform skip identifier.

The primary horizontal transform controlling section can control the execution of the primary horizontal transform such that, where the transform skip identifier indicates that a one-dimensional transform in the horizontal direction is not to be skipped, the primary horizontal transform for the residual data is executed, but where the transform skip identifier indicates that a one-dimensional transform in the horizontal direction is to be skipped, the primary horizontal transform for the residual data is omitted.

The primary vertical transform controlling section can control the execution of the primary horizontal transform such that, where the transform skip identifier indicates that a one-dimensional transform in the vertical direction is not to be skipped, the primary vertical transform for the residual data is executed, but where the transform skip identifier indicates that a one-dimensional transform in the vertical direction is to be skipped, the primary vertical transform for the residual data is omitted.

The image processing apparatus can further include a selection section configured to select an orthogonal transform that is to be applied to the primary horizontal transform and the inverse primary vertical transform.

The selection section can select an orthogonal transform to be applied as the primary horizontal transform based on a horizontal transform set identifier and a primary horizontal transform designation flag, and can select an orthogonal transform to be applied as the primary vertical transform based on a vertical transform set identifier and a primary vertical transform designation flag.

The encoding section can derive a primary transform identifier from the primary horizontal transform designation flag and the primary vertical transform designation flag in response to the value of the transform skip identifier.

The encoding section can derive, where the transform skip identifier indicates that two-dimensional transform is not to be skipped, the primary transform identifier of a 2-bit bin string using the primary horizontal transform designation flag and the primary vertical transform designation flag, and can derive, where the transform skip identifier indicates that a one-dimensional transform in the vertical direction or the horizontal direction is not to be skipped, the primary transform identifier of a 1-bit bin string using the primary horizontal transform designation flag or the primary vertical transform designation flag.

The encoding section can encode the primary horizontal transform designation flag and the primary vertical transform designation flag.

Where the transform skip identifier indicates that a one-dimensional transform in the vertical direction or the horizontal direction or a two-dimensional transform is not to be skipped, the encoding section can omit encoding of a secondary transform identifier.

An image processing method of the second aspect of the present technology is an image processing method including controlling execution of a primary horizontal transform that is a primary transform in a horizontal direction for residual data between an image and a prediction image based on a value of a transform skip identifier, controlling, based on a value of the transform skip identifier, execution of a primary vertical transform that is a primary transform in a vertical direction for the residual data between the image and the prediction image, and encoding the transform skip identifier.

In the image processing apparatus and method of the first aspect of the present technology, encoded data is decoded, and based on a value of a transform skip identifier obtained by the decoding of the encoded data, execution of an inverse primary vertical transform that is an inverse primary transform in the vertical direction for transform coefficient data transformed from image data is controlled. Further, based on the value of the transform skip identifier, execution of an inverse primary horizontal transform that is an inverse primary transform in the horizontal direction for the coefficient data transformed from the image data is controlled.

In the image processing apparatus and method of the second aspect of the present technology, execution of a primary horizontal transform that is a primary transform in a horizontal direction for residual data between an image and a prediction image is controlled based on a value of a transform skip identifier, and based on a value of the transform skip identifier, execution of a primary vertical transform that is a primary transform in a vertical direction for the residual data between the image and the prediction image is executed. Then, the transform skip identifier is encoded.

Advantageous Effect of Invention

According to the present disclosure, an image can be processed. Especially, reduction of the encoding efficiency can be suppressed.

BRIEF DESCRIPTION OF DRAWINGS

FIG. 1 is a view depicting a correspondence relationship between transform sets and orthogonal transforms to be selected.

FIG. 2 is a view depicting a correspondence relationship between types of orthogonal transform and functions to be used.

FIG. 3 is a view depicting a correspondence relationship between transform sets and prediction modes.

FIG. 4 is a view depicting a correspondence relationship between transform sets and block sizes.

FIG. 5 is a view depicting semantics of transform skip identifiers.

FIG. 17 is a view depicting an example of syntax.

FIG. 18 is a block diagram depicting a principal configuration example of a decoding section.

FIG. 23 is a view depicting an example of syntax.

FIG. 25 is a view depicting an example of syntax.

DESCRIPTION OF EMBODIMENTS

Figure 6:
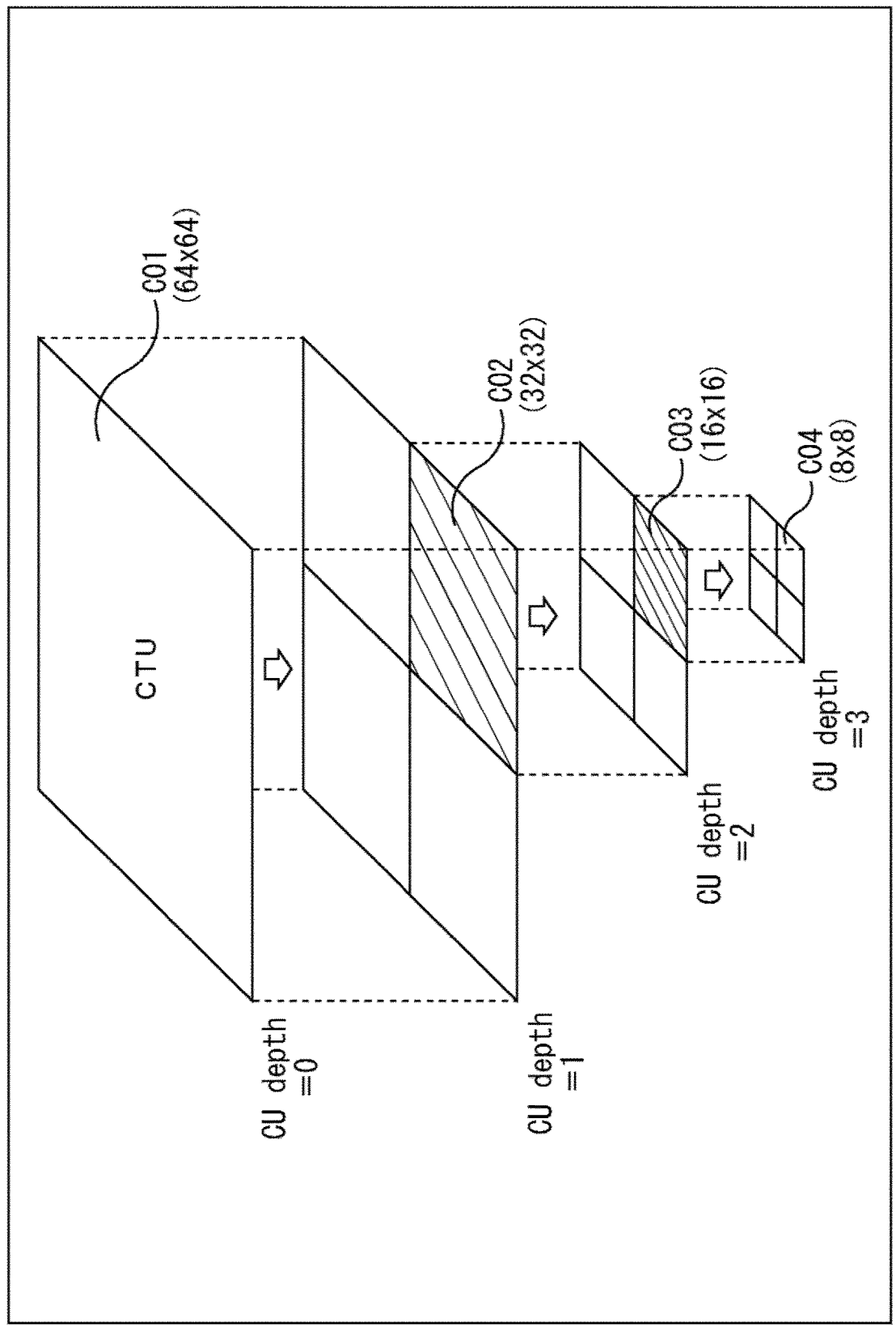
FIG. 6 is an explanatory view illustrating an overview of recursive block segmentation of a CU.

In the following, modes for carrying out the present disclosure (hereinafter referred to as embodiments) are described. It is to be noted that the description is given in the following order.

1. First Embodiment (image decoding apparatus)
2. Second Embodiment (decoding of identifier)
3. Third Embodiment (encoding of primary transform designation flag)
4. Fourth Embodiment (scaling)
5. Fifth Embodiment (image encoding apparatus)
6. Sixth Embodiment (decoding of identifier)
7. Seventh Embodiment (encoding of primary transform designation flag)
8. Eighth Embodiment (scaling)
9. Ninth Embodiment (others)

First Embodiment

<Primary Transform>

In the test model (JEM3 (Joint Exploration Test Model 3)) disclosed in NPL 1, for the object of enhancement of the encoding efficiency of a high resolution image of 4K or the like, the maximum size of the CTU size is expanded from 128×128 to 256×256. Further, as a structure for block segmentation, a binary tree in horizontal/vertical directions is introduced in addition to existing quad-tree segmentation, and together with this, also a non-rectangular transform block is introduced in addition to a rectangular transform block.

Further, in JEM3, adaptive primary transforms (AMT (Adaptive Multiple Core Transforms)) are disclosed in which, for each TU unit, a primary transform is adaptively selected from among a plurality of different orthogonal transforms for each of a primary transform PThor in a horizontal direction (also referred to as primary horizontal transform) and a primary transform PTver in a vertical direction (also referred to as primary vertical transform).

More particularly, in the case where an adaptive primary transform flag apt_flag (also called amt_flag, cu_pt_flag or emt_flag) indicative of whether or not an adaptive primary transform is to be carried out, for example, in a TU unit is 0 (false), as a primary transform, DCT-II or DST-VII is determined (uniquely) by mode information.

In contrast, for example, in the case where the adaptive primary transform flag apt_flag is 1 (true), a transform set TransformSet including orthogonal transforms that become candidates for primary transforms in regard to a horizontal direction (x direction) and a vertical direction (y direction) is selected from among three candidates (Transform SetIdx=0 to 2) as depicted in FIG. 1. DSI (Discrete Sine Transform)-VII, DCT (Discrete Cosine Transform)-VIII and so forth depicted in FIG. 1 indicate types of orthogonal transforms, and such functions as in a table depicted in FIG. 2 are used for them.

Selection (determination) of a transform set TransformSet is performed on the basis of an intra prediction mode (Intra Mode) as in a table depicted in FIG. 3. For example, the selection (determination) of a transform set TransformSet is carried out such that a transform set identifier TransformSetIdx that designates a transform set TransformSet corresponding to each transform set TransformSet{H, V} is set to the transform set TransformSet{H, V} as indicated by the following expression (1) and (2).

$$\text{TransformSet}H=\text{LUT\_IntraModeToTransformSet}[\text{Intramode}][H(=0)] \quad (1)$$

$$\text{TransformSet}V=\text{LUT\_IntraModeToTransformSet}[\text{Intramode}][V(=1)] \quad (2)$$

Here, TransformSetH indicates a transform set of a primary horizontal transform PThor while TransformSetV indicates a transform set of a primary vertical transform PTver, and a lookup table LUT_IntraModeToTransformSet indicates the correspondence table of FIG. 3. The first array of the lookup table LUT_IntraModeToTransformSet[ ][ ] takes the intra prediction mode IntraMode as an argument, and the second array takes {H=0, V=1} as an argument.

For example, in the case of the intra prediction mode number 9 (IntraMode==9), as the transform set TransformSetH of a primary horizontal transform PThor (also referred to as primary horizontal transform set), the transform set of the transform set identifier TransformSetIdx=0 depicted in the table of FIG. 1 is selected, and as the transform set TransformSetV of a primary vertical transform PTver (also referred to as primary vertical transform set), the transform set of the transform set identifier TransformSetIdx=2 depicted in the table of FIG. 1 is selected.

Further, which one of the orthogonal transforms in the selected transform set TransformSet is to be applied to the primary horizontal transform is selected by a primary horizontal transform designation flag pt_hor_flag. Further, which one of the orthogonal transforms in the selected transform set TransformSet is to be applied to the primary vertical transform is selected by a primary vertical transform designation flag pt_hor_flag. For example, the primary horizontal transform PThor and the primary vertical transform PTver are derived from a definition table (LUT_TransformSetToTransformType) of transform sets depicted in FIG. 1 taking the primary {horizontal, vertical} transform sets TransformSet{H, V} and the primary {horizontal, vertical} transform designation flags pt_{hor, ver}_flag as arguments as indicated by the following expressions (3) and (4), respectively.

$$\text{PThor}=\text{LUT\_TransformSetTransformType}[\text{TransformSet}H][\text{pt\_hor\_flag}] \quad (3)$$

$$\text{PTver}=\text{LUT\_TransformSetToTransformType}[\text{TrasnformSet}V][\text{pt\_ver\_flag}] \quad (4)$$

For example, in the case of the intra prediction mode number 9 (IntraMode==9), since the value of the transform set identifier of the primary horizontal transform set TransformSetH is 0, a primary horizontal transform is selected (designated) from within a transform set having the transform set identifier TransformSetIdx==0 on the transform set definition table LUT_TransformSetToTransformType of FIG. 1. In particular, in the case where the primary horizontal transform designation flag pt_hor_flag is 0, DT-VII is selected as the primary horizontal transform PThor, but in the case where the primary horizontal transform designation flag pt_hor_flag is 1, DCT-VIII is selected as the primary horizontal transform PThor.

Further, the primary transform identifier pt_idx is derived in accordance with the following expression (5) from the primary horizontal designation flag pt_hor_flag and the primary vertical transform designation flag pt_ver_flag.

$$\text{pt\_idx}=(\text{pt\_ver\_flag}<<1)+\text{pt\_hor\_flag} \quad (5)$$

In particular, the upper 1 bit of the primary transform identifier pt_idx corresponds to a value of the primary vertical transform designation flag, and the lower 1 bit corresponds to a value of the primary horizontal transform designation flag. For a bin string of the derived primary transform identifier pt_idx, encoding is carried out by applying arithmetic encoding to generate a bit string.

In NPL 2, as orthogonal transforms configuring primary transform set, it is disclosed that, in addition to the candidates for orthogonal transforms {DST-VII, DST-I, DCT-VIII} of NPL 1, Identity Transform (also called IDT or one-dimensional transform skip (1D Transform Skip)) of skipping DST-IV and a one-dimensional orthogonal transform and performing only scaling. Further, in NPL 2, a new transform set (transform set identifier TransformSetIdx==3) is added in FIG. 1.

Further, in the case of NPL 2, a definition of a transform set is determined on the basis of a transform block size and mode information. An example of the definitions of transform sets in 4×4/8×8/16×16/32×32 transforms in the case where the intra prediction mode number is 9 is depicted in a table of FIG. 4. For example, in the table depicted in FIG. 4, in the case of the transform block size 4×4, in the transform set of the transform set identifier TrasnformSetIdx=2, IDT is selected as the primary horizontal transform PThor, and DST-VII is selected as the primary vertical transform PTver. In particular, as represented by the expressions (6) and (7) given below, from the lookup table LUT_TransformSet, orthogonal transforms of the primary horizontal transform PThor and the primary vertical transform PTver are selected taking the intra prediction mode IntraMode as an argument for the first array, taking a value of a logarithm−2 of a transform block size as an argument for the second array, taking the transform set identifier TransformSetIdx as an argument for the third array and taking the horizontal direction H (=0) or the vertical direction V (=1) as an argument for the fourth array.

$$PThor = \text{LUT\_TransfomSet}[IntraMode(=9)][log2TBSize-2(=0)] \\ [TransformSetIdx(=2)][H(=0)] = IDT \quad (6)$$

-continued $$PTver = \text{LUT\_TransfomSet}[IntraMode(=9)][\log_2 TBSize - 2(=0)] \\ [TransformSetIdx(=2)][V(=1)] = DST\text{-}VII \quad (7)$$

It is to be noted that, in NPL 2, the primary transform identifier pt_idx corresponds to the transform set identifier TransfromSetIdx as indicated by the following expression (8).

$$\text{pt\_idx} = \text{TransformSetIdx} \quad (8)$$

In NPL 2, there is a limit that the one-dimensional transform skip can be selected only in the case of a specific transform block size and a specific intra prediction mode number. Accordingly, in the case where it is better from a point of view of rate distortion to select one-dimensional transform skip of skipping an orthogonal transform in the horizontal or vertical direction rather than a two-dimensional orthogonal transform, since one-dimensional transform skip cannot be selected on the encoder side, there is the possibility that the encoding efficiency may be reduced.

Therefore, on the encoding side, execution of a primary horizontal transform that is a primary transform in the horizontal direction for residual data between an image and a prediction image is controlled on the basis of a value of a transform skip identifier and execution of a primary vertical transform that is a primary transform in the vertical direction for the residual data between the image and the prediction image is controlled on the basis of the value of the transform skip identifier, and the transform skip identifier is encoded. Meanwhile, on the decoding side, encoded data is decoded, and execution of an inverse primary vertical transform that is an inverse primary transform in the vertical direction for transform coefficient data transformed from image data is controlled on the basis of a value of a transform skip identifier obtained by the decoding of the encoded data and execution of an inverse primary horizontal transform that is an inverse primary transform in the horizontal direction for the coefficient data converted from the image data is controlled on the basis of the value of the transform skip identifier.

By such control as just described, in the case where it is desirable to skip a one-dimensional transform in the horizontal direction or the vertical direction, it is possible to suppress reduction of the processing amount of the (inverse) primary transform and reduction of the energy compaction to enhance the encoding efficiency.

<Block Segmentation>

In an old-fashioned image encoding method such as MPEG2 (Moving Picture Experts Group 2 (ISO/IEC 13818-2)) or MPEG-4 Part 10 (Advanced Video Coding, hereinafter referred to as AVC), an encoding process is executed in a processing unit called macro block. The macro block is a block having a uniform size of 16×16 pixels. In contrast, in HEVC (High Efficiency Video Coding), an encoding process is executed in a processing unit (encoding unit) called CU (Coding Unit). A CU is a block having a variable size, which is formed by recursively segmenting an LCU (Largest Coding Unit) that is a maximum encoding unit. The maximum size of a CU that can be selected is 64×64 pixels. The minimum size of a CU that can be selected is 8×8 pixels. A CU of the minimum size is called SCU (Smallest Coding Unit). It is to be noted that the maximum size of a CU is not limited to 64×64 pixels but may be a greater block size such as 128×128 pixels, 256×256 pixels or the like.

As a result of adoption of a CU having a variable size in this manner, according to HEVC, it is possible to adaptively adjust the picture quality and the encoding efficiency in response to the substance of an image. A prediction process for prediction encoding is executed in a processing unit (prediction unit) called PU (Prediction Unit). A PU is formed by segmenting a CU in one of several segmentation patterns. Further, a PU includes a processing unit (prediction block) called PB (Prediction Block) for each of the luminance (Y) and the color differences (Cb and Cr). Furthermore, an orthogonal transform process is executed in a processing unit (transform unit) called TU (Transform Unit). A TU is formed by segmenting a CU or a PU to a certain depth. Further, a TU includes a processing unit (transform block) called TB (Transform Block) for each of the luminance (Y) and the color differences (Cb and Cr).

<Recursive Block Segmentation>

FIG. 6 is an explanatory view illustrating an overview of recursive block segmentation regarding a CU in HEVC. The block segmentation of a CU is performed by recursively repeating segmentation of one block into four (=2×2) sub blocks, and as a result, a tree structure in the form of a quad tree (Quad-Tree) is formed. The entirety of one quad tree is called CTB (Coding Tree Block), and a logical unit corresponding to the CTB is called CTU (Coding Tree Unit).

At an upper portion in FIG. 6, C01 that is a CU having a size of 64×64 pixels is depicted as an example. The depth of segmentation of C01 is equal to zero. This signifies that C01 is the root of a CTU and corresponds to an LCU. The LCU size can be designated by a parameter that is encoded in an SPS (Sequence Parameter Set) or a PPS (Picture Parameter Set). C02 that is a CU is one of four CUs segmented from C01 and has a size of 32×32 pixels. The depth of segmentation of C02 is equal to 1. C03 that is a CU is one of four CUs segmented from C02 and has a size of 16×16 pixels. The depth of segmentation of C03 is equal to 2. C04 that is a CU is one of four CUs segmented from C03 and has a size of 8×8 pixels. The depth of segmentation of C04 is equal to 3. In this manner, a CU is formed by recursively segmenting an image to be encoded. The depth of segmentation is variable. For example, to a flag image region like the blue sky, a CU of a comparatively great size (namely, of a small depth) can be set. On the other hand, to a steep image region including many edges, a CU of a comparatively small size (namely, of a great depth) can be set. Then, each of such set CUs becomes a processing unit in an encoding process.

<Setting of PU to CU>

Figure 7:
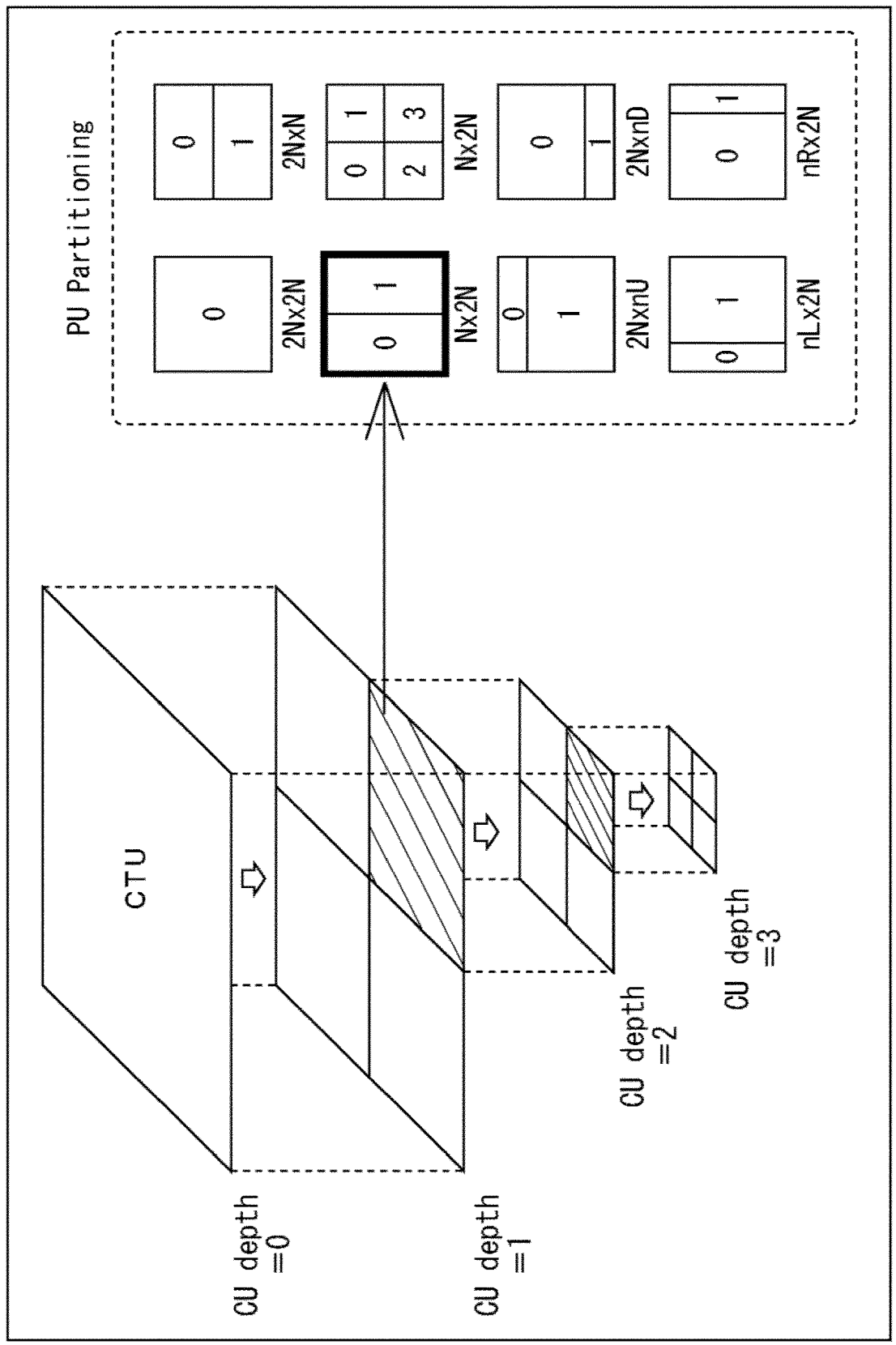
FIG. 7 is an explanatory view illustrating setting of a PU to the CU depicted in FIG. 6.

A PU is a processing unit in a prediction process including intra prediction and inter production. A PU is formed by segmenting a CU in one of several segmentation patterns. FIG. 7 is an explanatory view illustrating setting of a PU to a CU depicted in FIG. 6. In a right region in FIG. 7, eight segmentation patterns of 2N×2N, 2N×N, N×2N, N×N, 2N×nU, 2N×nD, nL×2N and nR×2N are depicted. In intra prediction, the two segmentation patterns of 2N×2N and N×N can be selected from among the eight segmentation patterns (N×N can be selected only in the SCU). In contrast, in inter prediction, all of the eight segmentation patterns can be selected in the case where asymmetrical motion segmentation is enabled.

<Setting of TU to CU>

Figure 8:
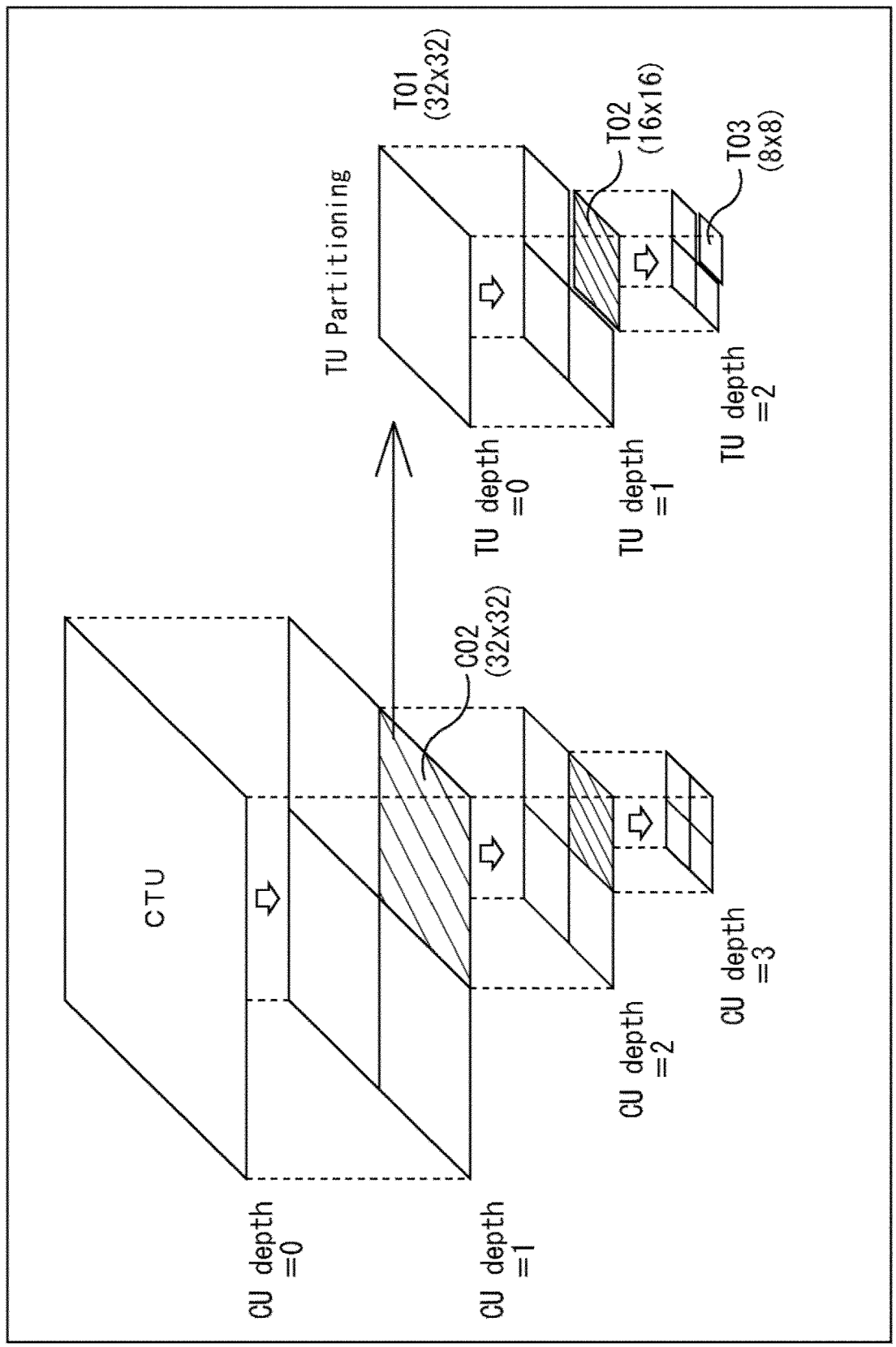
FIG. 8 is an explanatory view illustrating setting of a TU to the CU depicted in FIG. 6.

A TU is a processing unit of an orthogonal transform process. A TU is formed by segmenting a CU (in regard to an intra CU, each PU in the CU) to a certain depth. FIG. 8 is an explanatory view illustrating setting of a TU to a CU depicted in FIG. 7. In a right region in FIG. 8, one or more TUs that can be set to C02 are depicted. For example, T01 that is a TU has a size of 32×32 pixels, and the depth of the TU segmentation is equal to zero. T02 that is a TU has a size of 16×16 pixels, and the depth of the TU segmentation is equal to 1. T03 that is a TU has a size of 8×8 and the depth of the TU segmentation is equal to 2.

What block segmentation is to be performed in order to set such a block as a CU, a PU or a TU described above is determined typically on the basis of comparison in cost that affects the encoding efficiency. An encoder compares the cost, for example, between one CU of 2M×2M pixels and four CUs of M×M pixels, and if the setting of four CUs of M×M pixels indicates a higher encoding efficiency, then the encoder determines to segment a CU of 2M×2M into four CUs of M×M segments.

<Scanning Order of CUs and PUs>

Figure 9:
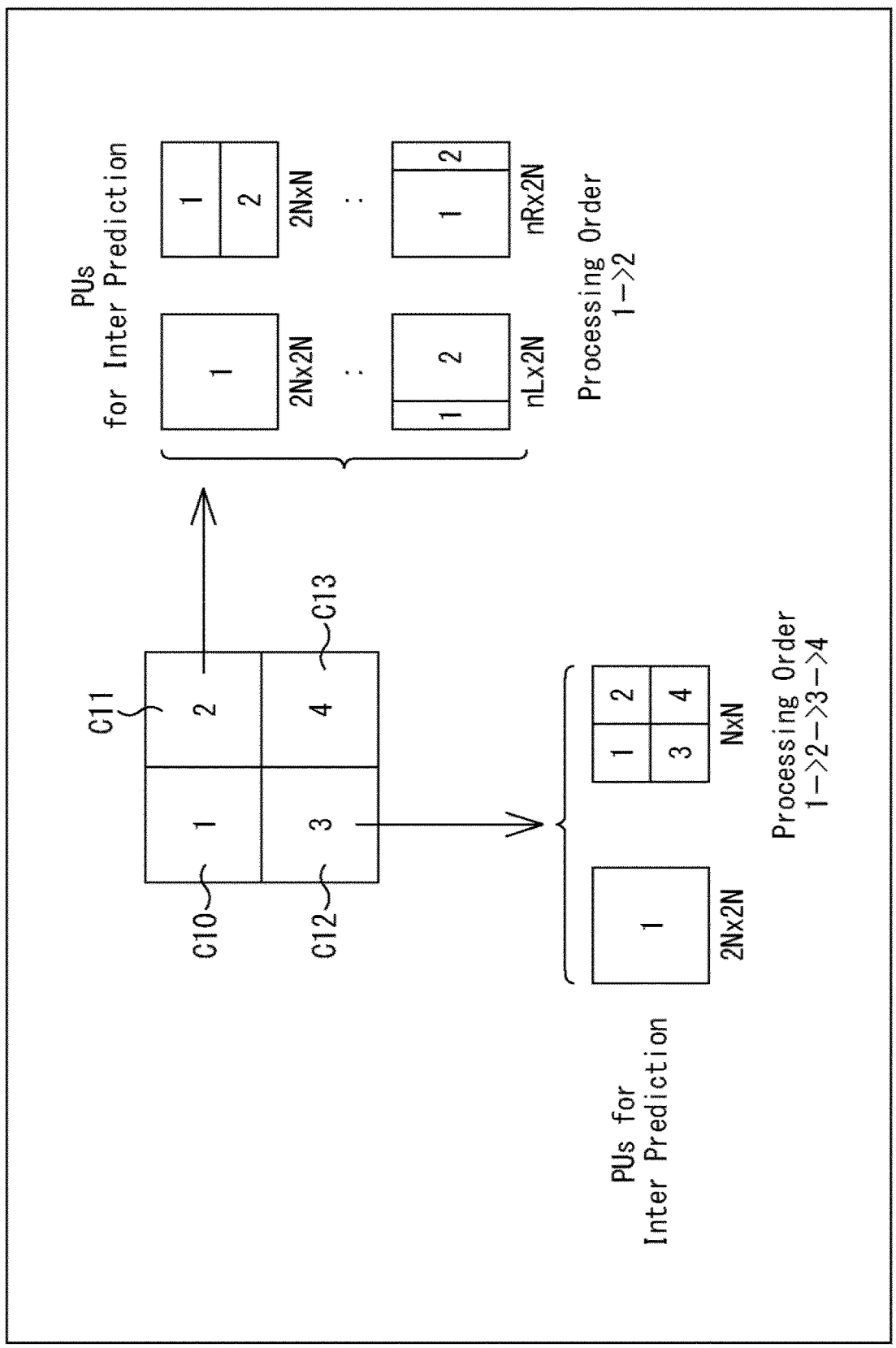
FIG. 9 is an explanatory view illustrating a scanning order of CUs/PUs.

When an image is to be encoded, a CTB (or an LCU) set in a lattice-like pattern in the image (or in a slice or a tile) is scanned in a raster scan order. In one CTB, CUs are scanned so as to follow the quad tree from the left to the right and from the top to the bottom. When a current block is to be processed, information of the upper and left adjacent blocks is utilized as input information. FIG. 9 is an explanatory view illustrating a scanning order of CUs and PUs. At a left upper portion in FIG. 9, C10, C11, C12 and C13 that are four CUs that can be included in one CTB are depicted. A numeral in a framework of each CU represents an order number of the process. The encoding process is executed in an order of C10 that is the left upper CU, C11 of the right upper CU, C12 of the left lower CU and C13 of the right lower CU. At a right portion in FIG. 9, one or more PUs for inter prediction capable of being set to C11 that is a CU are depicted. At a lower portion of FIG. 9, one or more PUs for intra prediction capable of being set to C12 that is a CU are depicted. As indicated by numerals in frameworks of the PUs, also the PUs are scanned so as to follow from the left to the right and from the top to the bottom.

In the following description, description is sometimes given using a "block" as a partial region or a processing unit of an image (picture) (the "block" is not a block of a processing section). The "block" in this case indicates an arbitrary partial region in the picture, and the size, shape, characteristic or the like of it is not restricted. In other words, it is assumed that the "block" in this case includes an arbitrary partial region (processing unit) such as, for example, a TB, a TU, a PB, a PU, an SCU, a CU, an LCU (CTB), a sub block, a macro block, a tile, a slice or the like.

<Image Decoding Apparatus>

Figure 10:
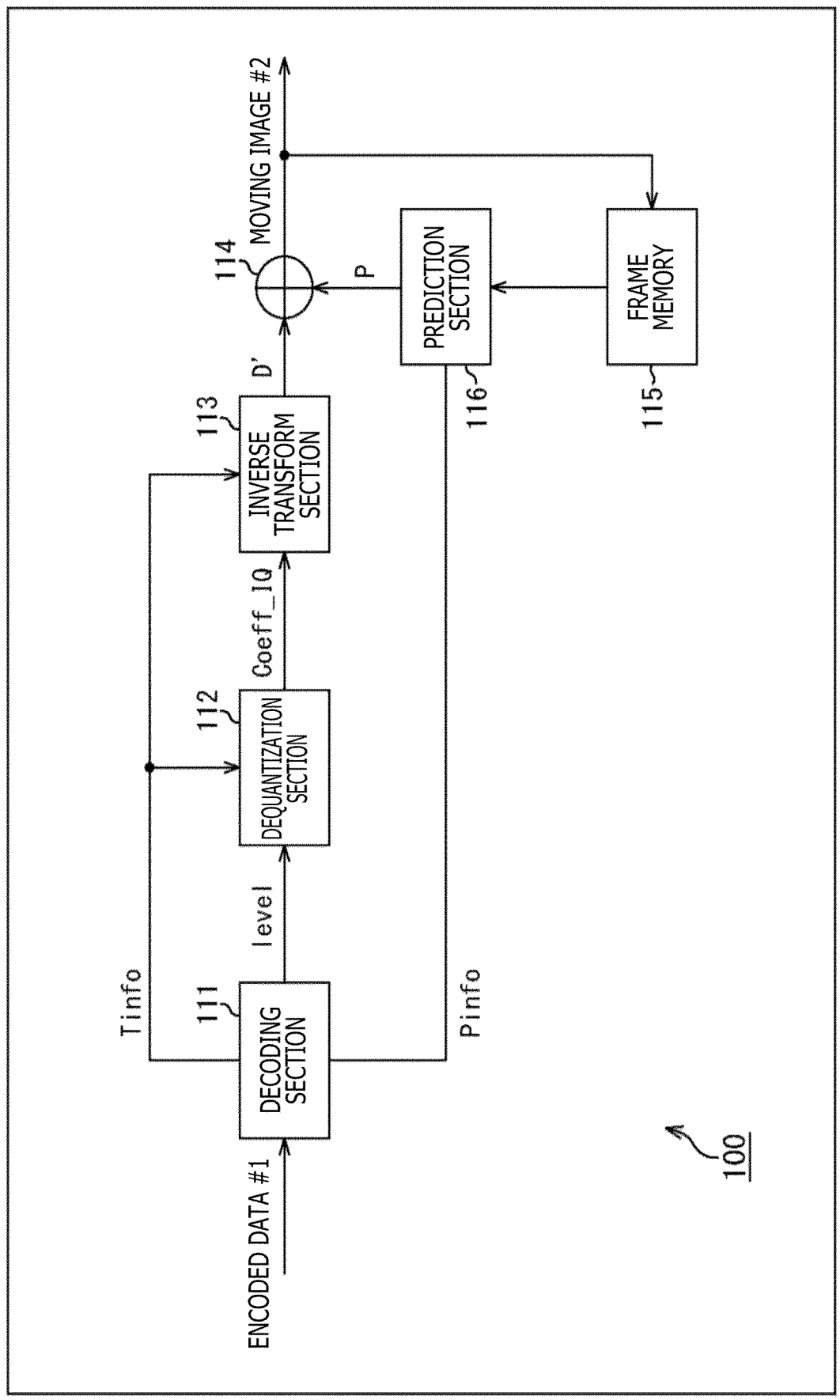
FIG. 10 is a block diagram depicting a principal configuration example of an image decoding apparatus.

FIG. 10 is a block diagram depicting an example of a configuration of an image decoding apparatus that is a form of an image processing apparatus to which the present technology is applied. An image decoding apparatus 100 depicted in FIG. 10 is an apparatus that decodes encoded data encoded from a prediction residual between an image and a prediction image of the image as in AVC or HEVC. For example, the image decoding apparatus 100 incorporates the technology proposed by HEVC or the technology proposed by JVET (Joint Video Exploration Team).

Referring to FIG. 10, the image decoding apparatus 100 includes a decoding section 111, a dequantization section 112, an inverse transform section 113, an arithmetic operation section 114, a frame memory 115 and a prediction section 116. It is to be noted that the prediction section 116 includes an intra prediction section and an inter prediction section not depicted. The image decoding apparatus 100 is an apparatus for generating a moving image #2 by decoding encoded data #1 (bit stream).

The decoding section 111 receives encoded data #1 as an input thereto and variable length decodes syntax values of syntax elements from a bit string of the encoded data #1 in accordance with a definition of a syntax table. Furthermore, the syntax elements include such information as header information Hinfo, prediction mode information Pinfo, transform information Tinfo, residual information Rinfo and so forth.

The header information Hinfo such as VPS/SPS/PPS/slice header SH includes information that prescribes an image size (horizontal width PicWidth, vertical width PicHeight), a bit depth (luminance bitDepthY, color difference bitDepthC), a maximum value MaxCUsize/minimum value MinCUSize of the CU size, a maximum depth MaxQTDepth/minimum depth MinQTDepth of quad-tree segmentation (also referred to as Quad-tree segmentation), a maximum depth MaxBTDepth/minimum depth MinBTDepth of binary tree segmentation (Binary-tree segmentation), a maximum value MaxTSSize of the transform skip block (referred to also as maximum transform skip block size), an on/off flag (also referred to as validity flag) of each encoding tool and so forth.

For example, as the on/off flags for encoding tools included in the header information Hinfo, on/off flags relating to transform and quantization processes indicated below are available. It is to be noted that the on/off flag for each encoding tool can be interpreted also as a flag indicative of whether or not syntax relating to the encoding tool exists in encoded data. Further, in the case where the value of the on/off flag is 1 (true), this indicates that the encoding tool is usable, but in the case where the value of the on/off flag is 0 (false), this indicates that the encoding tool is not usable. It is to be noted that the interpretations of the flag value may be reversed.

The adaptive primary transform validity flag apt_enabled_flag (also referred to as adaptive_primary_transform_enabled_flag, adaptive_pt_enabled_flag, or amt_enabled_flag) is a flag indicative of whether, as one of transform processes and inverse processes to them, an encoding tool that can select an adaptive primary transform is usable.

The secondary transform validity flag st_enabled_flag is a flag indicative of whether or not an encoding tool for performing a secondary transform/inverse secondary transform as one of transform processes and inverse processes is usable.

The transform quantization bypass validity flag transquant_bypass_enabled_flag is a flag indicative of whether or not an encoding tool for skipping, as one of transforms and quantization and inverse processes to them, a transform, quantization/dequantization and an inverse transform is usable.

The transform skip flag validity flag ts_enabled_flag is a flag indicative of whether or not, as one of transform processes and inverse processes to the transform processes, two-dimensional transform skip or one-dimensional transform skip is usable. The two-dimensional transform skip is an encoding tool for skipping orthogonal transforms and inverse processes to the orthogonal transforms (inverse orthogonal transforms) including primary transforms and secondary transforms. Meanwhile, the one-dimensional transform skip is an encoding tool for skipping, from among primary transforms, a primary transform in the horizontal direction or the vertical direction and an inverse transform corresponding to the primary transform (inverse primary transform) as well as a secondary transform and an inverse secondary transform to the secondary transforms.

The prediction mode information Pinfo further includes a PU size (prediction block size) PUSize of a processing target PU, intra prediction mode information IPinfo (for example, prev_intra_luma_pred_flag, mpm_idx, and rem_intra_ pred_mode in JCTVC-W1005, 7.3.8.5 Coding Unit syntax), motion prediction information MVinfo (for example, refer to JCTVC-W1005, 7.3.8.6 Prediction Unit Syntax, merge_idx, merge_flag, inter_pred_idc, ref_idx_LX, mvp_lX_flag, X={0,1}, and mvd) and so forth.

Meanwhile, the transform information Tinfo includes syntax of, for example, a horizontal width size TBWidth and a vertical width TBHeight of a processing target transform block, a transform quantization bypass flag transquant_bypass_flag indicative of whether or not processes for (inverse) transforms and (de) quantization are to be skipped, a transform skip identifier ts_idx that designates various transform skip mods such as two-dimensional transform skip or one-dimensional transform skip, an adaptive primary transform flag apt_flag indicative of whether an adaptive primary transform is to be applied to a target TU, a primary transform identifier pt_idx indicative of which one of (inverse) primary transforms is to be applied for (inverse) primary transforms in each of the vertical direction and the horizontal direction, a secondary transform identifier st_sdx (also referred to as dnsst_idx, nsst_idx, or rot_idx) indicative of which one of (inverse) secondary transforms is to be applied, a scan identifier scanIdx, a quantization parameter qp, a quantization matrix scaling_matrix and so forth. It is to be noted that, in place of the horizontal width size TBWidth and the vertical width TBHeight of a processing target transform block, logarithms log 2TBWidth and log 2TBHeight of TBWidth and TBHeight with the base 2 may be included, respectively, in the transform information Tinfo.

The residual information Rinfo includes, for example, a last non-zero coefficient X coordinate (last_sig_coeff_x_pos), a last non-zero coefficient Y coordinate (last_sig_coeff_y_pos), a sub block non-zero coefficient presence/absence flag (coded_sub_block_flag), a non-zero coefficient presence/absence flag (sig_coeff_flag), a flag (gr1_flag) (also referred to as GR1_flag) that indicates whether the level of a non-zero coefficient is greater than 1, a flag (gr2_flag) (also referred to as GR2 flag) that indicates whether the level of a non-zero coefficient is greater than 2, a sign (sign_flag) (also referred to as sign code) that represents whether the non-zero coefficient is in the positive or in the negative, a remaining level of a non-zero coefficient (coeff_abs_level_remaining) (also referred to as non-zero coefficient remaining level) and so forth.

The decoding section 111 refers to the residual information Rinfo to derive quantization transform coefficient levels level of coefficient positions in transform blocks. The decoding section 111 supplies the prediction mode information Pinfo, quantization transform coefficient levels level and transform information Tinfo obtained by the decoding to the associated blocks. For example, the decoding section 111 supplies the prediction mode information Pinfo to the prediction section 24, supplies the quantization transform coefficient levels level to the dequantization section 22 and supplies the transform information Tinfo to the inverse transform section 113 and the dequantization section 112.

The dequantization section 112 receives the transform information Tinfo and the quantization transform coefficient levels level as inputs thereto and scales (dequantizes) the values of the quantization transform coefficient levels level on the basis of the transform information Tinfo and outputs transform coefficients Coeff_IQ after the dequantization to the inverse transform section 113.

The inverse transform section 113 receives the transform coefficients Coeff_IQ and the transform information Tinfo as inputs thereto and applies an inverse transform to the transform coefficients Coeff_IQ to derive a prediction residual D', and outputs the prediction residual D' to the arithmetic operation section 114. Details of the inverse transform section 113 are hereinafter described.

The arithmetic operation section 114 receives the prediction residual D' and prediction images P that are supplied from the prediction section 116 as inputs thereto, adds the prediction residual D' and the prediction image P (prediction signal) corresponding to the prediction residuals D' to derive locally decoded images Rec as indicated by an expression (9) given below, and supplies the locally decoded images Rec to the frame memory 115 or to the outside of the image decoding apparatus 100.

$$Rec=D'+P \qquad (9)$$

The frame memory 115 receives the locally decoded images Rec supplied from the arithmetic operation section 114 as an input thereto, and re-constructs a decoded image for each picture unit and stores the decoded images into the buffer in the frame memory 115. The frame memory 115 reads out a decoded image designated by the prediction mode information Pinfo of the prediction section 116 as a reference image from the buffer and supplies the reference image to the prediction section 116. Further, the frame memory 115 may store header information Hinfo, prediction mode information Pinfo, transform information Tinfo and so forth relating to the generation of the decoded image into the buffer in the frame memory 115.

The prediction section 116 receives the prediction mode information Pinfo as an input thereto, and generates a prediction image P by a prediction method designated by the prediction mode information Pinfo using a decoded image stored in the frame memory 115 and designated by prediction mode information PInfo as a reference image and outputs the generated prediction image P to the arithmetic operation section 114.

Figure 11:
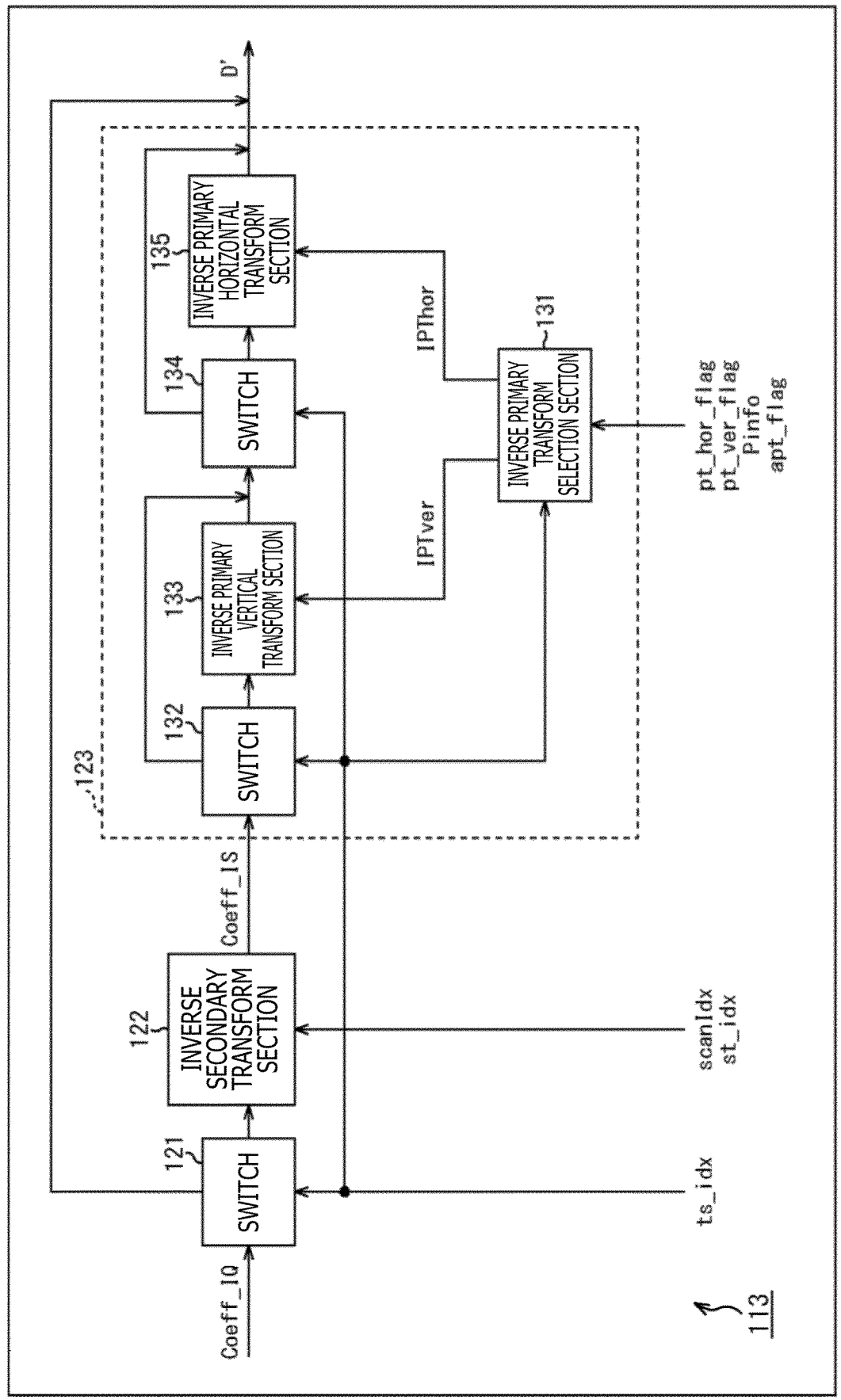
FIG. 11 is a block diagram depicting a principal configuration example of an inverse transform section.

FIG. 11 is a block diagram depicting a principal configuration example of the inverse transform section 113 provided in the image decoding apparatus 100 of FIG. 10. As depicted in FIG. 11, the inverse transform section 113 includes a switch 121, an inverse secondary transform section 122 and an inverse primary transform section 123.

The switch 121 receives transform coefficients Coeff_IQ and a transform skip identifier ts_idx as inputs thereto. In the case where the value of the transform skip identifier ts_idx is NO_TS (=0) or 1D_H_TS (=2) or else 1D_V_TS (=3) (in the case where it is indicated that transform skip is not to be applied or one-dimensional skip is to be applied to one of the horizontal and vertical directions), the switch 121 outputs the transform coefficients Coeff_IQ to the inverse secondary transform section 122. On the other hand, in the case where the value of the transform skip flag ts_idx is 2D_TS (=1) (in the case where it is indicated that two-dimensional transform skip is to be applied), the switch 121 skips the inverse secondary transform section 122 and the inverse primary transform section 123 and outputs the transform coefficients Coeff_IQ as a prediction residual D'.

For example, in the case where the transform skip identifier ts_idx is 2D_TS (=1) and the transform coefficients Coeff_IQ to be inputted to the inverse transform section 113 is a 4×4 matrix Coeff_IQ=[[255, 0, 0, 0], [0, 0, 0, 0], [0, 0, 0, 0], [0, 0, 0, 0]], the switch 121 outputs the transform coefficients Coeff_IQ as a prediction residual D'. In particular, the prediction residual D' becomes D'=[[255, 0, 0, 0], [0, 0, 0, 0], [0, 0, 0, 0], [0, 0, 0, 0]]. Accordingly, an inverse secondary transform and an inverse primary transform can be skipped. Especially, it is possible to perform, for a sparse residual signal in which the number of non-zero coefficients is small and to which it is desirable to apply two-dimensional transform skip, an inverse transform process that achieves reduction of the processing amount of an inverse transform and enhancement of the encoding efficiency.

The inverse secondary transform section 122 receives a secondary transform identifier st_idx, a scan identifier scanIdx indicative of a scanning method for transform coefficients and transform coefficients Coeff_IQ as inputs thereto and derives and supplies transform coefficients Coeff_IS after the inverse secondary transform (also referred to as primary transform coefficients) to the inverse primary transform section 123. More particularly, in the case where the secondary transform identifier st_idx indicates that an inverse secondary transform is to be applied (st_idx>0), the inverse secondary transform section 122 executes a process of an inverse secondary transform corresponding to the secondary transform identifier st_idx for the transform coefficients Coeff_IQ, and outputs transform coefficients Coeff_IS after the inverse secondary transform. In the case where the secondary transform identifier st_idx indicates that an inverse secondary transform is not to be applied (st_idx==0), the inverse secondary transform is skipped and the transform coefficients Coeff_IQ are outputted as the transform coefficients Coeff_IS after the inverse secondary transform.

The inverse primary transform section 123 receives a primary horizontal transform designation flag pt_hor_flag, a primary vertical transform designation flag pt_ver_flag, prediction mode information PInfo, a transform skip identifier ts_idx and transform coefficients Coeff_IS after an inverse secondary transform as inputs thereto. The inverse primary transform section 123 selects a matrix IPThor (=PThor$^T$) of an inverse primary horizontal transform and a matrix IPTver (=PTver$^T$) of inverse primary vertical transform designated by the prediction mode information PInfo, the transform skip identifier and the primary horizontal transform designation flags pt_hor_flag and primary vertical transform designation flag pt_ver_flag, performs an inverse primary horizontal transform and an inverse primary vertical transform for the transform coefficients Coeff_IS after the inverse secondary (also referred to as primary transform coefficients Coeff_P) with the selected matrices of the inverse primary transforms in the directions to derive prediction residuals D' after the inverse primary transform, and outputs the prediction residuals D'.

As depicted in FIG. 11, the inverse primary transform section 123 includes an inverse primary transform selection section 131, a switch 132, an inverse primary vertical transform section 133, another switch 134 and an inverse primary horizontal transform section 135.

The inverse primary transform selection section 131 receives a primary horizontal transform designation flag pt_hor_flag, a primary vertical transform designation flag pt_ver_flag, prediction mode information PInfo and a transform skip identifier ts_idx as inputs thereto, reads out a matrix IPThor (=PThor$^T$) of an inverse primary horizontal transform and a matrix IPTver (=PTver$^T$) of an inverse primary vertical transform designated by the prediction mode information PInfo, the transform skip identifier ts_idx, and a primary horizontal transform designation flag pt_hor_flag and a primary vertical transform designation flag pt_ver_flag from an internal memory (not depicted) of the inverse primary transform selection section 131, and supplies them to the inverse primary horizontal transform section 135 and the inverse primary vertical transform section 133.

More particularly, in the case where the adaptive primary transform flag apt_flag (also referred to as CU primary transform flag cu_pt_flag) is 1 (true), the inverse primary transform selection section 131 selects, for example, from among three transform sets TransformSet of the transform set identifier TransfromSetIdx=0, . . . , 2 depicted in the table of FIG. 1, a transform set TransformSet, which includes orthogonal transforms that become candidates for a primary transform, for each of the horizontal direction and the vertical direction on the basis of the correspondence table (intra prediction mode information) between mode information and transform sets depicted in FIG. 3. It is to be noted that, in FIG. 3, the intra prediction mode number 35 may be treated as a mode indicative of an inter prediction (Inter) or of an intra block copy (IBC: Intra Block Copy).

For example, the selection is carried out such that, for each of transform sets TransformSet{H, V}, a transform set identifier TransformSetIdx for designating a corresponding transform set TransformSet as represented by the following conditional expression (10).

$$
\begin{aligned}
&\text{if (apt\_flag)} \hspace{4cm} (10)\\
&\quad \text{TransformSetH} = \text{LUT\_IntraModeToTransformSet}\\
&\quad [\ \text{IntraMode}\ ]\ [\ \text{H}(=0)\ ]\\
&\quad \text{TransformSetV} = \text{LUT\_IntraModeToTransformSet}\\
&\quad [\ \text{IntraMode}\ ]\ [\ \text{V}(=1)\ ]\\
&\quad \text{else // apt\_flag == 0}\\
&\quad \text{TransformSetH} = \text{TransformSetV} = 3\ (\text{predetermined value})
\end{aligned}
$$

Here, TransformSetH indicates a transform set of primary horizontal transforms PThor while TransformSetV indicates a transform set of primary vertical transforms PTver, and a lookup table LUT_IntraModeToTransformSet indicates the correspondence table of FIG. 3. The first array of the lookup table LUT_IntraModeToTransformSet[ ] [ ] takes the intra prediction mode IntraMode as an argument, and the second array takes {H=0, V=1} as an argument. For example, in the case of the intra prediction mode number 9 (IntraMode==9), as the transform set TransformSetH of a primary horizontal transform PThor (also referred to as primary horizontal transform set), the transform set of the transform set identifier TransformSetIdx=0 depicted in the table of FIG. 1 is selected, and as the transform set TransformSetV of a primary vertical transform PTver (also referred to as primary vertical transform set), the transform set of the transform set identifier TransformSetIdx=2 depicted in FIG. 1 is selected. On the other hand, in the case where the adaptive primary transform flag amt_flag is 0 (false), the inverse primary transform selection section 131 sets the transform set TransformSet of the transform set identifier TransfromSetIdx=3 (predetermined value) depicted in the table of FIG. 1 as a transform set including orthogonal transforms that become candidates for a primary transform.

Furthermore, the inverse primary transform selection section 131 selects, for each horizontal/vertical direction, orthogonal transforms to be used for an inverse primary transform from the selected transform set TransformSet depending upon the primary horizontal transform designation flag pt_hor_flag and the primary vertical transform designation flag pt_ver_flag, respectively.

For example, as in the conditional expression (11) given below, in the case where the primary horizontal transform designation flag pt_hor_flag is −1, a matrix IDT corresponding to one-dimensional transform skip is selected, but in the case where the primary horizontal transform designation flag pt_hor_flag is any other than −1, an orthogonal transform is derived from the definition table (LUT_TransformSet-ToTransformType) of the transform sets depicted in FIG. 1 taking the primary horizontal transform set TransformSetH and the primary horizontal transform designation flag pt_hor_flag as arguments.

```
        if (pt_hor_flag != -1)                              (11)
           IPThor = LUT_TransformSetToTransformType
    [ TransformSetH ] [ pt_hor_flag ]
        else
           IPThor = IDT
```

For example, if an inverse primary horizontal transform in the case of the intra prediction mode number 9 (IntraMode==9) is taken as an example, then since the value of the transform set identifiers of the primary horizontal transform set TransformSetH is 0, an inverse primary horizontal transform is selected from within the transform set whose transform set identifier TransformSetIdx==0 on the transform set definition table LUT_TransformSetToTransformType of FIG. 1. In particular, in the case where the primary horizontal transform designation flag pt_hor_flag==−1, IDT is selected as the inverse primary horizontal transform IPThor; in the case where the primary horizontal transform designation flag pt_hor_flag==0, DST-VII is selected as the inverse primary horizontal transform IPThor; and in the case where the primary horizontal transform designation flag pt_hor_flag is 1, DCT-VIII is selected as the inverse primary horizontal transform IPThor.

Similarly, also in regard to an inverse primary vertical transform, as indicated by the conditional expression (12) given below, in the case where the primary vertical transform designation flag pt_ver_flag is −1, the matrix IDT (unit matrix) corresponding to one-dimensional transform skip, and in the case where the primary vertical transform designation flag pt_ver_flag is any other than −1, an orthogonal transform is derived from within the definition table (LUT_TransformSetToTransformType) of transform sets depicted in FIG. 1 taking the primary vertical transform set TransformSetV and the primary vertical transform designation flag pt_ver_flag as arguments.

```
        if (pt_ver_flag != -1)                              (12)
           IPTver = LUT_TransformSetToTransformType
    [ TrasnformSetV ] [ pt_ver_flag ]
        else
           IPTver = IDT
```

It is to be noted that, although, in the expressions (11) and (12) given above, in the case of pt_{hor, ver}_flag==−1, IDT is set by conditional branching, IDT may be set referring to the lookup table LUT_TransformSetToTransformType[ ] [ ]. In this case, it is sufficient if the value of the element of the lookup table LUT_TransformSetToTransformType[0 . . . 3][−1] is set to IDT. It is to be noted that, while, in this example, pt_{hor, ver}_flag==−1 is a value representative of one-dimensional transform skip, the value can be freely changed as far as practicable. Further, the combination in value of a transform set identifier and pt_{hor, ver}_flag in FIG. 1 may be changed freely as far as practicable. For example, in the case where pt_{hor, ver}_flag==1, DST-VII may be set irrespective of the value of the transform set identifier, and in the case where pt_{hor, ver}_flag==0, DCT-VIII, DST-I, DCT-V and DST-VII may be set in order of the transform set identifiers 0 to 3, respectively. Further, the order of the transform set identifiers 0 to 2 may be changed freely as far as practicable. Further, the inverse primary transform selection section 131 may select, in place of the intra prediction mode information IPinfo, an inverse primary horizontal transform IPThor and an inverse primary vertical transform IPTver in response to motion prediction information MVinfo and the primary horizontal transform designation flag pt_hor_flag and primary vertical transform designation flag pt_ver_flag.

Thereafter, the inverse primary transform selection section 131 reads out matrices of orthogonal transforms corresponding to the inverse primary horizontal transform IPThor and the inverse primary vertical transform IPTver from the buffer (not depicted) held by the inverse primary transform section 123 and supplies the matrices corresponding to the inverse primary vertical transform and the inverse primary horizontal transform.

The switch 132 receives transform coefficients Coeff_IS after the inverse secondary transform (also referred to primary transform coefficients Coeff_P) and a transform skip identifier ts_idx as inputs thereto. In the case where the value of the transform skip identifier ts_idx is 1D_V_TS (=3), namely, indicates that a one-dimensional transform in the vertical direction is to be skipped (ts_idx==1D_V_TS) (to skip the (inverse) primary vertical transform), the switch 132 skips processing of the inverse primary vertical transform section 133 and outputs the primary transform coefficient Coeff_IS as a transform coefficient Coeff_IPver after the inverse primary vertical transform. On the other hand, in the case where the value of the transform skip identifier ts_idx is any other than 1D_V_TS (=3) (ts_idx !=1D_V_TS) (indicates that the (inverse) primary vertical transform is not to be skipped), the switch 132 outputs the primary transform coefficient Coeff_IS.

The inverse primary vertical transform section 133 receives, for each transform block, a transform coefficient Coeff_IS after the inverse secondary transform and a matrix for an inverse primary vertical transform IPTver as inputs thereto, performs matrix operation represented by the expression (13) given below and outputs a result of the matrix operation as a transform coefficient Coeff_IPver after the inverse primary vertical transform. It is to be noted that the inverse primary vertical transform IPTver is an inverse transform to the primary vertical transform PTver having a transformation basis as a column vector and is represented by a matrix PTver$^T$ transposed from the primary vertical transform PTver.

$$\text{Coeff\_IPver} = (IPTver \cdot \text{Coeff\_IS}) >> s1 \qquad (13)$$
$$= (PTver^T \cdot \text{Coeff\_IS}) >> s1$$

Here, the operator "·" represents a matrix product (inner product), the operator "T" represents an operation for the transposed matrix, and the operator ">>" represents an operation for performing right shift operation for the elements. According to the expression (13), each value of the transform coefficient Coeff_IPver is obtained by performing, for each element of the matrix product of the transform coefficient Coeff_IS and the transposed matrix PTver$^T$ (=IPTver) after the primary vertical transform, right shift operation with a predetermined scaling parameter s1. It is to be noted that the scaling parameter s1 is used to normalize a matrix operation result of IPTver·Coeff_IS so as to fit in the bit depth of an intermediate buffer. The value of the scaling parameter s1 is determined from the bit depth BitDepthbuff of the intermediate buffer and the worst case MaxBitDepth (IPTver·Coeff_IS) of the bit depth of the matrix operation of IPTver·Coeff_IS, for example, as indicated by the following expression (14).

$$s1 = \max(0, \text{MaxBitDepth}(\text{IPTver·Coeff\_IS}) - \text{BitDepthbuff}) \quad (14)$$

For example, in the case where the value range of IPTver·Coeff_IS is $-2^{}22$ to $2^{}22-1$, namely, in the case where the bit depth of MaxBitDepth(IPTver·Coeff_IS) is 23 bits and the value range of a value that can be stored into the intermediate buffer is $-2^{}15$ to $2^{}15-1$, namely, the bit depth of the intermediate buffer is 16 bits, the scaling parameter s1 becomes s1=7 bits (=max(0, 23−16)=max(0, 7)).

On the other hand, in the case where the bit depth of MaxBitDepth(IPTver·Coeff_IS) is 23 bits and the value range of the value that can be stored into the intermediate buffer is $-2^{}31$ to $2^{}31-1$, namely, in the case where the bit depth of the intermediate buffer is 32 bits, the scaling parameter s1 becomes s1=0 bit (=max(0, 23−32)=max(0, −9)). That the scaling parameter s1 is 0 represents that, since the value of the bit depth of the intermediate buffer is sufficiently high, even if element values of the matrix product of IPTver·Coeff_IS are not normalized, they can be stored into the intermediate buffer without overflowing. It is to be noted that the scaling parameter s1 may be a fixed value determined in advance assuming that the value range of IPTver·Coeff_IS is known.

Further, in order to reduce a clip error by right shift operation of the expression (13) described hereinabove, after the matrix product, a predetermined offset value o1 may be added for each element. At this time, the offset value o1 is represented by the following expression (15) using the scaling parameter s1.

$$o1 = (s1 > 0\ ?\ 1 << (s1-1) : 0) \quad (15)$$

The switch 134 receives a transform coefficient Coeff_IPver after the inverse primary vertical transform and a transform skip identifier ts_idx. In the case where the value of the transform skip identifier ts_idx is 1D_H_TS (=2), namely, indicates that a one-dimensional transform in the horizontal direction (ts_idx==1D_H_TS) (to skip a (inverse) primary horizontal transform), the switch 134 skips the inverse primary horizontal transform section 135 and outputs the transform coefficient Coeff_IPver after the inverse primary vertical transform as a prediction residual D' to the outside. On the other hand, in the case where the value of the transform skip identifier ts_idx is any other than 1D_H_TS (=2) (ts_idx !=1D_H_TS) (in the case where it is indicated that a (inverse) primary horizontal transform is not to be skipped), the switch 134 outputs the transform coefficient Coeff_IPver after the inverse primary vertical transform to the inverse primary horizontal transform section 135.

The inverse primary horizontal transform section 135 receives, for each transform block, transform coefficients Coeff_IPver after the inverse primary vertical transform and a matrix of an inverse primary horizontal transform IPThor as inputs thereto, performs matrix operation as indicated by the expression (16) given below, and outputs a result of the matrix operation as a prediction residual D'. It is to be noted that the inverse primary horizontal transform IPThor is an inverse transform of a primary horizontal transform PThor that has the transformation basis as a row vector, and is represented by a matrix $\text{PThor}^T$ transposed from the primary horizontal transform PThor.

$$D' = (\text{Coeff\_IPver} \cdot \text{IPThor}) >> s2 \quad (16)$$
$$= (\text{Coeff\_Pver} \cdot \text{PThor}^T) >> s2$$

Here the operator "·" represents a matrix product (inner product), the operator "T" represents an operation for a transposed matrix, and the operator ">>" represents an operation for performing right shift operation for each element. According to the expression (16), each value of the prediction residual D' is obtained by performing, for each element of the matrix product of the transform coefficients Coeff_IPver and the transposed matrix $\text{PThor}^T$ (=IPTver) of the primary horizontal transform, right shift operation with a predetermined scaling parameter s2. It is to be noted that the scaling parameter s2 is used to normalize a matrix operation result of Coeff_IPver·IPThor so as to fit in a desire bit depth. The value of the scaling parameter s2 is determined from a desired bit depth BitDepthout and the worst case MaxBitDepth(Coeff_IPver·IPThor) of the bit depth of the matrix operation of Coeff_IPver·IPThor in accordance with the following expression (17).

$$s2 = \max(0, \text{MaxBitDepth}(\text{Coeff\_IPver·IPThor}) - \text{BitDepthout}) \quad (17)$$

For example, in the case where the value range of Coeff_IPver·IPThor is $-2^{}22$ to $2^{}22-1$, namely, in the case where the bit depth of MaxBitDepth (Coeff_IPver·IPThor) is 23 bits and the value range of the value that can be taken with a desired bit depth is $-2 \cdot +15$ to $2^{**}15-1$, namely, in the case where the desired bit depth is 16 bits, the scaling parameter s2 becomes s2=7 bits (=max(0, 23−16)=max(0, 7)).

Further, in the case where the bit depth of MaxBitDepth (Coeff_IPver·IPThor) is 23 bits and the value range of the value that can be taken with a desired bit depth is $-2^{}31$ to $2^{}31-1$, namely, in the case where the desired bit depth is 32 bits, the scaling parameter s2 becomes s2=0 bit (=max(0, 23−32)=max(0, −9)). Since that the scaling parameter s2 is 0 represents that, since the value of the desired bit depth is sufficiently high, even if the pixel values of the matrix product of Coeff_IPver·IPThor are not normalized, the pixel values fit in the desired bit depth.

It is to be noted that, in order to reduce a clip error by right shift operation of the expression (16) described hereinabove, after the matrix product, a predetermined offset value o2 may be added for each element. At this time, the offset value o2 is represented by the following expression (18) using the scaling parameter s2.

$$o2 = (s2 > 0\ ?\ 1 << (s2-1) : 0) \quad (18)$$

As described above, the inverse primary transform section 123 can perform, for a residual signal in regard to which it is desirable to skip a one-dimensional transform in the horizontal direction or the vertical direction, an inverse primary transform process that decreases the processing amount of an inverse primary transform and prevents decrease of energy compaction to enhance the encoding efficiency.

Especially, for a residual signal having a characteristic of a step edge in which the continuity of a signal changes rapidly in the horizontal direction, by skipping a one-dimensional transform in the horizontal direction and performing a one-dimensional transform in the vertical direction, non-zero coefficients can be concentrated efficiently on a low frequency region of frequency components in the vertical direction in comparison with those in the case where a two-dimensional orthogonal transform is performed. In particular, since energy compaction can be increased, enhancement of the encoding efficiency can be implemented.

Similarly, for a residual signal having a characteristic of a step edge in which the continuity of a signal changes rapidly in the vertical direction, by skipping a one-dimensional transform in the vertical direction and performing a one-dimensional transform in the horizontal direction, non-zero coefficients can be concentrated efficiently on decrease of frequency components in the horizontal direction in comparison with those in an alternative case in which a two-dimensional orthogonal transform is performed. In particular, since energy compaction can be increased, enhancement of the encoding efficiency can be implemented.

<Flow of Image Decoding Process>

Now, a flow of processes executed by such an image decoding apparatus 100 described above is described. First, a flow of an image decoding process is described with reference to a flow chart of FIG. 12.

After an image decoding process is started, at step S101, the decoding section 111 decodes a bit stream (encoded data) supplied to the image decoding apparatus 100 and acquires information such as header information Hinfo, prediction mode information Pinfo, transform information Tinfo, residual information Rinfo, quantization transform coefficient levels level and so forth.

At step S102, the dequantization section 112 dequantizes the quantization transform coefficient levels level obtained by the process at step S101 to derive transform coefficients Coeff_IQ. This dequantization is an inverse process to the quantization performed in an image encoding process hereinafter described and is a process similar to dequantization performed in the image encoding process.

At step S103, the inverse transform section 113 inversely transforms the transform coefficients Coeff_IQ obtained by the process at step S102 to derive a prediction residual D'. This inverse transform is an inverse process to a transform process performed in the image encoding process hereinafter described and is a process similar to that of an inverse transform performed in the image encoding process.

At step S104, the prediction section 116 performs prediction in a prediction mode same as that in prediction upon encoding on the basis of the prediction mode information PInfo to generate a prediction image.

At step S105, the arithmetic operation section 114 adds the prediction image obtained by the process at step S104 to the prediction residual D' obtained by the process at step S103 to obtain a decoded image.

At step S106, the arithmetic operation section 114 outputs the decoded image obtained by the process at step S105 to the outside of the image decoding apparatus 100.

At step S107, the frame memory 115 stores the decoded image obtained by the process at step S105.

When the process at step S107 ends, the image decoding process is ended.

<Flow of Process of Inverse Transform>

Figure 12:
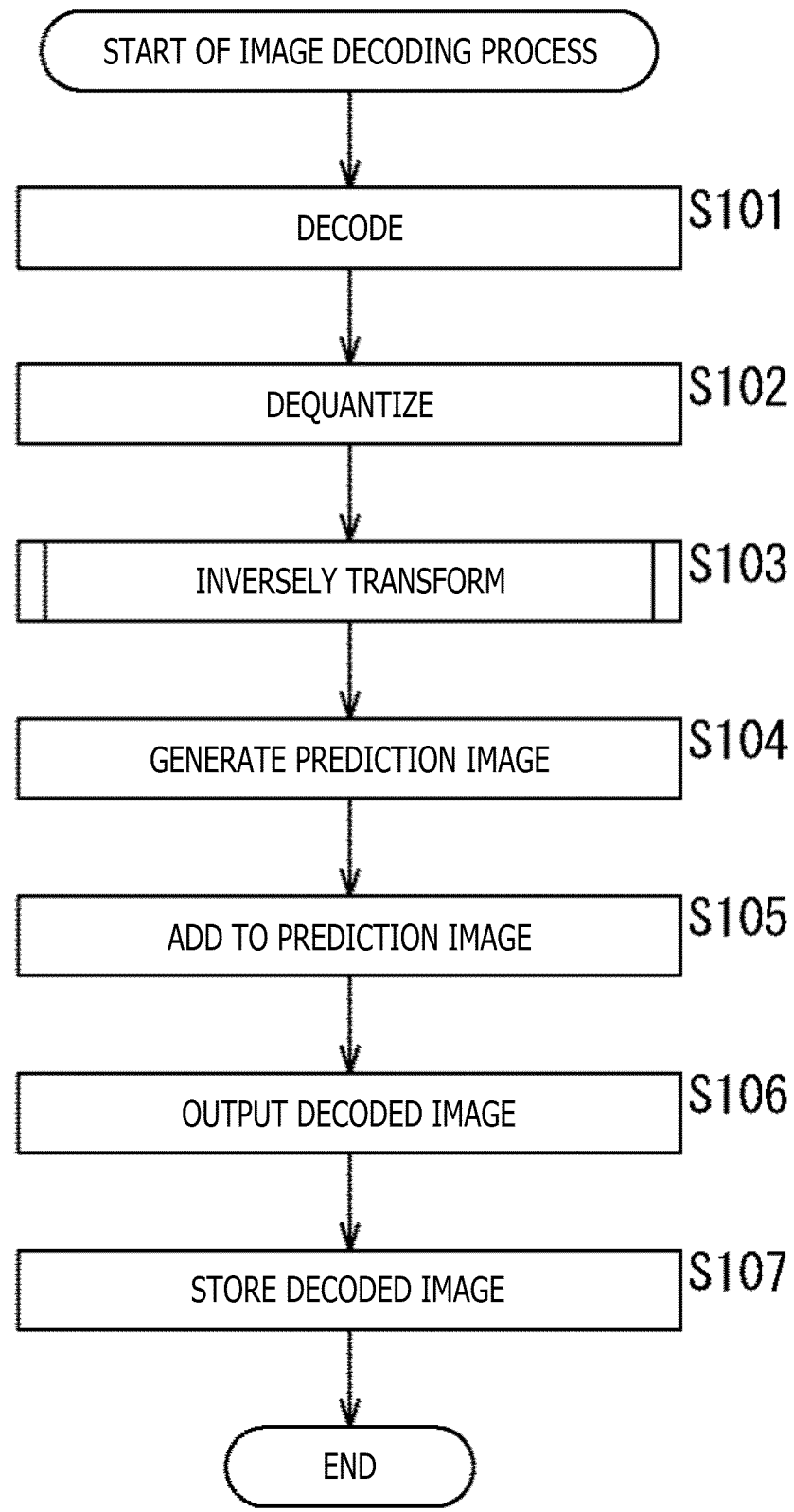
FIG. 12 is a flow chart illustrating an example of a flow of an image decoding process.

Now, an example of a flow of the inverse transform process executed at step S103 of FIG. 12 is described with reference to a flow chart of FIG. 13. After the inverse transform process is started, at step S121, the switch 121 decides whether the transform skip identifier ts_idx is 2D_TS (mode of two-dimensional transform skip) or the transform quantization bypass flag transquant_bypass_flag is 1 (true). In the case where it is decided that the transform skip identifier ts_idx is 2D_TS or the transform quantization bypass flag is 1 (true), the transform coefficients Coeff_IQ are outputted as a prediction residual D' to the outside (supplied to the arithmetic operation section 114) by the switch 121, and the inverse transform process ends and the processing returns to FIG. 12.

On the other hand, in the case where it is decided at step S121 that the transform skip identifier ts_idx is not 2D_TS (mode other than two-dimensional transform skip) and besides the transform quantization bypass flag is 0 (false), the transform coefficients Coeff_IQ are supplied to the inverse secondary transform section 122 by the switch 121, and the processing advances to step S122.

At step S122, the inverse secondary transform section 122 performs an inverse secondary transform for the transform coefficients Coeff_IQ' inputted thereto on the basis of the secondary transform identifier st_idx to derive and output the primary transform coefficients Coeff_IS.

At step S123, the inverse primary transform selection section 131 performs an inverse primary transform selection process to refer to the primary horizontal transform designation flag pt_hor_flag, primary vertical transform designation flag pt_ver_flag, prediction mode information PInfo and transform skip identifier ts_idx to select an inverse primary horizontal transform IPThor and an inverse primary vertical transform IPTver.

At step S124, the switch 132 decides whether or not the transform skip identifier ts_idx is 1D_V_TS (mode of one-dimensional transform skip in the vertical direction) (ts_idx==1D_V_TS). In the case where the transform skip identifier ts_idx is not 1D_V_TS, the processing advances to step S125.

At step S125, the inverse primary vertical transform section 133 receives, for each transform block, transform coefficients Coeff_IS after the inverse secondary transform and a matrix for an inverse primary vertical transform IPTver as inputs thereto, performs matrix operation, and outputs a result of the matrix operation as transform coefficients Coeff_IPver after the inverse primary vertical transform. After the process at step S125 ends, the processing advances to step S126.

On the other hand, in the case where the transform skip identifier ts_idx is 1D_V_TS at step S124, the process at step S125 is omitted and the processing advances to step S126.

At step S126, the switch 134 decides whether or not the transform skip identifier ts_idx is 1D_H_TS (mode of one-dimensional transform skip in the horizontal direction) (ts_idx==1D_H_TS). In the case where it is decided that the transform skip identifier ts_idx is not 1D_H_TS, the processing advances to step S127.

At step S127, the inverse primary horizontal transform section 135 receives, for each transform block, transform coefficients Coeff_IPver after the inverse primary vertical transform and a matrix for an inverse primary horizontal transform IPThor as inputs thereto, performs matrix operation, and outputs a result of the matrix operation as a prediction residual D'. When the process at step S127 ends, the inverse transform process ends, and the processing returns to FIG. 12.

On the other hand, in the case where it is decided at step S126 that the transform skip identifier ts_idx is 1D_H_TS, the process at step S127 is omitted, and the inverse transform process ends and the processing returns to FIG. 12.

While the foregoing is a description of the process of the inverse primary transform section 123, rearrangement of the processing order of the steps or change of the substance of the processes may be performed as far as practicable. For example, the processes at steps S124 and S126 may be omitted while it is decided at step S123 whether or not the transform skip identifier ts_idx is 1D_V_TS (one-dimensional transform skip in the vertical direction). Then, in the case where it is decided at step S123 that the transform skip identifier ts_idx is 1D_V_TS, a unit matrix may be selected as the inverse primary vertical transform IPTver such that the process at step S125 is executed. Further, in the case where it is decided at step S123 that the transform skip identifier ts_idx is 1D_H_TS, a unit matrix may be selected as the inverse primary horizontal transform IPThor such that the process at step S127 is executed.

<Flow of Inverse Primary Transform Selection Process>

Figure 13:
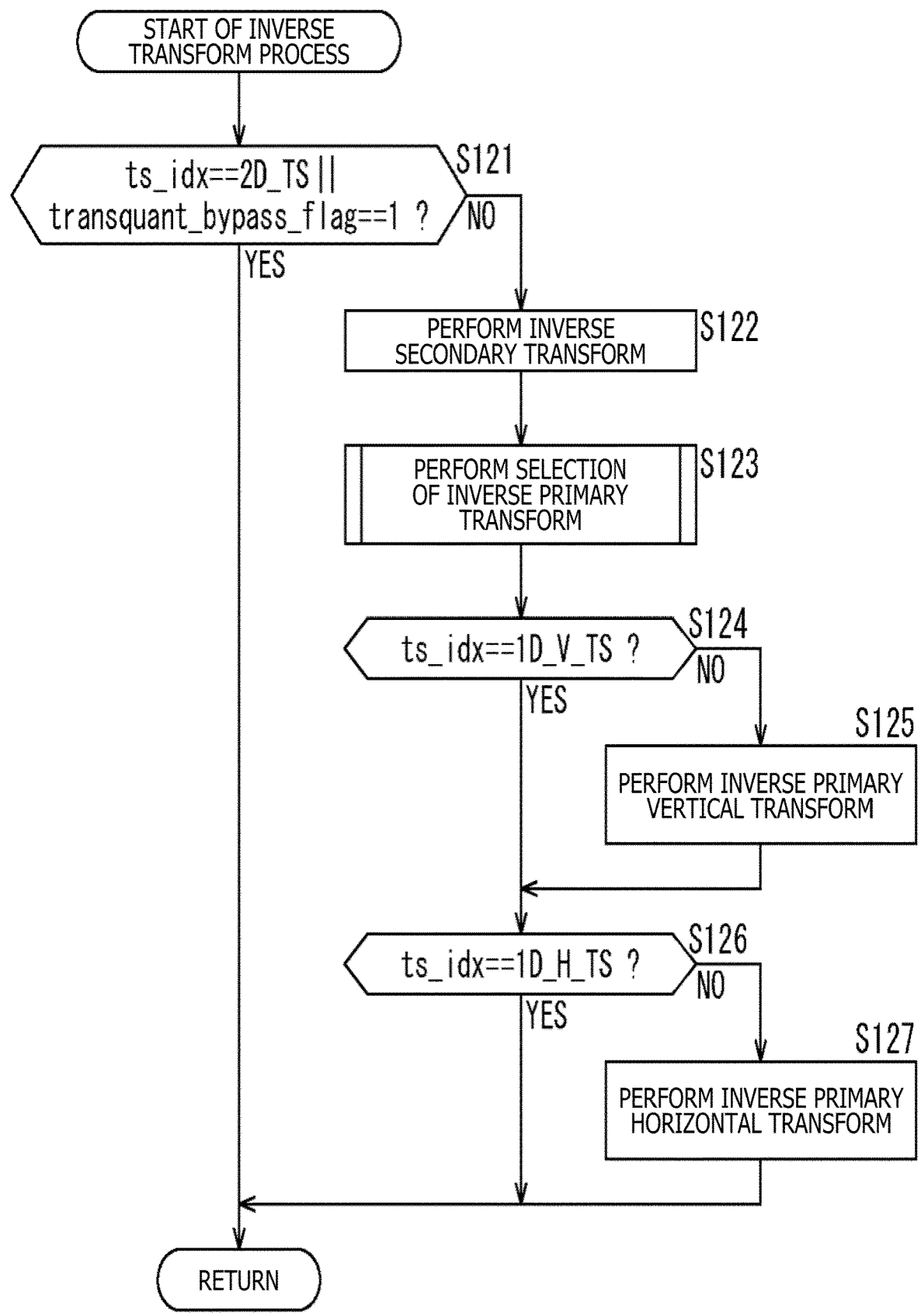
FIG. 13 is a flow chart illustrating an example of a flow of an inverse transform process.
Figure 14:
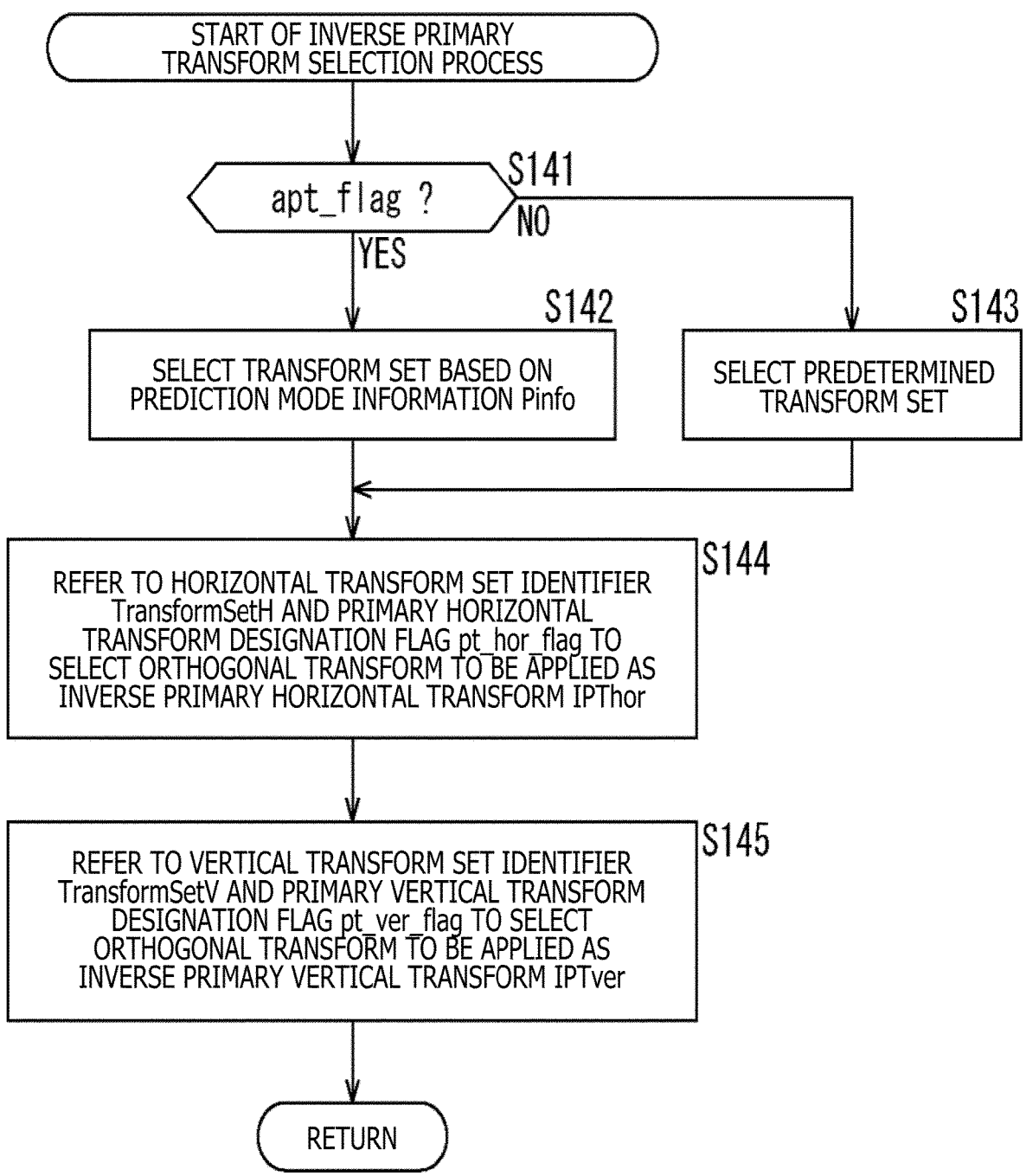
FIG. 14 is a flow chart illustrating an example of a flow of an inverse primary transform selection process.

Now, an example of a flow of the inverse primary transform selection process executed at step S123 of FIG. 13 is described with reference to a flow chart of FIG. 14.

After the inverse primary transform selection process is started, at step S141, the inverse primary transform selection section 131 decides whether or not the adaptive primary transform flag apt_flag is 1 (true). In the case where it is decided that the adaptive primary transform flag apt_flag is 1 (true), the processing advances to step S142. At step S142, the inverse primary transform selection section 131 selects, in regard to each of the inverse primary vertical transform and the inverse primary horizontal transform, a transform set in accordance with the expression (10) given hereinabove on the basis of the prediction mode information PInfo. After the process at step S142 ends, the processing advances to step S144.

On the other hand, in the case where it is decided at step S141 that the adaptive primary transform flag apt_flag is 0 (false), the processing advances to step S143. At step S143, the inverse primary transform selection section 131 selects a predetermined transform set. After the process at step S143 ends, the processing advances to step S144.

At step S144, the inverse primary transform selection section 131 refers to the primary horizontal transform set TransformSetH and the primary horizontal transform designation flag pt_hor_flag to select an orthogonal transform to be applied as the inverse primary horizontal transform IPThor in accordance with the expression (11) given hereinabove.

At step S145, the inverse primary transform selection section 131 refers to the vertical transform set identifier TransformSetV and the primary vertical transform designation flag pt_ver_flag to select an orthogonal transform to be applied as the inverse primary vertical transform IPTver in accordance with the expression (12) given hereinabove.

When the process at step S145 ends, the inverse primary transform selection process ends, and the processing returns to FIG. 13.

It is to be noted that this inverse primary transform selection process may be subjected to rearrangement of the processing order of the steps or change of the substance of the processes as far as practicable. For example, in the process at step S144, in the case of the transform skip identifier ts_idx==TS_1D_H_TS (in the case where a one-dimensional transform in the horizontal direction is to be skipped), an orthogonal transform IDT (unit matrix) that expressly indicates one-dimensional transform skip may be suppressed from being selected. Similarly, in the process at step S145, in the case of the transform skip identifier ts_idx==TS_1D_V_TS (in the case where a one-dimensional transform in the vertical direction is to be skipped), orthogonal transform IDT (unit matrix) that expressly indicates one-dimensional transform skip may be suppressed from being selected.

By executing the processes in such a manner as described above, the image decoding apparatus 100 can reduce the processing amount of an inverse transform for a residual signal, for which it is desirable to apply transform skip, and suppress reduction of the energy compaction, and can implement enhancement of the encoding efficiency.

More particularly, the inverse transform section 113 can decrease the processing amount of an inverse primary transform and suppress reduction of the energy compaction in regard to a residual signal for which it is desirable to skip a one-dimensional transform in the horizontal direction or the vertical direction, and can implement enhancement of the encoding efficiency. Especially, for a residual signal having a characteristic of a step edge by which the continuity of a signal changes rapidly in the horizontal direction, by skipping a one-dimensional transform in the horizontal direction and performing a one-dimensional transform in the vertical direction, non-zero coefficients can be concentrated efficiently on a low frequency region of frequency components in the vertical direction in comparison with those in an alternative case in which a two-dimensional orthogonal transform is performed. In particular, since the energy compaction can be enhanced, enhancement of the encoding efficiency can be implemented. Similarly, for a residual signal having a characteristic of a step edge by which the continuity of a signal changes rapidly in the vertical direction, by skipping a one-dimensional transform in the vertical direction and performing a one-dimensional transform in the horizontal direction, non-zero coefficients can be concentrated efficiently on a low frequency region of frequency components in the horizontal direction in comparison with those in an alternative case in which a two-dimensional orthogonal transform is performed. In particular, since the energy compaction can be enhanced, enhancement of the encoding efficiency can be implemented.

2. Second Embodiment

<Decoding of Primary Transform Identifier>

In JEM3, an adaptive primary transform flag apt_flag is decoded in a CU unit (=PU unit=TU unit), and a primary transform identifier pt_idx and a transform skip flag ts_flag are decoded in each transform block unit included in a CU. Further, from a primary transform identifier pt_idx, a primary horizontal transform designation flag pt_hor_flag and a primary vertical transform designation flag pt_ver_flag are derived in accordance with the expression (19) given below.

$$pt\_hor\_flag = pt\_idx \& 0x01$$

$$pt\_ver\_flag = pt\_idx \gg 1 (= (pt\_idx \& 0x10) \gg 1) \qquad (19)$$

In particular, the primary transform identifier pt_idx has a value of 2 bits, and the upper 1 bit corresponds to the primary vertical transform designation flag pt_ver_flag while the lower 1 bit corresponds to the primary horizontal transform designation flag pt_hor_flag. It is to be noted that, on the encoding side, derivation of the primary transform identifier pt_idx is performed in such a manner as indicated by the expression (20) given below.

$$pt\_idx = ((pt\_ver\_flag) \ll 1) + pt\_hor\_flag \qquad (20)$$

Accordingly, in the case where changes of (1) to (3) given below are applied to JEM3 of the related art as described hereinabove in connection with the first embodiment, since the transform skip identifier ts_idx decoded in a transform block unit is 1D_H_TS, since the primary horizontal transform designation flag pt_hor_flag is not used, it is redundant to encode/decode this information. Further, in the case where the transform skip identifier ts_idx indicates 1D_V_TS, since the primary vertical transform designation flag pt_ver_flag is not used, it is redundant to encode/decode this information.

(1) The transform skip flag ts_flag is expanded to the transform skip identifier ts_idx.

(2) When the transform skip identifier ts_idx is 1D_H_TS, an inverse secondary transform and an inverse primary horizontal transform are skipped.

(3) When the transform skip identifier ts_idx is 1D_V_TS, an inverse secondary transform and an inverse primary vertical transform are skipped.

Accordingly, in order to efficiently encode/decode a primary transform identifier pt_idx, such changes as described below may be applied.

(1) In the case of the transform skip identifier ts_idx=NO_TS, on the decoding side, a primary horizontal transform designation flag pt_hor_flag and a primary vertical transform designation flag pt_ver_flag are derived from a primary transform identifier pt_idx in accordance with the expression (19) given hereinabove. On the encoding side, a primary transform identifier pt_idx is derived from a primary horizontal transform designation flag pt_hor_flag and a primary vertical transform designation flag pt_ver_flag in accordance with the expression (20).

(2) When the transform skip identifier ts_idx is 1D_H_TS, on the decoding side, the primary vertical transform designation flag pt_ver_flag is derived as pt_ver_flag=pt_idx and the primary horizontal transform designation flag pt_hor_flag is derived as pt_hor_flag=−1 (predetermined value) in accordance with the expression (21) given below. On the encoding side, the primary transform identifier pt_idx is derived as pt_idx=pt_ver_flag in accordance with the expression (22) given below.

pt_ver_flag=pt_idx pt_hor_flag=−1(predetermined value)　　　　(21)

pt_idx=pt_ver_flag　　　　(22)

(3) When the transform skip identifier ts_idx is 1D_V_TS, on the decoding side, the primary horizontal transform designation flag pt_hor_flag is derived as pt_hor_flag=pt_idx and the primary vertical transform designation flag pt_ver_flag is derived as pt_ver_flag=−1 (predetermined value) in accordance with the expression (23) given below. On the encoding side, the primary transform identifier pt_idx is derived as pt_idx=pt_hor_flag in accordance with the expression (24) given below.

pt_hor_flag=pt_idx pt_ver_flag=−1 (predetermined value)　　　　(23)

pt_idx=pt_hor_flag　　　　(24)

(4) When the transform skip identifier ts_idx is 2D_TS, on the decoding side, the primary horizontal transform designation flag pt_hor_flag is derived as −1 (predetermined value) and the primary vertical transform designation flag pt_ver_flag is derived as pt_ver_flag=−1 (predetermined value) in accordance with the expression (25) given below. On the encoding side, encoding of the primary transform identifier pt_idx is omitted.

pt_hor_flag=−1 (predetermined value)

pt_ver_flag=−1 (predetermined value)　　　　(25)

By performing the changes described above, in the case where the transform skip identifier ts_idx is 1D_H_TS or 1D_V_TS, since the primary transform identifier pt_idx is arithmetically decoded/arithmetically encoded as a bin string of 1 bit, bin strings that become a decoding/encoding target can be reduced from those in an alternative case in which the primary transform identifier pt_idx is arithmetically decoded/arithmetically encoded as a bin string of 2 bits. Accordingly, increase of the code amount can be suppressed, and enhancement of the encoding efficiency can be implemented.

Further, in regard to a secondary transform, the secondary transform is a transform designed to enhance the energy compaction of transform coefficients to which a two-dimensional orthogonal transform is applied. Accordingly, there is the possibility that application of a secondary transform is applied to transform coefficients to which two-dimensional transform skip or one-dimensional transform skip is applied may conversely decrease the encoding efficiency. Therefore, in the case where the transform skip identifier ts_idx is 2D_TS, 1D_H_TS or 1D_V_TS, such a change that an inverse secondary transform is skipped is applied. In this case, it is redundant to encode/decode the secondary transform identifier st_idx that is a control parameter for a (inverse) secondary transform.

Therefore, in the case where the transform skip identifier ts_idx is 2D_TS, 1D_H_TS or 1D_V_TS, such a change may be applied that decoding of the secondary transform identifier st_idx is omitted and besides the value of the secondary transform identifier st_idx is estimated to the value (0) that indicates that a secondary transform is not performed. By this change, increase of the processing amount relating to decoding of the secondary transform identifier st_idx can be suppressed. Further, since a secondary transform is not applied to transform coefficients to which two-dimensional transform skip or one-dimensional transform skip is applied, decrease of the encoding efficiency can be prevented.

<Decoding of Transform Skip Identifier ts_idx>

Figure 15:
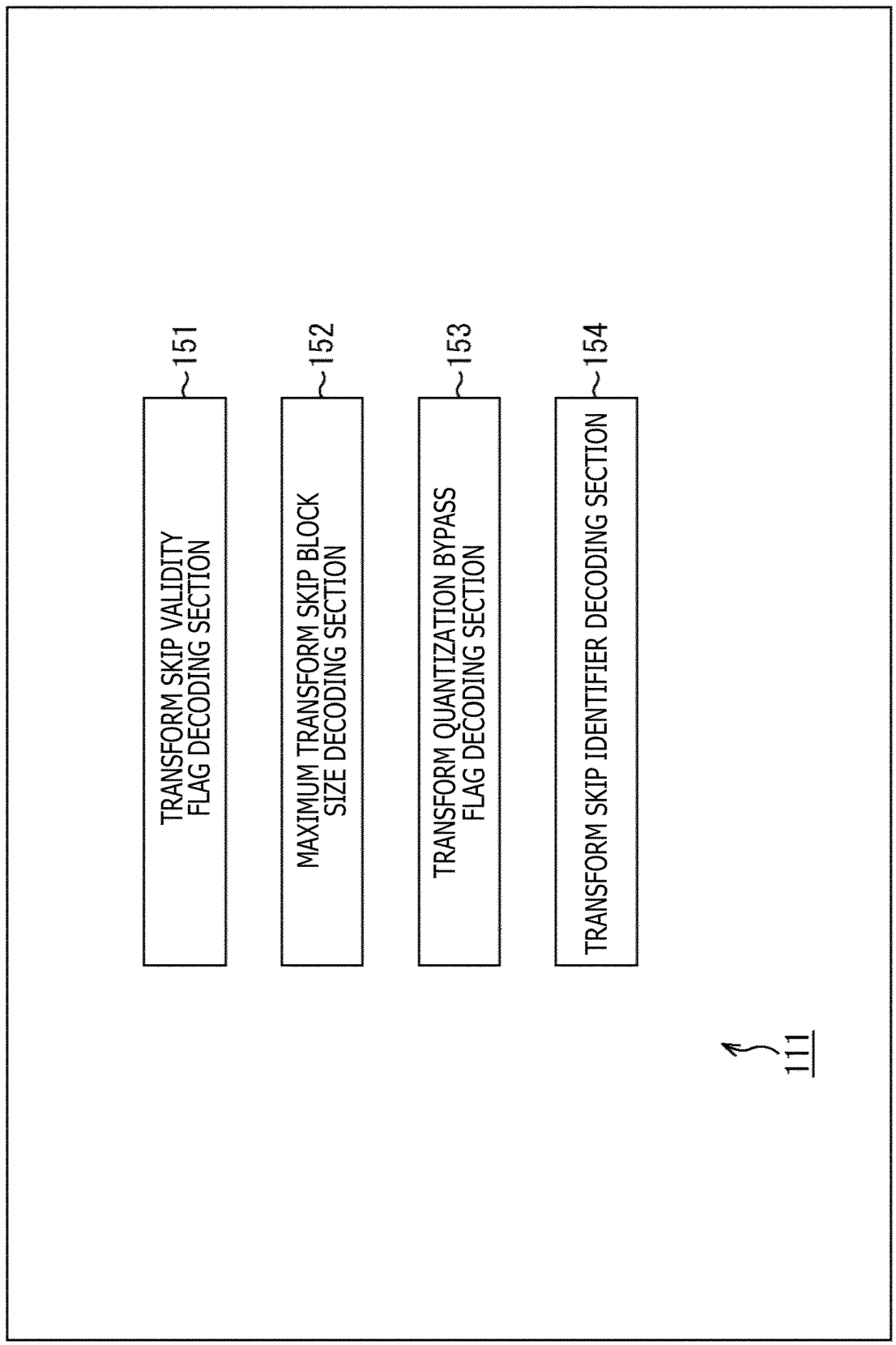
FIG. 15 is a block diagram depicting a principal configuration example of a decoding section.

FIG. 15 is a block diagram depicting a principal configuration example relating to decoding of the transform skip identifier ts_idx of the decoding section 111. As depicted in FIG. 15, the decoding section 111 in this case includes a transform skip validity flag decoding section 151, a maximum transform skip block size decoding section 152, a transform quantization bypass flag decoding section 153 and a transform skip identifier decoding section 154.

The transform skip validity flag decoding section 151 performs a process relating to decoding of a transform skip validity flag ts_enabled_flag. The maximum transform skip block size decoding section 152 performs a process relating for decoding of a maximum transform skip block size MaxTSSize. The transform quantization bypass flag decoding section 153 performs a process relating to decoding of a transform quantization bypass flag transquant_bypass_flag. The transform skip identifier decoding section 154 performs a process relating to decoding of a transform skip identifier ts_idx.

Figure 16:
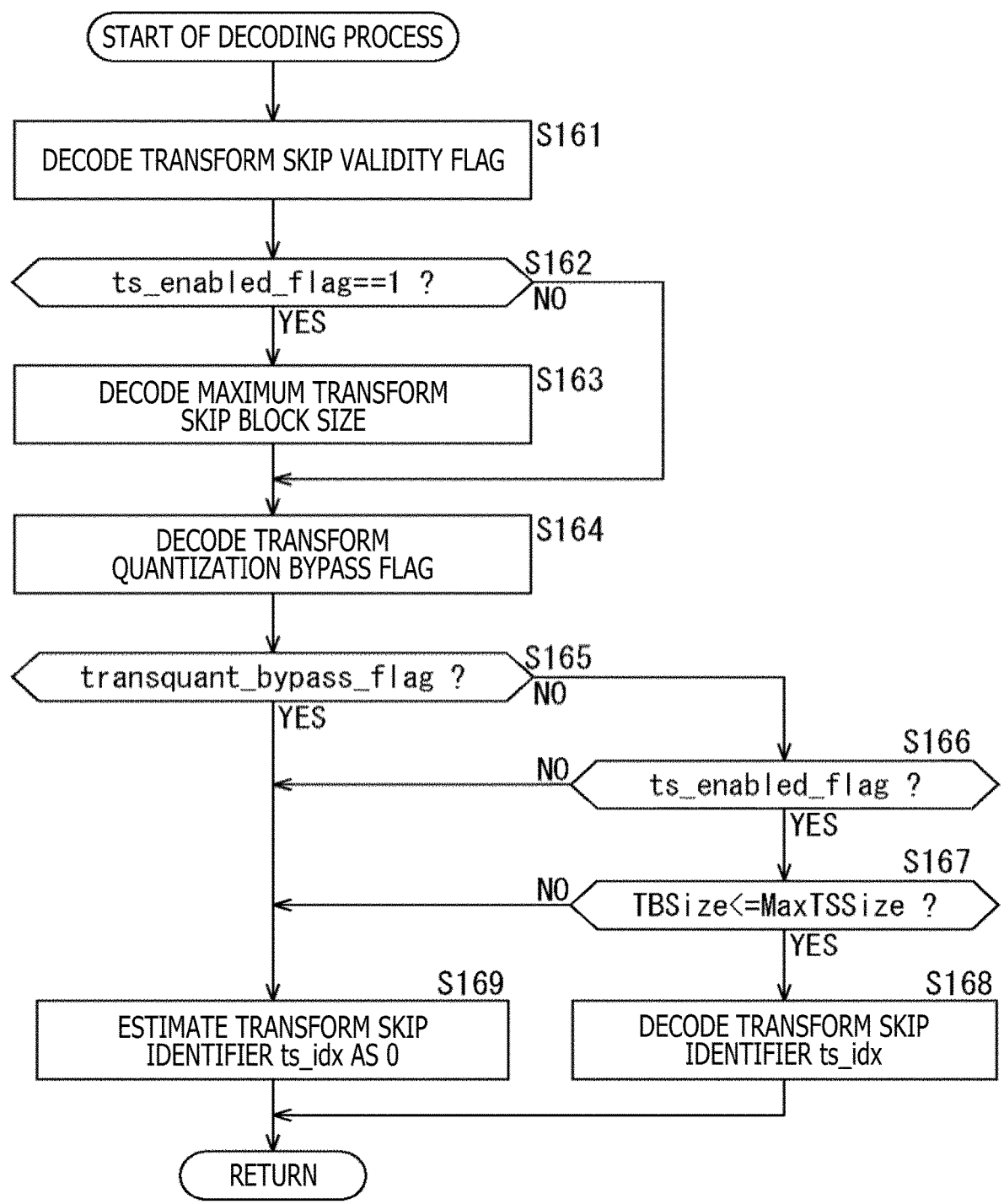
FIG. 16 is a flow chart illustrating an example of a flow of a decoding process.

An example of a flow of a decoding process relating to the transform skip identifier ts_idx, which is executed at step S101 of FIG. 12 by such a decoding section 111 as described above, is described with reference to a flow chart of FIG. 16.

After a decoding process is started, at step S161, the transform skip validity flag decoding section 151 decodes the transform skip validity flag ts_enabled_flag from a bit string of encoded data #1 and outputs the decoded transform skip validity flag ts_enabled_flag as part of the header information Hinfo.

At step S162, the maximum transform skip block size decoding section 152 decides whether or not the transform skip validity flag ts_enabled_flag included in the header information HInfo is 1 (true). In the case where it is decided that the transform skip validity flag ts_enabled_flag is 1, the processing advances to step S163.

At step S163, the maximum transform skip block size decoding section 152 decodes a maximum transform skip block size MaxTSSize (or a logarithm log 2MaxTSSize with the base 2) from a bit string of the encoded data #1. After the process at step S163 ends, the processing advances to step S164. On the other hand, in the case where it is decided at step S162 that the transform skip validity flag ts_enabled_flag is 0, the process at step S163 is omitted and the processing advances to step S164.

At step S164, the transform quantization bypass flag decoding section 153 decodes the transform quantization bypass flag transquant_bypass_flag from the bit string of the encoded data #1 and outputs the decoded transform quantization bypass flag transquant_bypass_flag as part of the transform information Tinfo.

At step S165, the transform skip identifier decoding section 154 decides whether or not the transform quantization bypass flag transquant_bypass_flag included in the transform information Tinfo is 1 (true). In the case where it is decided that the transform quantization bypass flag transquant_bypass_flag is 1, the processing advances to S169. On the other hand, in the case where it is decided at step S165 that the transform quantization bypass flag transquant_bypass_flag is 0, the processing advances to step S166.

At step S166, the transform skip identifier decoding section 154 decides whether or not the transform skip validity flag ts_enabled_flag included in the header information Hinfo is 1 (true). In the case where it is decided that the transform skip validity flag ts_enabled_flag is 0, the processing advances to step S169. On the other hand, in the case where it is decided at step S166 that the transform skip validity flag ts_enabled_flag is 1, the processing advances to step S167.

At step S167, the transform skip identifier decoding section 154 decides whether or not a size TBSize of the transform block of a processing target is equal to or smaller than the maximum transform skip block size MaxTSSize (whether or not the logical value of the conditional expression (TBSize<=MaxTSSize) is 1 (true)). It is to be noted that, in the conditional expression (TBSize<=MaxTSSize), TBSize is derived in accordance with the expression (26) given below. In the case of the expression (26), the value of a greater one of the vertical size TBHSize and the horizontal size TBWSize of the transform block is TBSize.

$$TBSize=max(TBWSize, TBHSize) \quad (26)$$

In place of the expression (26), the expression (27) given below may be used. In the case of the expression (27), the value obtained by multiplying the vertical size TBHSize and the horizontal size TBWSize of the transform block is TBSize.

$$TBSize=TBWSize*TBHSize \quad (27)$$

In the expressions (26) and (27), TBSize, TBWSize and TBHSize may be replaced by logarithms log 2TBSize, log 2TBWSize and log 2TBHSize with the base 2, respectively. In this case, the expression (26) is replaced by the expression (28) given below, and the expression (27) is replaced by the expression (29) given below. It is to be noted that, in the case where logarithms are used, TBSize and the maximum transform skip block size MaxTSSize of the conditional expression (TBSize<=MaxTSSize) given hereinabove are replaced by corresponding logarithms log 2TBSize and log 2MaxTSSize, respectively.

$$\log 2TBSize=max(\log 2TBWSize, \log 2TBHSize) \quad (28)$$

$$\log 2TBSize=\log 2TBWSize+\log 2TBHSize \quad (29)$$

In the case where it is decided at step S167 that the size TBSize of the transform block of the processing target is greater than the maximum transform skip block size MaxTSSize (the logical value of the conditional expression (TBSize<=MaxTSSize) is 0 (false)), the processing advances to step S169. On the other hand, in the case where it is decided at step S167 that the size TBSize of the transform block of the processing target is equal to or smaller than the maximum transform skip block size MaxTSSize (the logical value of the conditional expression (TBSize<=MaxTSSize) is 1 (true)), the processing advances to step S168.

At step S168, the transform skip identifier decoding section 154 decodes the transform skip identifier ts_idx from the bit string of the encoded data #1 and outputs the transform skip identifier ts_idx as part of the transform information Tinfo. When the process at step S168 ends, the decoding process relating to a transform skip identifier ends and the processing returns to FIG. 12.

On the other hand, at step S169, the transform skip identifier decoding section 154 estimates that the value of ts_idx is NO_TS (=0) omitting decoding of the transform skip identifier ts_idx, and sets the value to ts_idx. In other words, ts_idx becomes ts_idx=NO_TS. When the process at step S169 ends, the decoding process relating to a transform skip identifier ends and the processing returns to FIG. 12.

A syntax table in which pseudo codes of the processes at steps S165 to S169 are described is depicted in FIG. 17. A conditional expression (second row from above) of an if statement to which reference symbol SYN11 is appended in FIG. 17 can be represented as in the conditional expression (30) given below, and this particularly is equivalent to a branching decision at steps S165 to S167 described hereinabove with reference to FIG. 16. Further, the process at step S168 of FIG. 16 corresponds to the decoding (encoding) process of syntax ts_flag to which reference symbol SYN12 is appended in FIG. 17.

Logical value=(ts_enabled_flag&&

!transquant_bypass_flag&&

(log 2TBSize<=log 2MaxTSSize)) (30)

While processes relating to decoding of the transform skip identifier ts_idx is described in the foregoing description, rearrangement of the processing order of or change of the substance of the processes at the individual steps may be changed as far as practicable. Further, the conditional expression (30) can be changed in arithmetic operation as far as practicable.

By performing the processes in such a manner as described above, in comparison with the case of JEM3, two-dimensional transform skip or one-dimensional transform skip in the horizontal direction or the vertical direction can be adaptively selected in a transform block unit on the decoding side. Accordingly, since a residual signal for which one-dimensional transform skip is more effective than before can be decoded by a mode of one-dimensional transform skip, enhancement of the encoding efficiency can be implemented.

<Decoding of Primary Transform Identifier pt_idx>

FIG. 18 is a block diagram depicting a principal configuration example relating to decoding of a primary transform identifier pt_idx of the decoding section 111. As depicted in FIG. 18, the decoding section 111 includes a primary transform validity flag decoding section 161, an adaptive primary transform flag decoding section 162 and a primary transform identifier decoding section 163.

The primary transform validity flag decoding section 161 performs a process relating to decoding of a primary transform validity flag pt_enabled_flag. The adaptive primary transform flag decoding section 162 performs a process relating to decoding of a primary transform flag pt_enabled_flag. The primary transform identifier decoding section 163 performs a process relating to decoding of a primary transform identifier pt_idx.

An example of a flow of the decoding process relating to a primary transform identifier pt_idx, which is executed at step S101 of FIG. 12 by such a decoding section 111 as described above is described with reference to a flow chart of FIG. 19.

After a decoding process is started, at step S181, the primary transform validity flag decoding section 161 decodes the primary transform validity flag pt_enabled_flag from the bit string of the encoded data #1 and outputs the decoded primary transform validity flag pt_enabled_flag as part of the header information Hinfo.

At step S182, the adaptive primary transform flag decoding section 162 decides whether or not the primary transform validity flag pt_enabled_flag included in the header information Hinfo is 1 (true). In the case where it is decided that the primary transform validity flag pt_enabled_flag is 0 (false), the processing advances to step S183.

At step S183, the adaptive primary transform flag decoding section 162 omits encoding of the adaptive primary transform flag apt_flag and estimates that the value of the flag is 0. After the process at step S183 ends, the processing advances to step S193.

On the other hand, in the case where it is decided at step S182 that the primary transform validity flag pt_enabled_flag is 1 (true), the processing advances to step S184. At step S184, the adaptive primary transform flag decoding section 162 decodes the adaptive primary transform flag apt_flag from the bit string of the encoded data #1.

At step S185, the primary transform identifier decoding section 163 decides whether or not the adaptive primary transform flag apt_flag is 1 (true). In the case where it is decided that the adaptive primary transform flag apt_flag is 0 (false), the processing advances to step S193. On the other hand, in the case where it is decided at step S185 that the adaptive primary transform flag apt_flag is 1 (true), the processing advances to step S186.

At step S186, the primary transform identifier decoding section 163 decides whether or not the transform quantization bypass flag transquant_bypass_flag is 1 (true). In the case where it is decided that the transform quantization bypass flag transquant_bypass_flag is 1 (true), the processing advances to step S193. On the other hand, in the case where it is decided at step S186 that the transform quantization bypass flag transquant_bypass_flag is 0 (false), the processing advances to step S187.

At step S187, the primary transform identifier decoding section 163 decides whether or not the transform skip identifier ts_idx is 2D_TS (two-dimensional transform skip).

In the case where it is decided that the transform skip identifier ts_idx is 2D_TS, the processing advances to step S193. On the other hand, in the case where it is decided at step S187 that the transform skip identifier ts_idx is any other than 2D_TS, the processing advances to step S188.

At step S188, the primary transform identifier decoding section 163 decides whether or not both the vertical size (TBHSize) and the horizontal size (TBWSize) of the transform block are equal to or smaller than a maximum adaptive primary transform block size MaxPTSize (max(TBHSize, TBWSize)<=MaxPTSize). In the case where it is decided that at least one of the vertical size or the horizontal size of the transform block is greater than the maximum adaptive primary transform block size MaxPTSize, the processing advances to step S193. On the other hand, in the case where it is decided at step S188 that both the vertical size and the horizontal size of the transform block are equal to or smaller than the maximum adaptive primary transform block size MaxPTSize, the processing advances to step S189.

At step S189, the primary transform identifier decoding section 163 decides whether or not the transform block of the decoding target is a luminance component. In the case where it is decided that the transform block of the decoding target is not a luminance component, the processing advances to step S193. On the other hand, in the case where it is decided at step S189 that the transform block of the decoding target is a luminance component, the processing advances to step S190.

At step S190, the primary transform identifier decoding section 163 refers to the residual information Rinfo to derive a sum total numSig (total number of sig_coeff_flag==1) of non-zero transform coefficients existing in the transform block.

At step S191, the primary transform identifier decoding section 163 decides whether or not the total number numSig of non-zero transform coefficients is equal to or greater than a predetermined threshold value ptNumSigTH (numSig>=ptNumSigTH). In the case where it is decided that the total number numSig of non-zero transform coefficients is smaller than the predetermined threshold value ptNumSigTH, the processing advances to step S193. On the other hand, in the case where it is decided at step S191 that the total number numSig of non-zero transform coefficients is equal to or greater than the predetermined threshold value ptNumSigTH (numSig>=ptNumSigTH is satisfied), the processing advances to step S192.

At step S192, the primary transform identifier decoding section 163 decodes the primary transform identifier pt_idx from the bit string of the encoded data #1. After the process at step S192 ends, the processing advances to step S193.

At step S193, the primary transform identifier decoding section 163 refers to the transform skip identifier ts_idx and the primary transform identifier pt_idx decoded already to derive a primary horizontal transform designation flag pt_hor_flag and a primary vertical transform designation flag pt_ver_flag. When the process at step S193 ends, the decoding process ends and the processing returns to FIG. 12.

A syntax table in which pseudo codes of the processes at steps S185 to S192 described above is described is depicted in FIG. 17. A conditional expression of an if statement to which reference symbol SYN13 is appended in FIG. 17 (conditional expression (31) given below) is equivalent to a branch decision at steps S185 to S192. Step S192 corresponds to the decoding process of syntax pt_idx to which reference symbol SYN14 is appended in FIG. 17. It is to be noted that, in the expression (31), the condition at step S188 is omitted. The expression including the condition at step S188 is represented by the expression (32).

$$\begin{aligned}&\text{Logical value}=(\text{apt\_flag}\\&!\text{transquant\_bypass\_flag}\&\&\\&\text{ts\_idx}!=2\text{D\_TS}\&\&\\&\text{isLuma}(c\text{Idx}==0)\&\&\\&\text{numSig}>=\text{ptNumSigTH})\end{aligned} \quad (31)$$

$$\begin{aligned}&\text{Logical value}=(\text{apt\_flag}\\&!\text{transquant\_bypass\_flag}\&\&\\&\text{ts\_idx}!=2\text{D\_TS}\&\&\\&\max(\text{TBW},\text{TBH})<=\text{MaxPTSize}\&\&\\&\text{isLuma}(c\text{Idx}==0)\&\&\\&\text{numSig}>=\text{ptNumSigTH})\end{aligned} \quad (32)$$

While processes relating to decoding of the primary transform identifier pt_idx are described in the foregoing description, rearrangement of the processing order or the substance of the processes at the individual steps may be changed as far as practicable.

Figure 19:
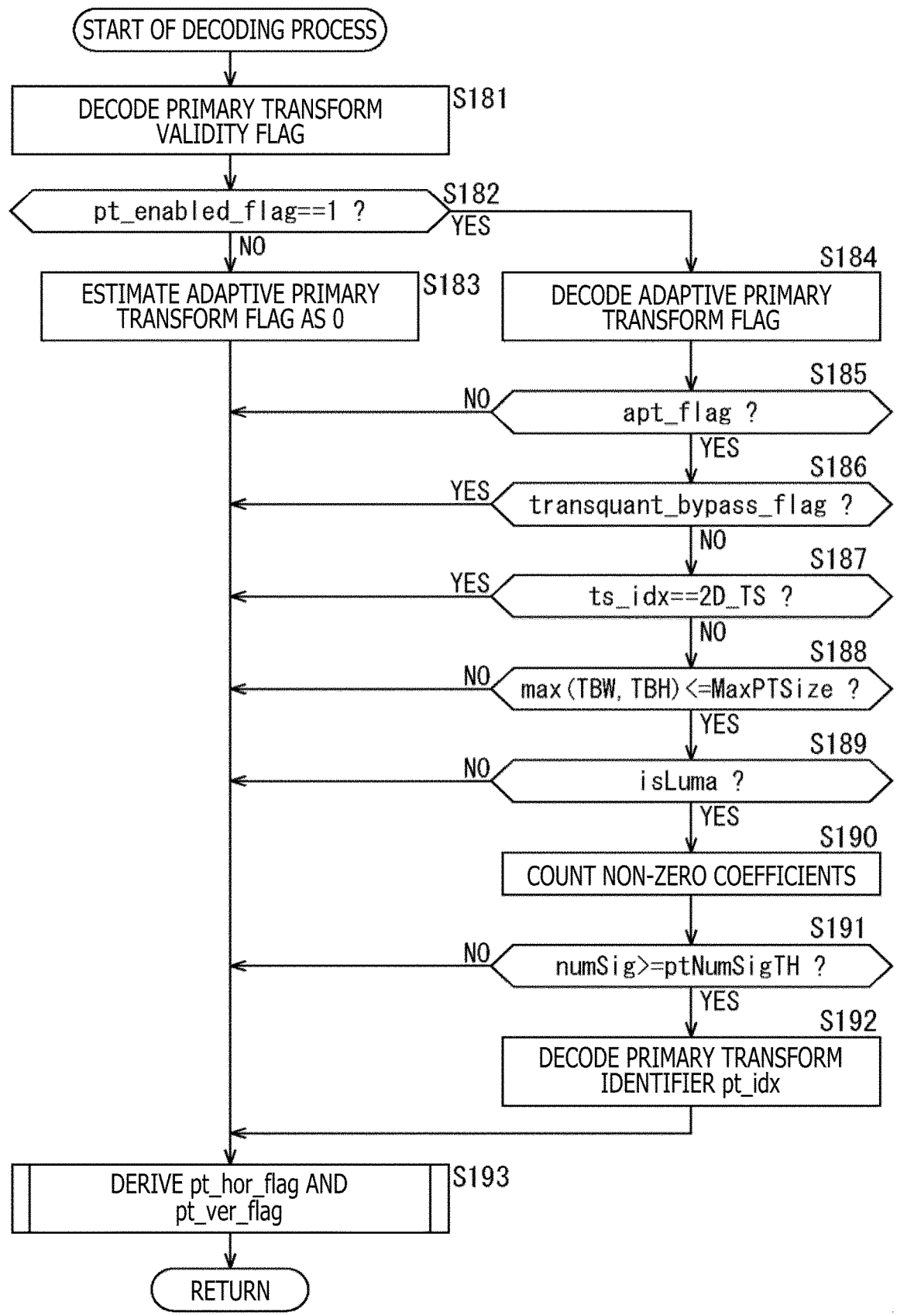
FIG. 19 is a flow chart illustrating an example of a flow of a decoding process.
Figure 20:
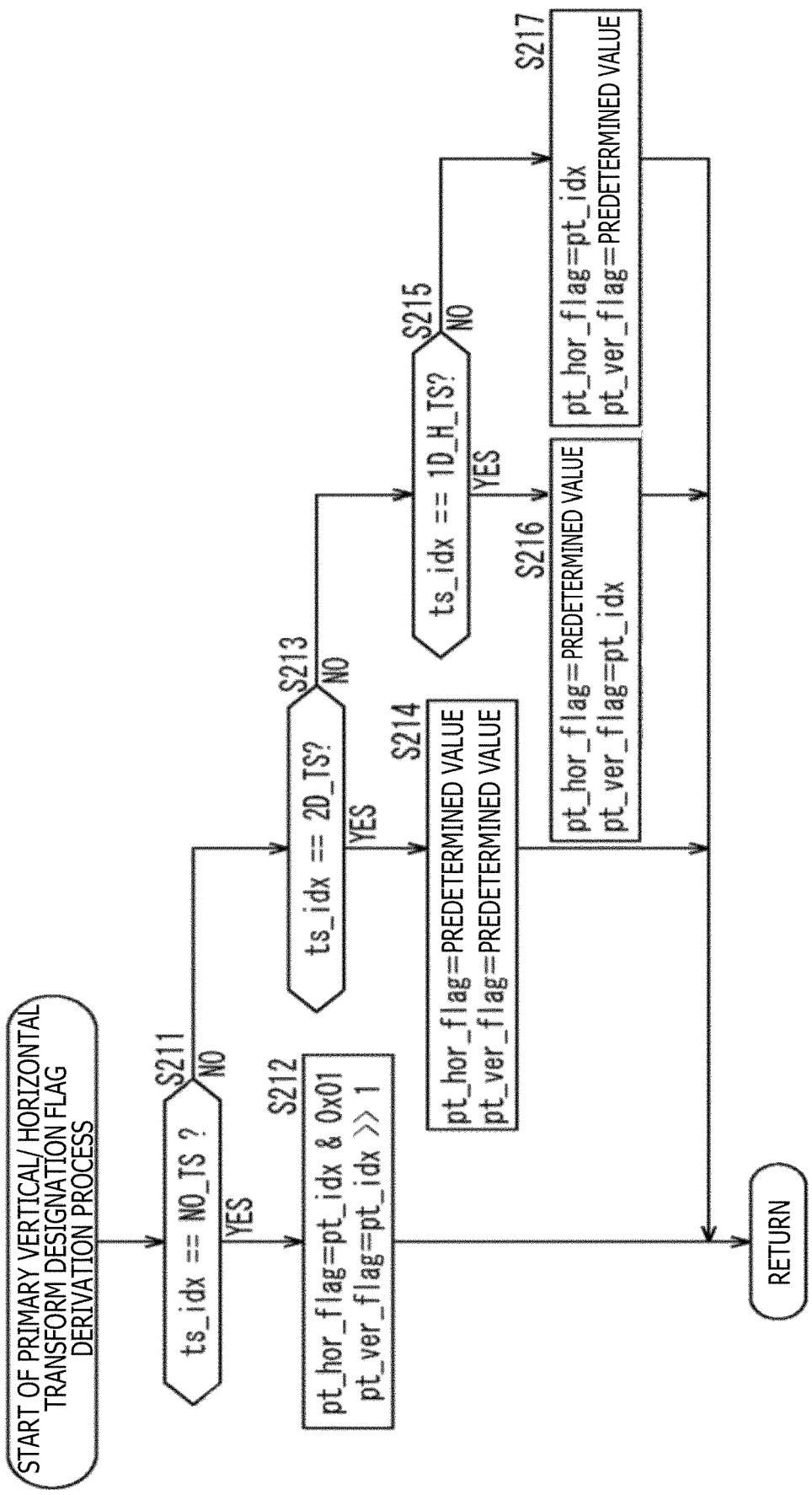
FIG. 20 is a flow chart illustrating an example of a flow of a primary vertical/horizontal transform designation flag derivation process.

Now, a process (primary vertical/horizontal transform designation flag derivation process) relating to derivation of a primary horizontal transform designation flag pt_hor_flag and a primary vertical transform designation flag pt_ver_flag, which is executed at step S193 of FIG. 19, is described with reference to a flow chart of FIG. 20.

After the primary vertical/horizontal transform designation flag derivation process is started, the primary transform identifier decoding section 163 decides at step S211 whether or not the transform skip identifier ts_idx is NO_TS (not transform skip). In the case where it is decided that the transform skip identifier ts_idx is NO_TS, the processing advances to step S212.

At step S212, the primary transform identifier decoding section 163 derives the primary horizontal transform designation flag pt_hor_flag and the primary vertical transform flag pt_ver_flag in accordance with the expression (19) given hereinabove. In short, the primary transform identifier pt_idx is processed as a bin string of 2 bits, and a primary horizontal transform designation flag pt_hor_flag and a primary vertical transform flag pt_ver_flag are derived from the 2 bits. When the process at step S212 ends, the primary vertical/horizontal transform designation flag derivation process ends and the processing returns to FIG. 19.

In the case where it is decided at step S212 that the transform skip identifier ts_idx is any other than NO_TS, the processing advances to step S213. At step S213, the primary transform identifier decoding section 163 decides whether or not the transform skip identifier ts_idx is 2D_TS (two-dimensional transform skip). In the case where it is decided that the transform skip identifier ts_idx is 2D_TS, the processing advances to step S214.

At step S214, the primary transform identifier decoding section 163 derives the primary horizontal transform designation flag pt_hor_flag and the primary vertical transform flag pt_ver_flag in accordance with the expression (25) given hereinabove. In short, decoding of the primary transform identifier pt_idx is omitted and the primary horizontal transform designation flag pt_hor_flag and the primary vertical transform flag pt_ver_flag are set to predetermined values. When the process at step S214 ends, the primary vertical/horizontal transform designation flag derivation process ends and the processing returns to FIG. 19.

In the case where it is decided at step S213 that the transform skip identifier ts_idx is any other than 2D_TS, the processing advances to step S215. At step S215, the primary transform identifier decoding section 163 decides whether or not the transform skip identifier ts_idx is 1D_H_TS (one-dimensional transform skip in the horizontal direction). In the case where it is decided that the transform skip identifier ts_idx is 1D_H_TS, the processing advances to step S216.

At step S216, the primary transform identifier decoding section 163 derives the primary horizontal transform designation flag pt_hor_flag and the primary vertical transform flag pt_ver_flag in accordance with the expression (21) given hereinabove. In short, the primary transform identifier pt_idx is processed as a bin string of 1 bit, and the primary horizontal transform designation flag pt_hor_flag is set to the predetermined value and the primary vertical transform flag pt_ver_flag is set to the value of the primary transform identifier pt_idx. When the process at step S216 ends, the primary vertical/horizontal transform designation flag derivation process ends and the processing returns to FIG. 19.

In the case where it is decided at step S215 that the transform skip identifier ts_idx is any other than 1D_H_TS, the processing advances to step S217. At step S217, the primary transform identifier decoding section 163 derives the primary horizontal transform designation flag pt_hor_flag and the primary vertical transform flag pt_ver_flag in accordance with the expression (23) given hereinabove. In short, the primary transform identifier pt_idx is processed as a bin string of 1 bit, and the primary horizontal transform designation flag pt_hor_flag is set to the value of the primary transform identifier pt_idx and the primary vertical transform flag pt_ver_flag is set to the predetermined value. When the process at step S217 ends, the primary vertical/horizontal transform designation flag derivation process ends and the processing returns to FIG. 19.

While the foregoing description is directed to processes relating to derivation of the primary horizontal transform designation flag pt_hor_flag and the primary vertical transform designation flag pt_ver_flag, rearrangement of the processing order of the steps or change of the substance of the processes may be performed as far as practicable.

Since, in the case where the transform skip identifier ts_idx is 1D_H_TS or 1D_V_TS, the primary transform identifier pt_idx can be arithmetically decoded as a bin string of 1 bit as described above, the bin string that becomes a decoding target can be reduced from that in an alternative case in which the primary transform identifier pt_idx is arithmetically decoded as a bin string of 2 bits. Accordingly, the processing amount relating to decoding of the primary transform identifier pt_idx can be reduced. Further, since the code amount can be reduced, also enhancement of the encoding efficiency can be implemented.

<Decoding of Secondary Transform Identifier st_idx>

Figure 21:
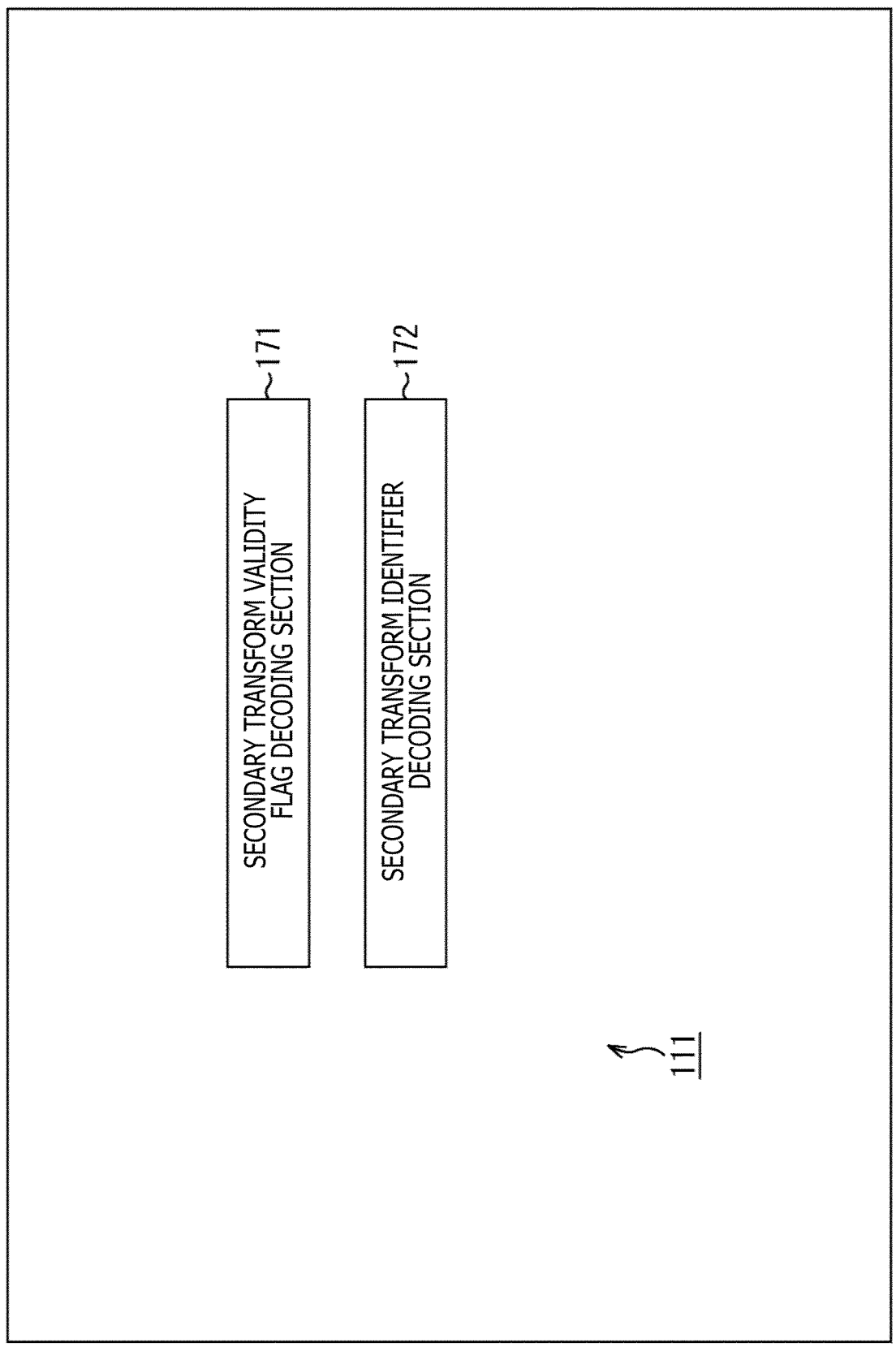
FIG. 21 is a block diagram depicting a principal configuration example of a decoding section.

FIG. 21 is a block diagram depicting a principal configuration example relating to decoding of the secondary transform identifier st_idx of the decoding section 111. As depicted in FIG. 21, the decoding section 111 in this case includes a secondary transform validity flag decoding section 171 and a secondary transform identifier decoding section 172.

The secondary transform validity flag decoding section 171 performs a process relating to decoding of a secondary transform validity flag st_enabled_flag. The secondary transform identifier decoding section 172 performs a process relating to decoding of a secondary transform identifier st_idx.

Figure 22:
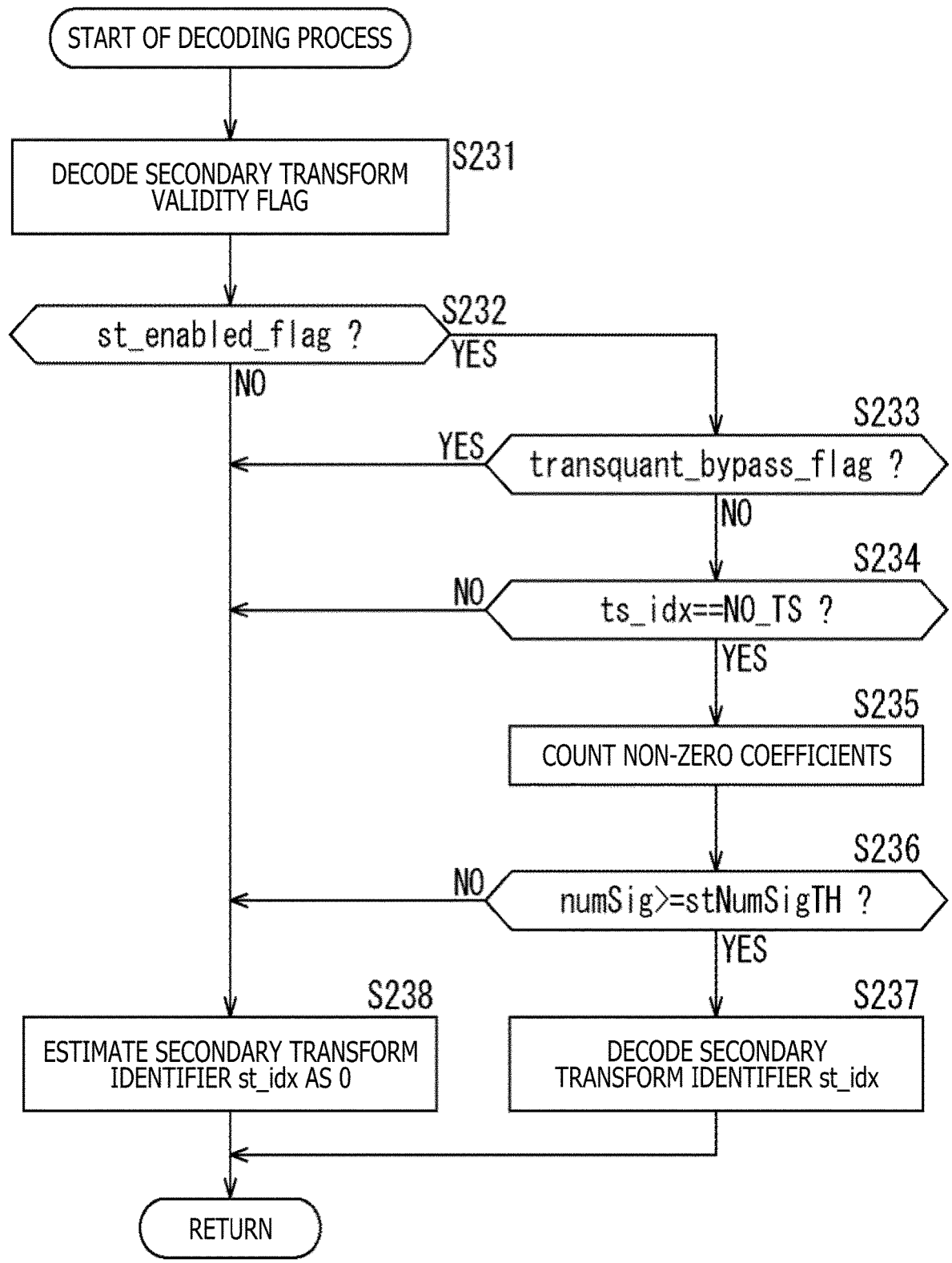
FIG. 22 is a flow chart illustrating an example of a flow of a decoding process.

An example of a flow of a decoding process relating to the secondary transform identifier st_idx, which is executed at step S101 of FIG. 12 by such a decoding section 111 as described, is described with reference to a flow chart of FIG. 22.

After the decoding process is started, at step S231, the secondary transform validity flag decoding section 171 decodes a secondary transform validity flag st_enabled_flag from the bit string of the encoded data #1 and outputs the secondary transform validity flag st_enabled_flag as part of the header information Hinfo.

At step S232, the secondary transform identifier decoding section 172 decides whether or not the secondary transform validity flag st_enabled_flag included in the header information Hinfo is 1 (true). In the case where it is decided that the secondary transform validity flag st_enabled_flag is 0 (false), the processing advances to step S238. On the other hand, in the case where it is decided at step S232 that the secondary transform validity flag st_enabled_flag is 1 (true), the processing advances to step S233.

At step S233, the secondary transform identifier decoding section 172 decides whether or not the transform quantization bypass flag transquant_bypass_flag is 1 (true). In the case where it is decided that the transform quantization bypass flag transquant_bypass_flag is 1 (true), the processing advances to step S238. On the other hand, in the case where it is decided step S233 that the transform quantization bypass flag transquant_bypass_flag is 0 (false), the processing advances to step S234.

At step S234, the secondary transform identifier decoding section 172 decides whether or not the transform skip identifier ts_idx is NO_TS (transform skip is not to be performed). In the case where it is decided that the transform skip identifier ts_idx is any other than NO_TS, then processing advances to step S238. On the other hand, in the case where it is decided at step S234 that the transform skip identifier ts_idx is NO_TS, the processing advances to step S235.

At step S235, the secondary transform identifier decoding section 172 refers to the residual information Rinfo to derive a total number numSig (total number of sig_coeff_flag==1) of non-zero transform coefficients existing in the transform block. After the process at step S235 ends, the processing advances to step S236.

At step S236, the secondary transform identifier decoding section 172 decides whether or not the total number numSig of non-zero transform coefficients is equal to or greater than a predetermine threshold value TH (numSig>=stNumSigTH). In the case where it is decided that the total number numSig of non-zero transform coefficients is smaller than the predetermined threshold value TH (namely, numSig<stNumSigTH is satisfied), the processing advances to step S238.

On the other hand, in the case where it is decided at step S236 that the total number numSig of non-zero transform coefficients is later than the predetermined threshold value TH (namely, numSig>=stNumSigTH is satisfied), the processing advances to step S237.

At step S237, the secondary transform identifier decoding section 172 decodes the secondary transform identifier st_idx from the bit string of the encoded data #1. When the process at step S237 ends, the decoding process ends and the processing returns to FIG. 12.

On the other hand, at step S238, the secondary transform identifier decoding section 172 omits decoding of the secondary transform identifier st_idx and estimates that the value of the secondary transform identifier st_idx is 0, and sets the value to st_idx. In other words, st_idx becomes st_idx=0. When the process at step S238 ends, the decoding process ends and the processing returns to FIG. 12.

A syntax table in which pseudo codes at steps S232 to S238 (except steps S235 and S237) are described is depicted in FIG. 23. A conditional expression of an if statement to which reference symbol SYN19 is appended in FIG. 23 (conditional expression (33) given below) is equivalent to a branch decision at steps S232 to S238. Further, a syntax to which reference symbol SYN20 is appended in FIG. 23 corresponds to the process at step S237 of FIG. 22.

Logical value=(st_enabled_flag&&

(transquant_bypass_flag==0|| ts_idx==NO_TS)&& numSig>=stNumSigTH)                  (33)

While processes relating to decoding of the secondary transform identifier st_idx is described in the foregoing description, rearrangement of the processing order or change of the substance of the processes at the individual steps may be changed as far as practicable. Further, the conditional expression (33) can be changed in terms of the arithmetic operation as far as practicable. It is to be noted that, while, in the foregoing description, the control parameter for a secondary transform is the secondary transform identifier st_idx, it may otherwise be a secondary transform flag st_flag.

By applying the present technology in such a manner as described above, in comparison with the related art, it is possible to omit, in the case where a secondary transform identifier is to be decoded in a transform block unit, a decoding process of a secondary transform identifier in the case where two-dimensional transform skip or one-dimensional transform skip is to be applied (in the case where ts_idx !=NO_TS). In other words, the processing amount relating to decoding of a secondary transform identifier can be reduced.

3. Third Embodiment

<Decoding of Primary Horizontal Transform Designation Flag and Primary Vertical Transform Designation Flag>

Although it is described in the foregoing description that a primary horizontal transform designation flag pt_hor_flag and a primary vertical transform designation flag pt_ver_flag are derived from a decoded primary transform identifier pt_idx, this is not restrictive. For example, in place of decoding a primary transform identifier pt_idx from encoded data #1, a primary horizontal transform designation flag pt_hor_flag and a primary vertical transform designation flag pt_ver_flag may be decoded directly from encoded data.

Figure 24:
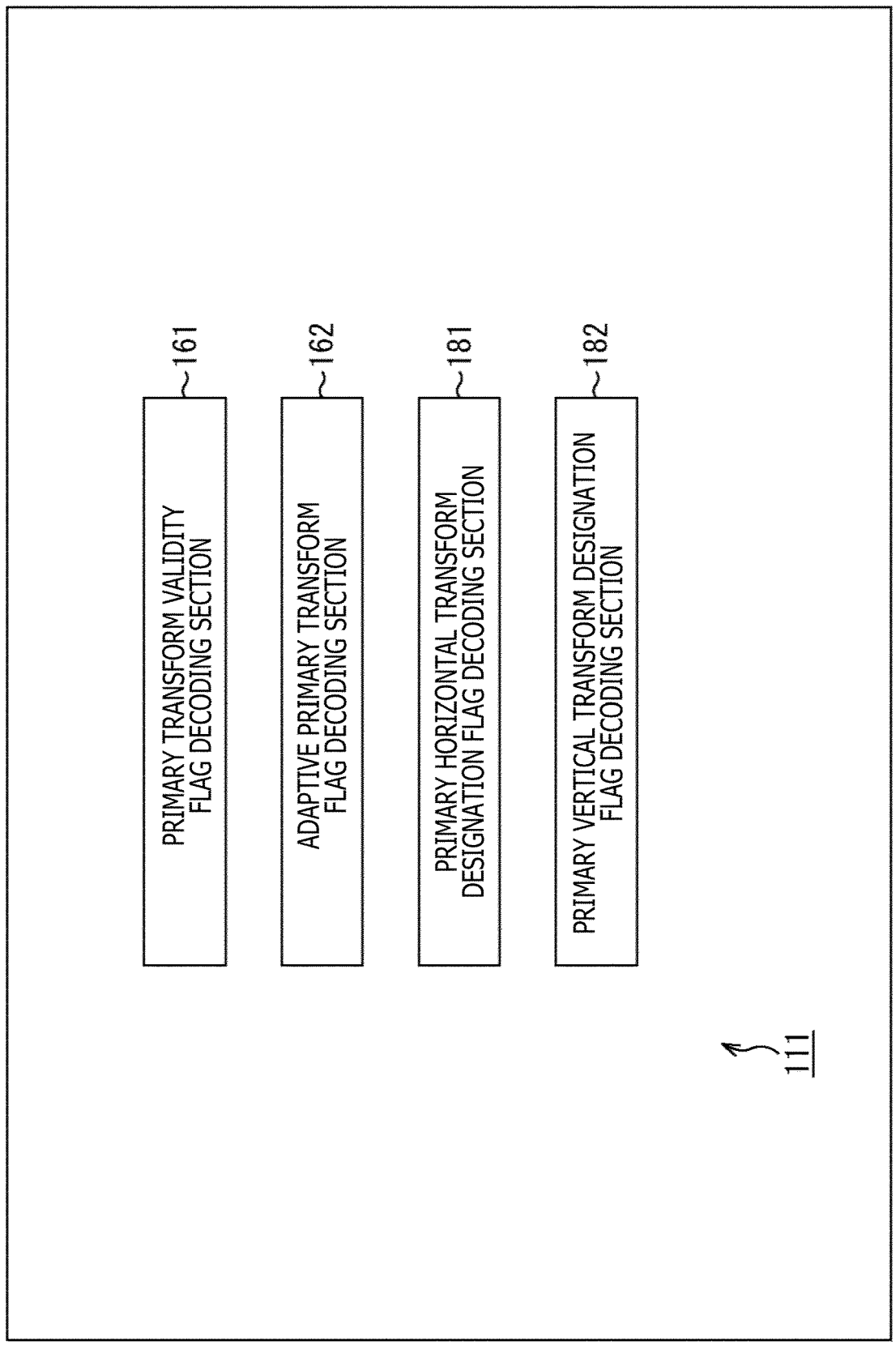
FIG. 24 is a block diagram depicting a principal configuration example of a decoding section.

FIG. 24 is a block diagram depicting a principal configuration example relating to decoding of a primary horizontal transform designation flag pt_hor_flag and a primary vertical transform designation flag pt_ver_flag of the decoding section 111. As depicted in FIG. 24, the decoding section 111 in this case includes a primary transform validity flag decoding section 161, an adaptive primary transform flag decoding section 162, a primary horizontal transform designation flag decoding section 181 and a primary vertical transform designation flag decoding section 182.

The primary horizontal transform designation flag decoding section 181 performs a process relating to decoding of the primary horizontal transform designation flag pt_hor_flag. The primary vertical transform designation flag decoding section 182 performs a process relating to decoding of the primary vertical transform designation flag pt_ver_flag.

The primary horizontal transform designation flag decoding section 181 decodes a primary horizontal transform designation flag pt_hor_flag from a bit string of encoded data #1 in the case where a condition of an if statement to which reference symbol SYN15 is appended in the syntax depicted in FIG. 25 is satisfied, namely, in the case where the transform skip identifier ts_idx is NO_TS or 1D_V_TS (ts_idx==NO_TS∥ts_idx==1D_V_TS); the transform quantization bypass flag is 0 (false) (transquant_bypass_flag==0); the transform block is a luminance component (cIdx==0); the adaptive primary transform flag apt_flag is 1 (true) (apt_flag==1); and besides the total number numSig of non-zero transform coefficients in the transform block is equal to or greater than the threshold value ptNumSigTH (numSig>=ptNumSigTH). In any other case, the primary horizontal transform designation flag decoding section 181 sets (estimates) the value of the primary horizontal transform designation flag pt_hor_flag to −1 (predetermined value).

Similarly, the primary vertical transform designation flag decoding section 182 decodes a primary vertical transform designation flag pt_ver_flag from a bit string of encoded data #1 in the case where a condition of an if statement to which reference symbol SYN17 is appended in the syntax depicted in FIG. 25 is satisfied, namely, in the case where the transform skip identifier ts_idx is NO_TS or 1D_H_TS (ts_idx==NO_TS∥ts_idx==1D_H_TS); the transform quantization bypass flag is 0 (false) (transquant_bypass_flag==0); the transform block is a luminance component (cIdx==0); the adaptive primary transform flag apt_flag is 1 (true) (apt_flag==1); and besides the total number numSig of non-zero transform coefficients in the transform block is equal to or greater than the threshold value ptNumSigTH (numSig>=ptNumSigTH). In any other case, the primary vertical transform designation flag decoding section 182 sets (estimates) the value of the primary vertical transform designation flag pt_ver_flag to −1 (predetermined value).

According to the foregoing, in the case where the transform skip identifier ts_idx is 1D_H_TS, decoding of the primary horizontal transform designation flag pt_hor_flag can be omitted. Similarly, in the case where transform skip identifier ts_idx is 1D_V_TS, decoding of the primary vertical transform designation flag pt_ver_flag can be omitted. Accordingly, the processing amount relating to decoding of the primary horizontal transform designation flag pt_hor_flag and the primary vertical transform designation flag pt_ver_flag can be reduced. Further, since increase of the code amount can be suppressed, also enhancement of the encoding efficiency can be implemented.

4. Fourth Embodiment

<Other Configuration of Inverse Transform Section>

Although it is described that, in the first embodiment, in the case where an inverse primary vertical transform is to be skipped, the switch 132 of the inverse primary transform section 123 supplies a primary transform coefficient Coeff_IS to the switch 134, thereupon, scaling for quantization may be performed. Further, although it is described that, in the case where an inverse primary horizontal transform is to be skipped, the switch 134 of the inverse primary transform section 123 outputs transform coefficients Coeff_IPver after the inverse primary vertical transform is outputted as a prediction residual D' to the outside, thereupon, scaling for quantization may be performed.

Figure 26:
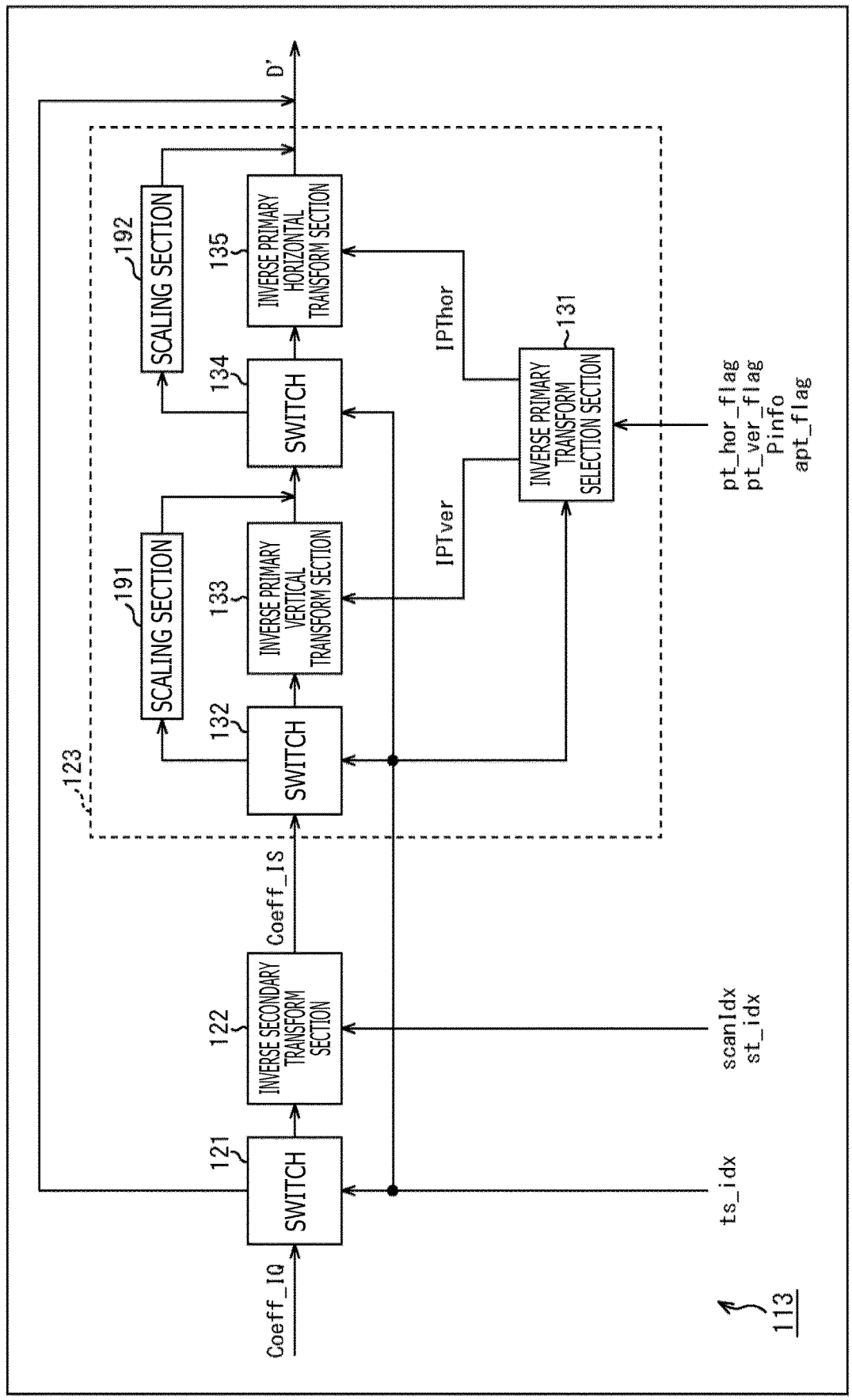
FIG. 26 is a block diagram depicting a principal configuration example of an inverse transform section.

FIG. 26 is a block diagram depicting a principal configuration example of the inverse transform section 113 in this case. As depicted in FIG. 26, the inverse transform section 113 also in this case has a configuration basically similar to that in the case of FIG. 11. However, in this case, the inverse primary transform section 123 includes a scaling section 191 and another scaling section 192.

When an inverse primary vertical transform is to be skipped, the switch 132 supplies a primary transform coefficient Coeff_IS to the scaling section 191. The scaling section 191 performs scaling for the primary transform coefficients Coeff_IS (transform coefficients Coeff_IPver after an inverse primary vertical transform) supplied from the switch 132. For example, the scaling section 191 performs bit shift arithmetic operation of N (N is a natural number) bits for normalizing the transform coefficients supplied thereto such that the transform coefficients have a norm same as that in the case where the inverse primary vertical transform is carried out. The scaling section 191 supplies the scaled transform coefficients to the switch 134.

In the case where an inverse primary horizontal transform is to be skipped, the switch 134 supplies transform coefficients Coeff_IPver after an inverse primary vertical transform as a prediction residual D' to the scaling section 192. Similarly as in the case of the scaling section 191, the scaling section 192 similarly performs scaling for the transform coefficients Coeff_IPver (prediction residual D') after the inverse primary vertical transform supplied from the switch 134. For example, the scaling section 192 performs bit shift arithmetic operation of N (N is a natural number) bits for normalizing the transform coefficients supplied thereto such that they have a norm same as that in an alternative case in which the inverse primary horizontal transform is carried out. The scaling section 192 outputs the scaled prediction residual D' to the outside.

According to the foregoing, since the dynamic range width of transform coefficients can be suppressed within a predetermined range, increase of the load of decoding can be suppressed.

5. Fifth Embodiment

<Image Encoding Apparatus>

Figure 27:
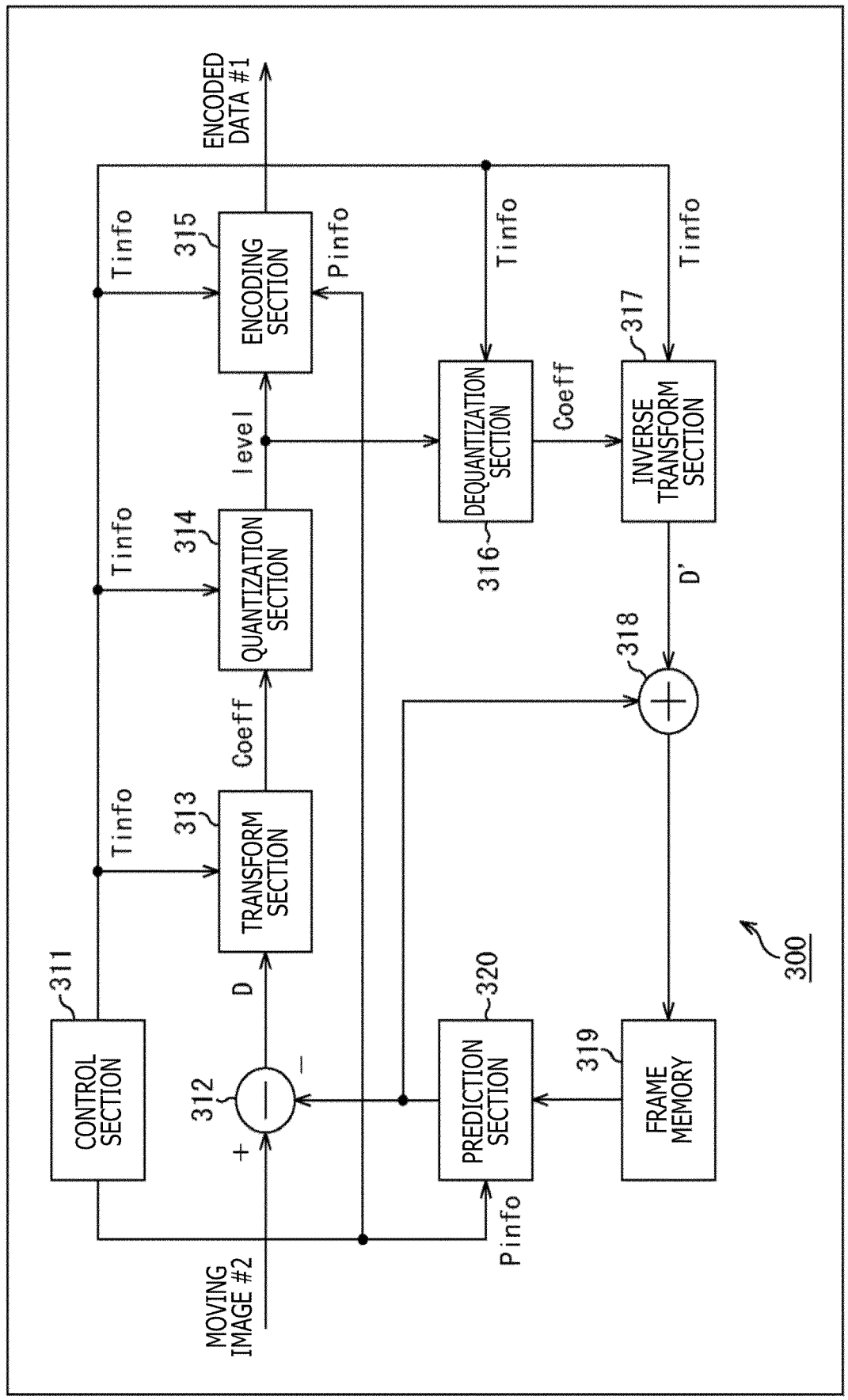
FIG. 27 is a block diagram depicting a principal configuration example of an image encoding apparatus.

Now, encoding for generating encoded data to be decoded in such a manner as described above is described. FIG. 27 is a block diagram depicting an example of a configuration of an image encoding apparatus that is a form of an image processing apparatus to which the present technology is applied. The image encoding apparatus 300 depicted in FIG. 27 is an image encoding apparatus corresponding to the image decoding apparatus 100 of FIG. 10 and generates encoded data (bit stream) to be decoded by the image decoding apparatus 100 by encoding an image by an encoding method corresponding to the decoding method by the image decoding apparatus 100. For example, the image encoding apparatus 300 incorporates the technology proposed by HEVC or technology proposed by JVET.

It is to be noted that principal ones of processing sections, flows of data and so forth are depicted, and not all of such processing sections and so forth are depicted in FIG. 27. In other words, in the image encoding apparatus 300, a processing section that is not depicted as a block in FIG. 27 may exist, or a process or a flow of data that is not indicated as an arrow mark or the like in FIG. 27 may exist.

As depicted in FIG. 27, the image encoding apparatus 300 includes a control section 311, an arithmetic operation section 312, a transform section 313, a quantization section 314, an encoding section 315, a dequantization section 316, an inverse transform section 317, another arithmetic operation section 318, a frame memory 319 and a prediction section 320.

The control section 311 segments, on the basis of a block size of a processing unit designated from the outside or designated in advance, a moving image #2 into blocks (CUs, PUs, transform blocks or the like) of a processing unit and inputs an image I corresponding to the segmented blocks to the arithmetic operation section 312. Further, the control section 311 determines encoding parameters to be supplied to the associated blocks (header information Hinfo, prediction mode information Pinfo, transform information Tinfo and so forth), for example, on the basis of RDO (Rate-Distortion Optimization). The determined encoding parameters are supplied to the associated blocks. In particular, they are supplied in the following manner.

The header information Hinfo is supplied to the blocks. The prediction mode information Pinfo is supplied to the encoding section 315 and the prediction section 320. The transform information Tinfo is supplied to the encoding section 315, transform section 313, quantization section 314, dequantization section 316 and inverse transform section 317.

The arithmetic operation section 312 receives an image I corresponding to a block of a processing unit and a prediction image P supplied from the prediction section 320 as inputs thereto, and subtracts the prediction image P from the image I as indicated by the expression (34) to derive a prediction residual D and supplies the prediction residual D to the transform section 313.

$$D=I-P \qquad (34)$$

The transform section 313 performs an inverse process to that of the inverse transform section 317 and receives a prediction residual D and transform information Tinfo as inputs thereto, and applies, on the basis of the transform information Tinfo, a transform to the prediction residual D to derive a transform coefficients Coeff and supplies the transform coefficients Coeff to the quantization section 314.

The quantization section 314 performs an inverse process to that of the dequantization section 316 and receives transform information Tinfo and transform coefficients Coeff as inputs thereto, and scales (quantizes) the transform coefficients Coeff on the basis of the transform information Tinfo and supplies transform coefficients after the quantization, namely, a quantization transform coefficient levels level, to the encoding section 315.

The encoding section 315 performs an inverse process to that of the decoding section 111 (FIG. 10), and converts encoding parameters supplied from the control section 311 (header information, prediction mode information Pinfo and transform information Tinfo) and quantization transform coefficient levels level supplied from the quantization section 314 into syntax values of individual syntax elements in accordance with a definition of a syntax table and variable length encodes (for example, arithmetically encodes) the syntax values to generate a bit string.

It is to be noted that the encoding section 315 derives residual information RInfo from quantization transform coefficient levels level and variable length encodes the residual information RInfo to generate a bit string. Further, the encoding section 315 multiplexes the bit strings of the variable length encoded syntax elements to generate encoded data #1 and outputs the encoded data #1.

The dequantization section 316 is a processing section similar to the dequantization section 112 (FIG. 10) and performs a process similar to that of the dequantization section 112 in the image encoding apparatus 300. The inverse transform section 317 is a processing section similar to the inverse transform section 113 (FIG. 10) and performs a process similar to that of the inverse transform section 113 in the image encoding apparatus 300. The frame memory 319 is a processing section similar to the frame memory 115 (FIG. 10) and performs a process similar to that of the frame memory 115 in the image encoding apparatus 300. The prediction section 320 is a processing section similar to the prediction section 116 (FIG. 10) and performs a similar process to that of the prediction section 116 in the image encoding apparatus 300.

<Transform Section>

Figure 28:
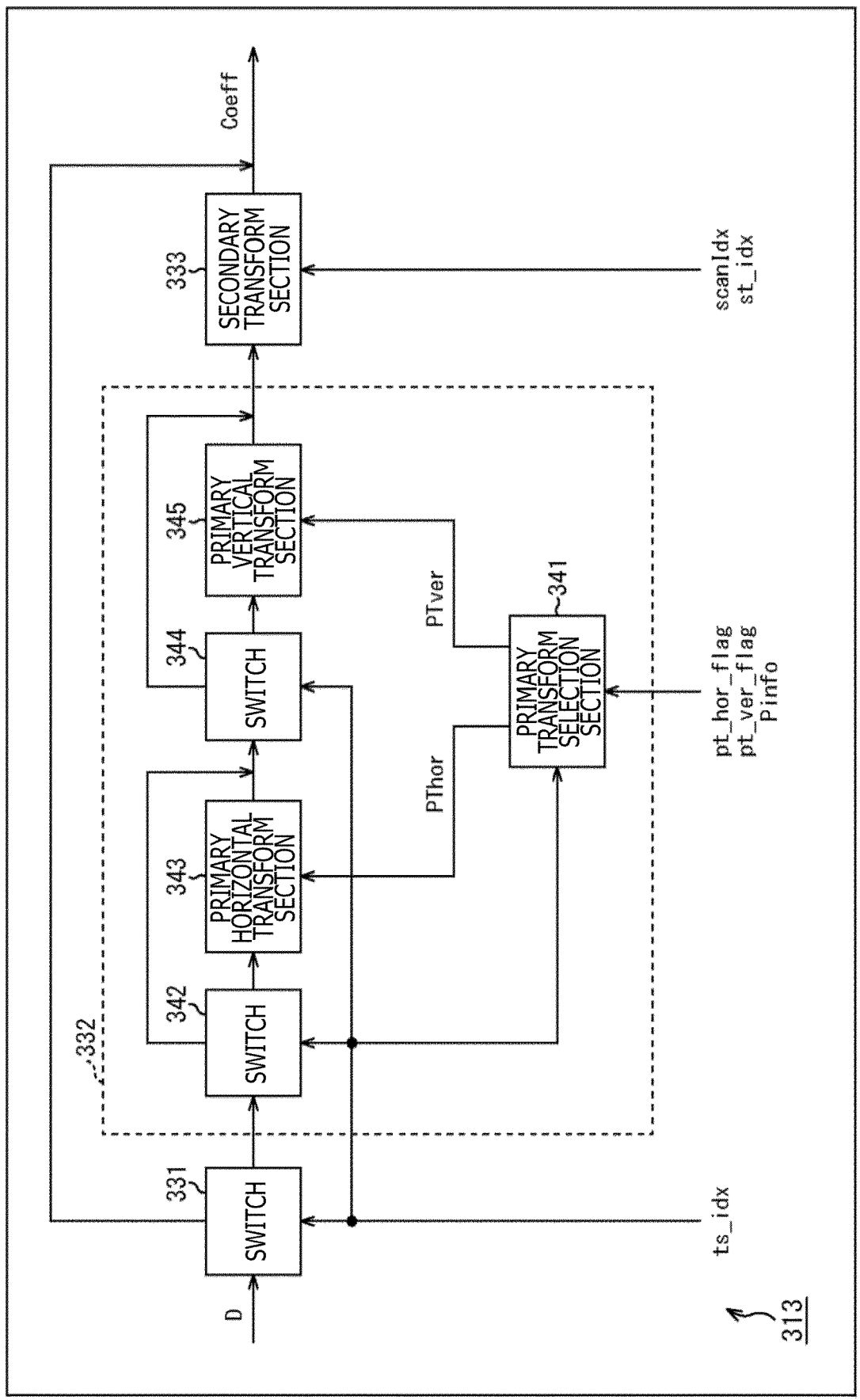
FIG. 28 is a block diagram depicting a principal configuration example of a transform section.

FIG. 28 is a block diagram depicting a principal configuration example of the transform section 313. As depicted in FIG. 28, the transform section 313 includes a switch 331, a primary transform section 332 and a secondary transform section 333.

The switch 331 receives a prediction residual D and a transform skip identifier ts_idx as inputs thereto and supplies the prediction residual D to the primary transform section 332 in the case where the value of the transform skip identifier ts_idx is NO_TS (=0), 1D_H_TS (=2) or 1D_V_TS (=3) (in the case where transform skip is not applied or one-dimensional transform skip is applied to one of the horizontal and vertical directions). On the other hand, in the case where the value of the transform skip identifier ts_idx is 2D_TS (=1) (in the case where it is indicated that two-dimensional transform skip is applied), the switch 331 skips the primary transform section 332 and the secondary transform section 333 and outputs the prediction residual D as transform coefficients Coeff to the outside (quantization section 314) of the transform section 313.

For example, in the case where the transform skip flag ts_idx is 2D_TS (=1) and the prediction residual D inputted to the transform section 313 is the prediction residual D of a 4×4 matrix=[[255, 0, 0, 0], [0, 0, 0, 0], [0, 0, 0, 0], [0, 0, 0, 0]], the switch 331 outputs the prediction residual D as transform coefficients Coeff_IQ. In particular, the transform coefficients Coeff become Coeff=[[255, 0, 0, 0], [0, 0, 0, 0], [0, 0, 0, 0], [0, 0, 0, 0]]. Accordingly, a primary transform and a secondary transform can be skipped. Especially, it is possible to perform, for a sparse residual signal to which it is desirable to apply two-dimensional transform skip and in which the number of non-zero coefficients is small, a transform process that achieves reduction of the processing amount of a transform and suppresses the energy compaction, and a transform process whose encoding efficiency is enhanced can be performed.

The primary transform section 332 receives a primary horizontal transform designation flag pt_hor_flag, a primary vertical transform designation flag pt_ver_flag, prediction mode information PInfo, a transform skip identifier ts_idx and a prediction residual D as inputs thereto. The primary transform section 332 selects the prediction mode information PInfo, the transform skip identifier, a matrix PThor for a primary horizontal transform designated by the primary horizontal transform designation flag pt_hor_flag and a matrix PTver for a primary vertical transform designated by the primary vertical transform designation flag pt_ver_flag, performs a primary horizontal transform and a primary vertical transform with the selected matrices for the primary transforms in the directions for the prediction residual D to derive a prediction residual D' after the primary transforms, and outputs the prediction residual D'.

The secondary transform section 333 receives a secondary transform identifier st_idx, a scan identifier scanIdx indicative of a scanning method of a transform coefficient and transform coefficients Coeff_P after a primary transform as inputs thereto, derives transform coefficients Co eff (also referred to as secondary transform coefficients Coeff_S) after a secondary transform, and outputs the transform coefficients Co eff.

More particularly, in the case where the secondary transform identifier st_idx indicates that a secondary transform is to be applied (st_idx>0), the secondary transform section 333 executes a process of a secondary transform corresponding to the secondary transform identifier st_idx for the primary transform coefficients Coeff_P and outputs transform coefficients Coeff_S after the secondary transform. On the other hand, in the case where the secondary transform identifier st_idx indicates that a secondary transform is not to be applied (st_idx==0), the secondary transform section 333 skips a secondary transform and outputs the transform coefficients Coeff_P after the primary transform as secondary transform coefficients Coeff_S after the secondary transform.

As depicted in FIG. 28, the primary transform section 332 includes a primary transform selection section 341, a switch 342, a primary horizontal transform section 343, another switch 344 and a primary vertical transform section 345.

The primary transform selection section 341 receives a primary horizontal transform designation flag pt_hor_flag, a primary vertical transform designation flag pt_ver_flag, prediction mode information PInfo and a transform skip identifier ts_idx as inputs thereto, reads out the prediction mode information PInfo, the transform skip identifier ts_idx, a matrix PThor for a primary horizontal transform designated by the primary horizontal transform designation flag pt_hor_flag and a matrix PTver for a primary vertical transform designated by the primary vertical transform designation flag pt_ver_flag from an internal memory (not depicted) of the primary transform selection section 341, and outputs them to the primary horizontal transform section 343 and the primary vertical transform section 345, respectively.

The primary transform selection section 341 selects a transform set TransformSet including orthogonal transforms that become candidates for a primary transform for each of the horizontal direction and the vertical direction similarly as in the case of the inverse primary transform selection section 131. It is to be noted that this process is same as the process of the inverse primary transform selection section 131, and therefore, description of this is omitted.

Similarly as in the selection process of an inverse primary horizontal transform IPThor and an inverse primary vertical transform IPTver by the inverse primary transform selection section 131, the primary transform selection section 341 selects an orthogonal transform to be used for a primary transform in the horizontal direction from within the selected transform set TransformSet using the primary horizontal transform designation flag pt_hor_flag, and selects an orthogonal transform to be used for a primary transform in the vertical direction using the primary vertical transform designation flag pt_ver_flag. As a particular process, for the selection process of an inverse primary horizontal transform IPThor and a primary vertical transform IPTver by the inverse primary transform selection section 131, the following replacement is performed for interpretation:

inverse primary horizontal transform IPThor→primary horizontal transform PThor inverse primary vertical transform IPTver→primary vertical transform PTver inverse primary transform→primary transform The switch 342 receives a prediction residual D and a transform skip identifier ts_idx as inputs thereto. In the case where the value of the transform skip identifier ts_idx is 1D_H_TS (=2), namely, indicates that a one-dimensional transform in the horizontal direction is to be skipped (ts_idx==1D_H_TS) (to skip a primary horizontal transform), the switch 342 skips the primary horizontal transform section 343 and outputs the prediction residual D as transform coefficients Coeff_Phor after a primary horizontal transform to the switch 344. On the other hand, in the case where the value of the transform skip identifier ts_idx is any other than 1D_H_TS (=2) (ts_idx !=1D_H_TS) (indicates that a primary horizontal transform is not to be skipped), the switch 342 outputs the prediction residual D to the primary horizontal transform section 343.

The primary horizontal transform section 343 receives, for each transform block, a prediction residual D and a matrix for a primary horizontal transform PThor as inputs thereto, and performs matrix operation as indicated by the expression (35) given below and outputs a result of the matrix operation as transform coefficients Coeff_Phor after the primary horizontal transform. It is to be noted that the primary horizontal transform PThor is a matrix having a transformation basis as a column vector.

$$\text{Coeff\_Phor}=(D \cdot \text{PThor}) \gg s3 \quad (35)$$

Here, the operator "·" represents a matrix product (inner product), and the operator ">>" represents an operation for performing right shift operation for each element. According to the expression (35), each value of the transform coefficients Coeff_Phor is obtained by performing, for each element of the matrix product of the prediction residual D and the primary horizontal transform PThor, right shift operation with a predetermined scaling parameter s3. It is to be noted that the scaling parameter s3 is used to normalize a matrix operation result of D·PThor so as to fit in the bit depth of an intermediate buffer. The value of the scaling parameter s3 is determined, for example, from the bit depth BitDepthbuff of the intermediate buffer and the worst case MaxBitDepth (D·PThor) of the bit depth of the matrix operation of D·PThor as indicated by the following expression (36).

$$s3=\max(0,\text{MaxBitDepth}(D \cdot \text{PThor})-\text{BitDepthbuff}) \quad (36)$$

For example, in the case where the value range of D·PThor is $-2^{}22$ to $2^{}22-1$, namely, in the case where the bit depth of MaxBitDepth(D·PThor) is 23 bits and the value range of a value that can be stored into the intermediate buffer is $-2^{}15$ to $2^{}15-1$, namely, in the case where the bit depth of the intermediate buffer is 16 bits, the scaling parameter s3 is s3=7 bits (=max(0, 23−16)=max(0, 7)). On the other hand, in the case where the bit depth of MaxBitDepth(D·PThor) is 23 bits and the value range of a value that can be stored into the intermediate buffer is $-2^{}31$ to $2^{}31-1$, namely, in the case where the bit depth of the intermediate buffer is 32 bits, the scaling parameter s3 becomes s3=0 bit (=max(0, 23−32)=max(0, −9)). That the scaling parameter s3 is 0 represents that, since the value of the bit depth of the intermediate buffer is sufficiently high, even if element values of the matrix product of D·PThor are not normalized, they can be stored into the intermediate buffer without overflowing.

It is to be noted that the scaling parameter s3 may be a fixed value determined in advance assuming that the value range of D·PThor is known. Further, in order to reduce a clip error by right shift operation of the expression (36) described hereinabove, after the matrix product, a predetermined offset value o3 may be added for each element. At this time, the offset value o3 is represented by the following expression (37) using the scaling parameter s3.

$$o3=(s3>0?1<<(s3-1):0) \qquad (37)$$

The switch 344 receives a transform coefficients Coeff_Phor after a primary horizontal transform and a transform skip identifier ts_idx as inputs thereto. In the case where the value of the transform skip identifier ts_idx is 1D_V_TS (=3), namely, indicates that a one-dimensional transform in the vertical direction is to be skipped (ts_idx==1D_V_TS) (to skip a primary vertical transform), the switch 344 skips the primary vertical transform section 345 and outputs the transform coefficients Coeff_Phor after the primary horizontal transform as transform coefficients Coeff_P after a primary transform to the outside (secondary transform section 333). On the other hand, in the case where the value of the transform skip identifier ts_idx is any other than 1D_V_TS (=2) (ts_idx !=1D_V_TS) (in the case where it is indicated that a primary vertical transform is not to be skipped), the switch 344 outputs the transform coefficients Coeff_Phor after the primary horizontal transform to the primary vertical transform section 345.

The primary vertical transform section 345 receives, for each transform block, transform coefficients Coeff_Phor after a primary horizontal transform and a matrix for a primary vertical transform PTver as inputs thereto, performs matrix operation as indicated by the expression (38) given below, and outputs a result of the matrix operation as transform coefficients Coeff_P after a primary transform. It is to be noted that the primary vertical transform PTver is a matrix having a transform basis as a row vector.

$$\text{Coeff}\_P=(\text{PTver·Coeff}\_\text{Phor})>>s3 \qquad (38)$$

Here, the operator "·" represents a matrix product (inner product), and the operator ">>" represents an operation for performing right shift operation for each element. According to the expression (38), each value of the transform coefficients Coeff_P is obtained by performing, for each element of the matrix product of the transform coefficients Coeff_Phor after a primary horizontal transform and the matrix PTver of the primary vertical transform, right shift arithmetic operation with a predetermined scaling parameter s3. It is to be noted that the scaling parameter s4 is used to normalize matrix operation results of PTver·Coeff_Phor so as to fit in a desire bit depth. The value of the scaling parameter s4 is determined from a desired bit depth Bit-Depthout and the worst case MaxBitDepth (PTver·Coeff_Phor) of the bit depth of the matrix operation of PTver·Coeff_Phor in accordance with the following expression (39).

$$s4=\max(0,\text{MaxBitDepth}(\text{PTver·Coeff}\_\text{Phor})-\text{Bit-Depthout}) \qquad (39)$$

For example, in the case where the value range of PTver·Coeff_Phor is $-2^{}22$ to $2^{}22-1$, namely, in the case where the bit depth of MaxBitDepth (PTver·Coeff_Phor) is 23 bits and the value range of the value that can be taken with a desired bit depth is $-2^{}15$ to $2^{}15-1$, namely, in the case where the desired bit depth is 16 bits, the scaling parameter s4 becomes s4=7 bits (=max (0, 23−16)=max(0, 7)). Further, in the case where the bit depth of MaxBitDepth(PTver·Coeff_Phor) is 23 bits and the value range of the value that can be taken with a desired bit depth is $-2^{}31$ to $2^{}31-1$, namely, in the case where the desired bit depth is 32 bits, the scaling parameter s4 becomes s4=0 bit (=max(0, 23−32)=max(0, −9)). Since that the scaling parameter s4 is 0 represents that, since the value of the desired bit depth is sufficiently high, even if the pixel values of the matrix product of PTver·Coeff_Phor are not normalized, the pixel values fit in the desired bit depth.

It is to be noted that, in order to reduce a clip error by right shift operation of the expression (38) described hereinabove, after the matrix product, a predetermined offset value o4 may be added for each element. At this time, the offset value o3 is represented by the following expression (40) using the scaling parameter s4.

$$o4=(s4>0?1<<(s4-1):0) \qquad (40)$$

As described above, the primary transform section 332 can perform, for a residual signal in regard to which it is desirable to skip a one-dimensional transform in the horizontal direction or the vertical direction, a primary transform process that decreases the processing amount of a primary transform and prevents decrease of energy compaction to improve the encoding efficiency. Especially for a residual signal having a characteristic of a step edge in which the continuity of a signal changes rapidly in the horizontal direction, by skipping a one-dimensional transform in the horizontal direction and performing a one-dimensional transform in the vertical direction, non-zero coefficients can be concentrated efficiently on a low frequency region of frequency components in the vertical direction in comparison with those in the case where a two-dimensional orthogonal transform is performed. In particular, since energy compaction can be increased, the enhancement of the encoding efficiency can be implemented. Similarly, for a residual signal having a characteristic of a step edge in which the continuity of a signal changes rapidly in the vertical direction, by skipping a one-dimensional transform in the vertical direction and performing a one-dimensional transform in the horizontal direction, non-zero coefficients can be concentrated efficiency on a low frequency region of frequency components in the horizontal direction in comparison with those in an alternative case in which a two-dimensional orthogonal transform is performed. In particular, since energy compaction can be increased, enhancement of the encoding efficiency can be implemented.

<Flow of Image Encoding Process>

Now, a flow of processes executed by such an image encoding apparatus 300 as described above is described. First, an example of a flow of an image encoding process is described with reference to a flow chart of FIG. 29.

After the image encoding process is started, at step S301, the control section 311 performs an encoding controlling process and performs block segmentation, setting of encoding parameters and so forth.

At step S302, the prediction section 320 performs a prediction process to generate a prediction image of an optimum prediction mode and so forth. For example, in this prediction process, the prediction section 320 performs intra prediction to generate a prediction image of an optimum intra prediction mode and so forth and performs inter prediction to generate a prediction image of an optimum inter prediction mode and so forth, and selects an optimum prediction mode from among them on the basis of a cost function value and so forth.

At step S303, the arithmetic operation section 312 arithmetically operates the difference between the input image and the prediction image of the optimum mode selected by the prediction process at step S302. In short, the arithmetic operation section 312 generates a prediction residual D between the input image and the prediction image. The prediction residual D calculated in this manner is reduced in data amount in comparison with the original image data. Accordingly, the data amount can be compressed in comparison with that in an alternative case in which the image is encoded as it is.

At step S304, the transform section 313 performs a transform process for the prediction residual D generated by the process at step S303 to derive transform coefficients Coeff. It is to be noted that this transform process is an inverse process to the inverse transform process at step S307 and is an inverse process to the inverse transform process executed in the image decoding process described hereinabove. Details of the process at step S304 are hereinafter described.

At step S305, the quantization section 314 quantizes, by using quantization parameters calculated by the control section 311 or the like, the transform coefficients Coeff obtained by the process at step S304 to derive quantization transform coefficient levels level.

At step S306, the dequantization section 316 dequantizes the quantization transform coefficient levels level generated by the process at step S305 in accordance with a characteristic corresponding to the characteristic of the quantization a step S305 to derive transform coefficients Coeff_IQ.

At step S307, the inverse transform section 317 inversely transform the transform coefficients Coeff_IQ obtained by the process at step S306 by a method corresponding to the transform process at step S304 to derive a prediction residual D'. It is to be noted that this inverse transform process is executed similarly to the inverse transform process executed in the image decoding process described hereinabove.

At step S308, the arithmetic operation section 318 adds the prediction image obtained by the prediction process at step S302 to the prediction residual D' derived by the process at step S307 to generate a decoded image that is decoded locally.

At step S309, the frame memory 319 stores the decoded image decoded locally obtained by the process at step S308.

At step S310, the encoding section 315 encodes the quantization transform coefficient levels level obtained by the process at step S305. For example, the encoding section 315 encodes the quantization transform coefficient levels level, which is information relating to the image, by arithmetic encoding or the like to generate encoded data. Further, at this time, the encoding section 315 encodes various encoding parameters (header information Hinfo, prediction mode information Pinfo and transform information Tinfo). Furthermore, the encoding section 315 derives residual information RInfo from the quantization transform coefficient levels level and encodes the residual information RInfo.

At step S311, the encoding section 315 summarizes the encoded data of the various information generated in this manner and outputs them as a bit stream to the outside of the image encoding apparatus 300. This bit stream is transmitted to the decoding side, for example, through a transmission line or a recording medium. When the process at step S311 ends, the image encoding process ends.

It is to be noted that the processing unit in each of the processes is arbitrary and the processing units may not be same with each other. Accordingly, the processes at the steps can be suitably executed also in parallel with a process at some other step or the like or with the processing order rearranged.

<Flow of Transform Process>

Figure 29:
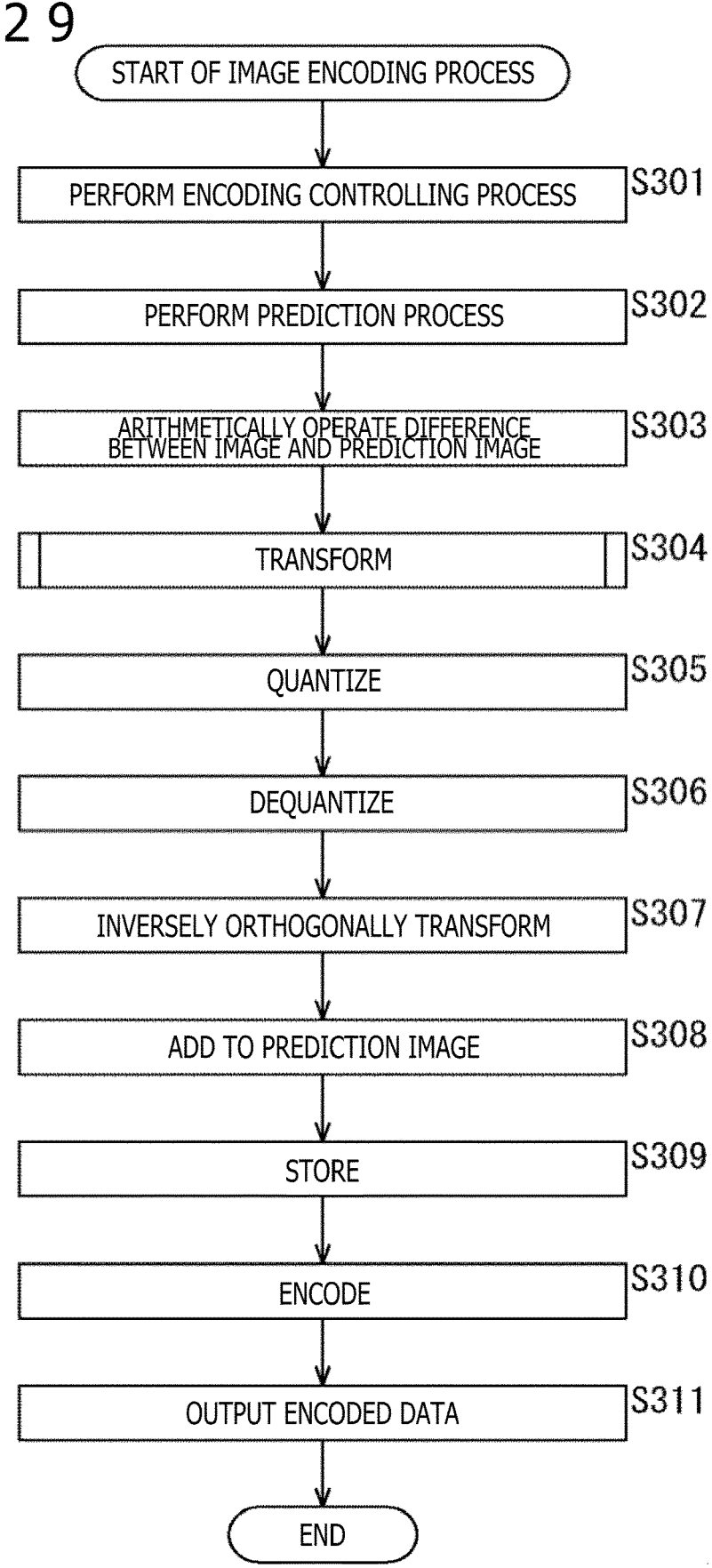
FIG. 29 is a flow chart illustrating an example of a flow of an image encoding process.

Now, an example of a flow of the transform process executed at step S304 of FIG. 29 is described with reference to a flow chart of FIG. 30. After the transform process is started, the switch 331 decides at step S331 whether the transform skip identifier ts_idx is 2D_TS (mode of two-dimensional transform skip) or the transform quantization bypass flag transquant_bypass_flag is 1 (true). In the case where it is decided that the transform skip identifier ts_idx is 2D_TS or the transform quantization bypass flag is 1 (true), the switch 331 outputs the prediction residual D as transform coefficients Coeff to the outside. In particular, the transform process ends, and the processing returns to FIG. 29.

On the other hand, in the case where it is decided at step S331 that the transform skip identifier ts_idx is not 2D_TS (mode other than two-dimensional transform skip) and besides the transform quantization bypass flag is 0 (false), the switch 331 outputs the prediction residual D to the primary transform section 332. In short, the processing advances to step S332.

At step S332, the primary transform selection section 341 refers to the primary horizontal transform designation flag pt_hor_flag, primary vertical transform designation flag pt_ver_flag, prediction mode information PInfo and transform skip identifier ts_idx to select a primary horizontal transform PThor and a primary vertical transform PTver and supplies them to the primary horizontal transform section 343 and the primary vertical transform section 345, respectively.

At step S333, the switch 342 decides whether or not the transform skip identifier ts_idx is 1D_H_TS (mode of one-dimensional transform skip in the horizontal direction) (ts_idx==1D_H_TS). In the case where it is decided that the transform skip identifier ts_idx is not 1D_H_TS, the processing advances to step S334. At step S334, the primary horizontal transform section 343 receives, for each transform block, the prediction residual D and a matrix for the primary horizontal transform PThor as inputs thereto, perform matrix operation, and outputs a result of the matrix operation as transform coefficients Coeff_Phor after the primary horizontal transform. After the process at step 334 ends, the processing advances to step S335.

On the other hand, in the case where it is decided at step S333 that the transform skip identifier ts_idx is 1D_H_TS, the switch 342 skips the primary horizontal transform section 343 and supplies the prediction residual D as transform coefficients Coeff_Phor after the primary horizontal transform to the switch 344. In short, the process at step S334 is omitted, and the processing advances to step S335.

At step S335, the switch 344 decides whether or not the transform skip identifier ts_idx is 1D_V_TS (mode of one-dimensional transform skip in the vertical direction) (ts_idx==1D_V_TS). In the case where it is decided that the transform skip identifier ts_idx is not 1D_V_TS, the processing advances to step S336. At step S336, the primary vertical transform section 345 performs a primary vertical transform. In particular, the primary vertical transform section 345 receives, for each transform block, the transform coefficients Coeff_Phor after the primary horizontal transform and a matrix for the primary vertical transform PTver as inputs thereto, perform matrix operation, and outputs a result of the matrix operation as transform coefficients Coeff_P after the primary horizontal transform. After the process at step 336 ends, the processing advances to step S337.

On the other hand, in the case where it is decided at step S335 that the transform skip identifier ts_idx is 1D_V_TS, the switch 344 skips inputting to the primary vertical transform section 345 and supplies the transform coefficients Coeff_Phor after the primary horizontal transform as transform coefficients Coeff_P after the primary transform. In short, the process at step S336 is omitted, and the processing advances to step S337.

At step S337, the secondary transform section 333 performs a secondary transform for the transform coefficients Coeff_P inputted thereto on the basis of the secondary transform identifier st_idx to derive transform coefficients Coeff and outputs the transform coefficients Coeff. When the process at step S337 ends, the transform process ends and the processing returns to FIG. 29.

<Flow of Primary Transform Selection Process>

Figure 30:
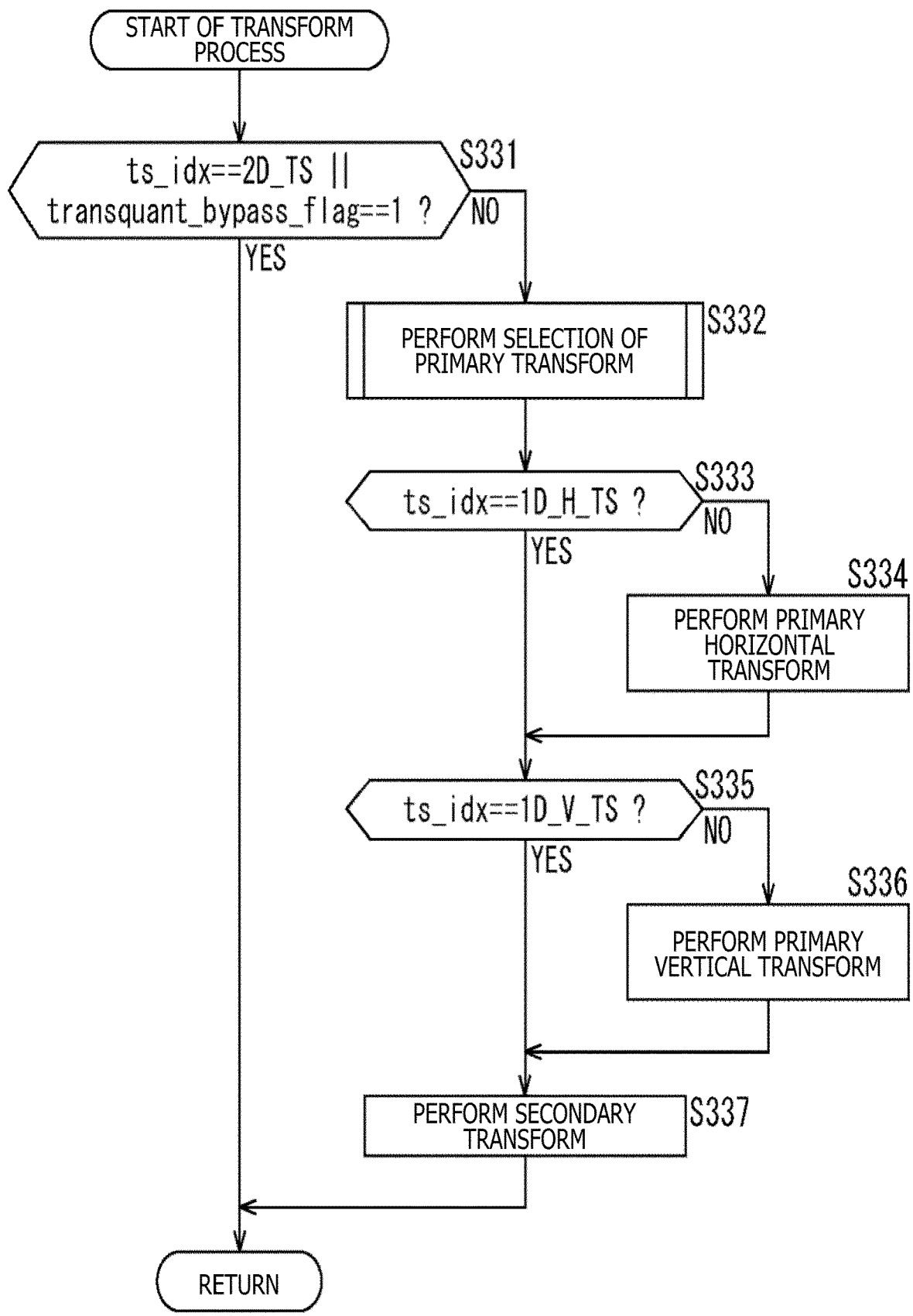
FIG. 30 is a flow chart illustrating an example of a flow of a transform process.
Figure 31:
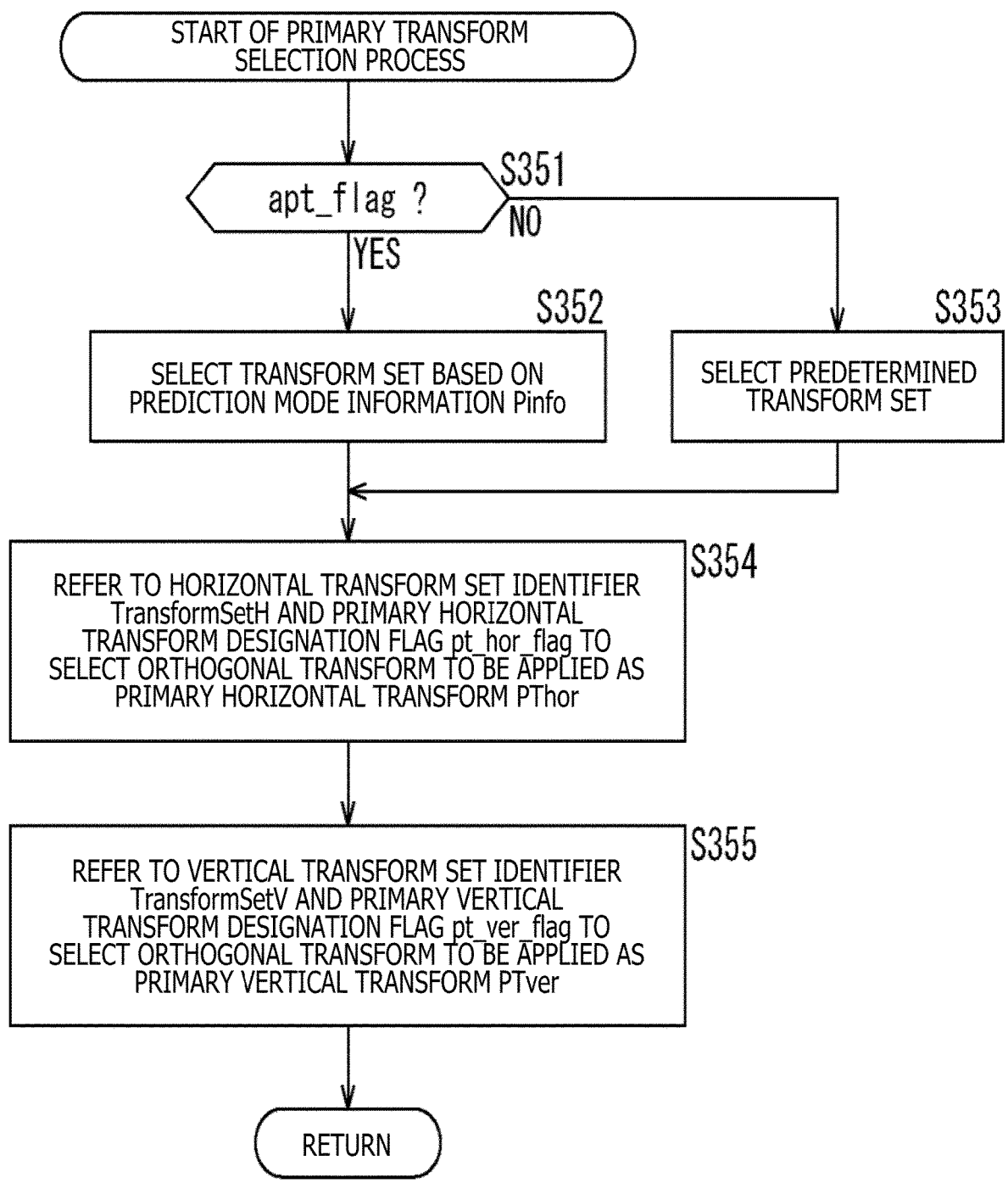
FIG. 31 is a view illustrating a flow of a primary transform selection process.

Now, an example of a flow of the primary transform selection process executed at step S332 of FIG. 30 is described with reference to a flow chart of FIG. 31.

After the primary transform selection process is started, at step S351, the primary transform selection section 341 decides whether or not the adaptive primary transform flag apt_flag is 1 (true). In the case where it is decided that the adaptive primary transform flag apt_flag is 1 (true), the processing advances to step S352. At step S352, the primary transform selection section 341 selects a transform set for each of a primary vertical transform and a primary horizontal transform on the basis of the prediction mode information PInfo. After the process at step S352 ends, the processing advances to step S354.

On the other hand, in the case where it is decided at step S351 that the adaptive primary transform flag apt_flag is 0 (false), the processing advances to step S353. At step S353, the primary transform selection section 341 selects a predetermined transform set. After the process at step S353 ends, the processing advances to step S354.

At step S354, the primary transform selection section 341 refers to the horizontal transform set identifier TransformSetH and the primary horizontal transform designation flag pt_hor_flag to select an orthogonal transform to be applied as the primary horizontal transform PThor.

At step S355, the primary transform selection section 341 refers to the vertical transform set identifier TransformSetV and the primary vertical transform designation flag pt_ver_flag to select an orthogonal transform to be applied as the primary vertical transform PTver.

When the process at step S355 ends, the primary transform selection process ends and the processing returns to FIG. 30.

It is to be noted that also the processes described above may be subjected to rearrangement of the processing order of the steps or change of the substance of the processes as far as practicable. For example, the processes at steps S333 and S335 may be omitted while, in the case where the transform skip identifier ts_idx is 1D_H_TS (one-dimensional transform skip in the horizontal direction) at step S331, a unit matrix is selected as the primary horizontal transform PThor and the process at step S334 is executed. On the other hand, in the case where the transform skip identifier ts_idx is 1D_V_TS (one-dimensional transform skip in the vertical direction), a unit matrix may be selected as the primary vertical transform PTver, whereafter the process at step S336 is executed.

According to the foregoing, the transform section 313 provided in the image encoding apparatus 300 can reduce the processing amount for a transform and suppress decrease of the energy compaction in regard to a residual signal, for which it is desirable to apply transform skip, and suppress reduction of the energy compaction, and can perform an inverse transform process that improved in encoding efficiency. More particularly, the transform section 313 can reduce the processing amount for a primary transform and suppress decrease of the energy compaction in regard to a residual signal, for which it is desirable to skip one-dimensional transform in the horizontal direction or the vertical direction, and can perform an inverse primary transform process that is improved in encoding efficiency.

Especially, in regard to a residual signal having a characteristic of a step edge in which the continuity of a signal varies rapidly in the horizontal direction, by skipping a one-dimensional transform in the horizontal direction and performing a one-dimensional transform in the vertical direction, non-zero coefficients can be concentrated efficiently on a low frequency region of frequency components in the vertical direction in comparison with those in the case where a two-dimensional orthogonal transform is performed. In particular, since energy compaction can be increased, the encoding efficiency can be enhanced.

Similarly, for a residual signal having a characteristic of a step edge in which the continuity of a signal changes rapidly in the vertical direction, by skipping a one-dimensional transform in the vertical direction and performing a one-dimensional transform in the horizontal direction, non-zero coefficients can be concentrated efficiently on a low frequency region of frequency components in the horizontal direction in comparison with those in an alternative case in which a two-dimensional orthogonal transform is performed. In particular, energy compaction can be increased, and the encoding efficiency can be enhanced.

6. Sixth Embodiment

<Encoding of Primary Transform Identifier>

The transform skip identifier ts_idx and the primary transform identifier pt_idx in the image decoding apparatus 100 described above correspond to an inverse process to the decoding process described hereinabove. Accordingly, also the image encoding process is subjected to such control as described below on the basis of the parameters similarly as in the case of the image decoding process.

(1) The transform skip flag ts_flag is expanded to the transform skip identifier ts_idx.

(2) When the transform skip identifier ts_idx is 1D_H_TS, a primary horizontal transform and a secondary transform are skipped.

(3) When the transform skip identifier ts_idx is 1D_V_TS, a primary vertical transform and a secondary transform are skipped.

In this case, in the case where the transform skip identifier ts_idx encoded in a transform block unit is 1D_H_TS, since the primary horizontal transform designation flag pt_hor_flag is not used, it is redundant to encode this information. On the other hand, in the case where the transform skip identifier ts_idx is 1D_V_TS, since the primary vertical transform designation flag pt_ver_flag is not used, it is redundant to encode this information. Accordingly, the following changes are applied in order to efficiently encode the primary transform identifier pt_idx.

(1) In the case where the transform skip identifier ts_idx=NO_TS, on the encoding side, a primary transform identifier pt_idx is derived from a primary horizontal transform designation flag pt_hor_flag and a primary vertical transform designation flag pt_ver_flag in accordance with the expression (20) given hereinabove.

(2) In the case where the transform skip identifier ts_idx is 1D_H_TS, on the encoding side, the primary transform identifier pt_idx is derived as pt_idx=pt_ver_flag in accordance with the expression (22) given hereinabove.

(3) In the case where the transform skip identifier ts_idx is 1D_V_TS, on the encoding side, the primary transform identifier pt_idx is derived as pt_idx=pt_hor_flag in accordance with the expression (24) given hereinabove.

(4) In the case where the transform skip identifier ts_idx is 2D_TS, on the encoding side, encoding of the primary transform identifier pt_idx is omitted.

By such changes as described above, in the case where the transform skip identifier ts_idx is 1D_H_TS or 1D_V_TS, since the primary transform identifier pt_idx is arithmetically transformed as a bin string of 1 bit, the bin string that becomes an encoding target can be reduced in comparison with that in an alternative case in which the primary transform identifier pt_idx is arithmetically encoded as a bin string of 2 bits. Accordingly, increase of the code amount can be suppressed and the encoding efficiency can be increased.

Further, regarding a secondary transform, since the transform skip identifier ts_idx is 2D_TS, 1D_H_TS or 1D_V_TS, since a secondary transform is skipped, it is redundant to encode the secondary transform identifier st_idx that is a control parameter for the secondary transform. Therefore, in the case where the transform skip identifier ts_idx is 2D_TS, 1D_H_TS or 1D_V_TS, by applying such a change that encoding of the transform skip identifier ts_idx is omitted, increase of the processing amount relating to encoding of the secondary transform identifier st_idx can be suppressed.

<Encoding of Transform Skip Identifier ts_idx>

Figure 32:
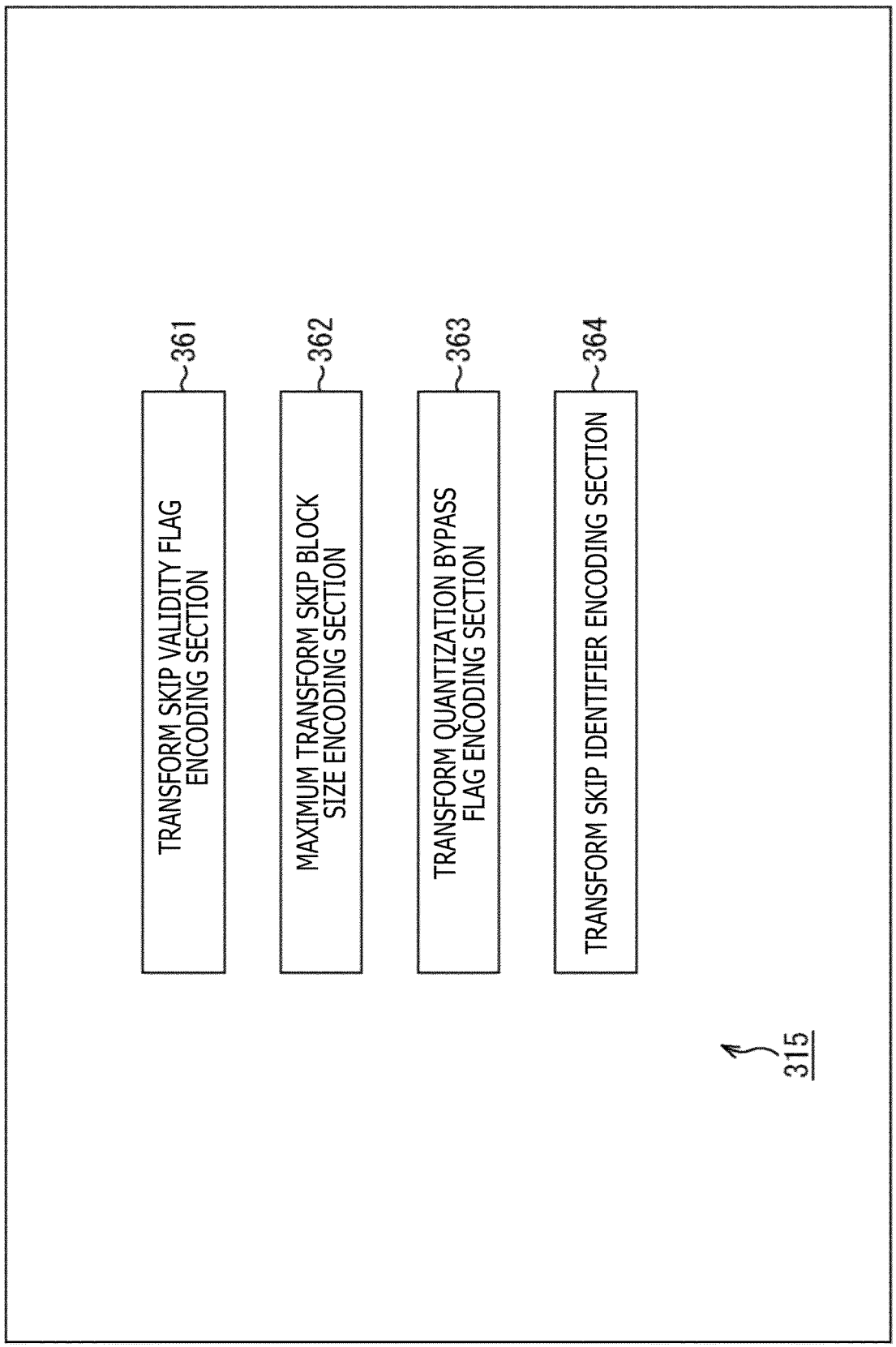
FIG. 32 is a block diagram depicting a principal configuration example of an encoding section.

FIG. 32 is a block diagram depicting a principal configuration example relating to encoding of the transform skip identifier ts_idx of the encoding section 315. As depicted in FIG. 32, the encoding section 315 includes a transform skip validity flag encoding section 361, a maximum transform skip block size encoding section 362, a transform quantization bypass flag encoding section 363 and a transform skip identifier encoding section 364.

The transform skip validity flag encoding section 361 performs a process relating to encoding of the transform skip validity flag ts_enabled_flag. The maximum transform skip block size encoding section 362 performs a process relating to encoding of the maximum transform skip block size MaxTSSize. The transform quantization bypass flag encoding section 363 performs a process relating to encoding of the transform quantization bypass flag transquant_bypass_flag. The transform skip identifier encoding section 364 performs a process relating to encoding of the transform skip identifier ts_idx.

Figure 33:
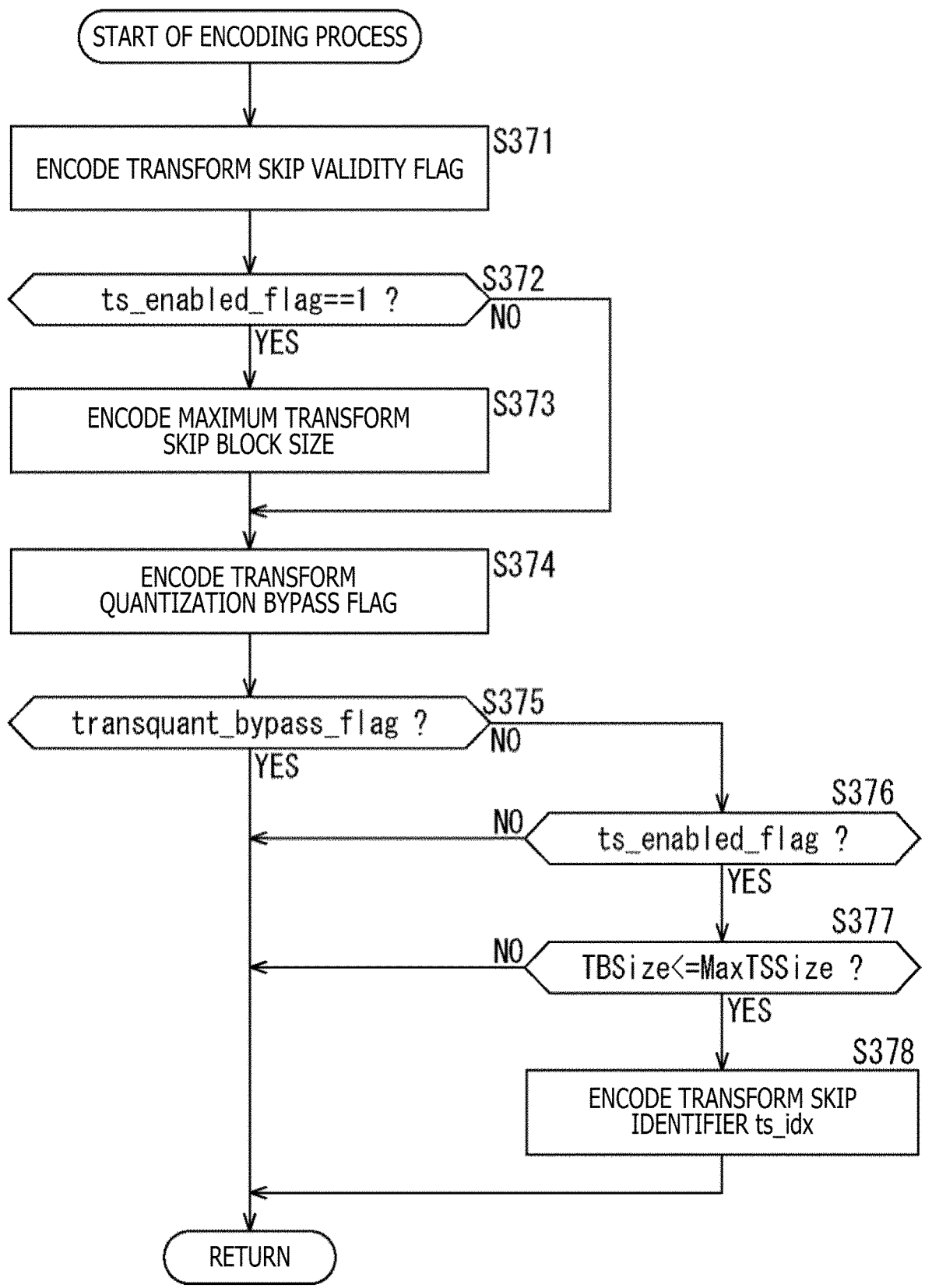
FIG. 33 is a flow chart illustrating an example of a flow of an encoding process.

An example of a flow of the encoding process relating to the transform skip identifier ts_idx, which is executed at step S310 of FIG. 29 by the encoding section 315, is described with reference to a flow chart of FIG. 33.

After the encoding process is started, at step S371, the transform skip validity flag encoding section 361 variable length encodes the transform skip validity flag ts_enabled_flag included in the header information HInfo to generate a bit string and outputs the bit string.

At step S372, the maximum transform skip block size encoding section 362 decides whether or not the transform skip validity flag ts_enabled_flag is 1 (true). In the case where it is decided that the transform skip validity flag ts_enabled_flag is 1 (true), the processing advances to step S373.

At step S373, the maximum transform skip block size encoding section 362 variable length encodes a maximum transform skip block size MaxTSSize included in the header information Hinfo (or a logarithm log 2MaxTSSize with the base 2) to generate a bit string and outputs the bit string. After the process at step S373 ends, the processing advances to step S374. On the other hand, in the case where it is decided at step S372 that the transform skip validity flag ts_enabled_flag is 0 (false), the process at step S373 is omitted and the processing advances to step S374.

At step S374, the transform quantization bypass flag encoding section 363 variable length encodes a transform quantization bypass flag transquant_bypass_flag included in the header information HInfo to generate a bit string and outputs the bit string.

At step S375, the transform skip identifier encoding section 364 decides whether or not the transform quantization bypass flag transquant_bypass_flag included in the transform information Tinfo is 1 (true). In the case where it is decided that the transform quantization bypass flag transquant_bypass_flag is 1 (true), encoding the transform skip identifier ts_idx is omitted and the encoding process is ended, and the processing returns to FIG. 29. On the other hand, in the case where it is decided at step S375 that the transform quantization bypass flag transquant_bypass_flag is 0 (false), the processing advances to step S376.

At step S376, the transform skip identifier encoding section 364 decides whether or not the transform skip validity flag ts_enabled_flag included in the header information HInfo is 1 (true). In the case where it is decided that the transform skip validity flag ts_enabled_flag is 0 (false), encoding of the transform skip identifier ts_idx is omitted and the encoding process is ended, and the processing returns to FIG. 29. On the other hand, in the case where it is decided that the transform skip validity flag ts_enabled_flag is 1 (true), the processing advances to step S377.

At step S377, the transform skip identifier encoding section 364 decides whether or not the size TBSize of the transform block of the processing target is equal to or smaller than the maximum transform skip block size MaxTSSize, or in other words, whether or not the logical value of the conditional expression (TBSize<=MaxTSSize) is 1 (true).

It is to be noted that, in the conditional expression (TBSize<=MaxTSSize), TBSize is derived in accordance with the expression (26) or (27) given hereinabove. Further, in the expression (26) or (27), TBSize, TBWSize and TBHSize may be replaced by logarithms log 2TBSize, log 2TBWSize and log 2TBHSize with the base 2. In this case, the expression (26) is replaced by the expression (28) given hereinabove and the expression (27) is replaced by the expression (29) given hereinabove. It is to be noted that, in the case where logarithms are used, TBSize and the maximum transform skip block size MaxTSSize of the conditional expression (TBSize<=MaxTSSize) given hereinabove are replaced by corresponding logarithms log 2TBSize and log 2MaxTSSize, respectively.

In the case where it is decided that TBSize is greater than the maximum transform skip block size MaxTSSize, namely, in the case where the logical value of the conditional expression is 0, encoding of the transform skip identifier ts_idx is omitted and the encoding process is ended, and the processing returns to FIG. 29. On the other hand, in the case where it is decided that TBSize is equal to or smaller than the maximum transform skip block size MaxTSSize, namely, in the case where the logical value of the conditional expression is 1, the processing advances to step S378.

At step S378, the transform skip identifier encoding section 364 variable length encodes the transform skip identifier ts_idx included in the header information HInfo to generate a bit string and outputs the bit string. When the process at step S378 ends, the encoding process ends, and the processing returns to FIG. 29.

In the foregoing, rearrangement of the processing order of the steps or change of the substance of the processes may be performed as far as practicable.

By executing the processes in such a manner as described above, on the encoding side, two-dimensional transform skip or one-dimensional transform skip in the horizontal direction or the vertical direction can be adaptively selected in a transform block unit in comparison with JEM3. Accordingly, since a residual signal in regard to which one-dimensional transform skip is more effective than before can be encoded by the mode of one-dimensional transform skip, the encoding efficiency can be enhanced.

<Encoding of Primary Transform Identifier pt_idx>

Figure 34:
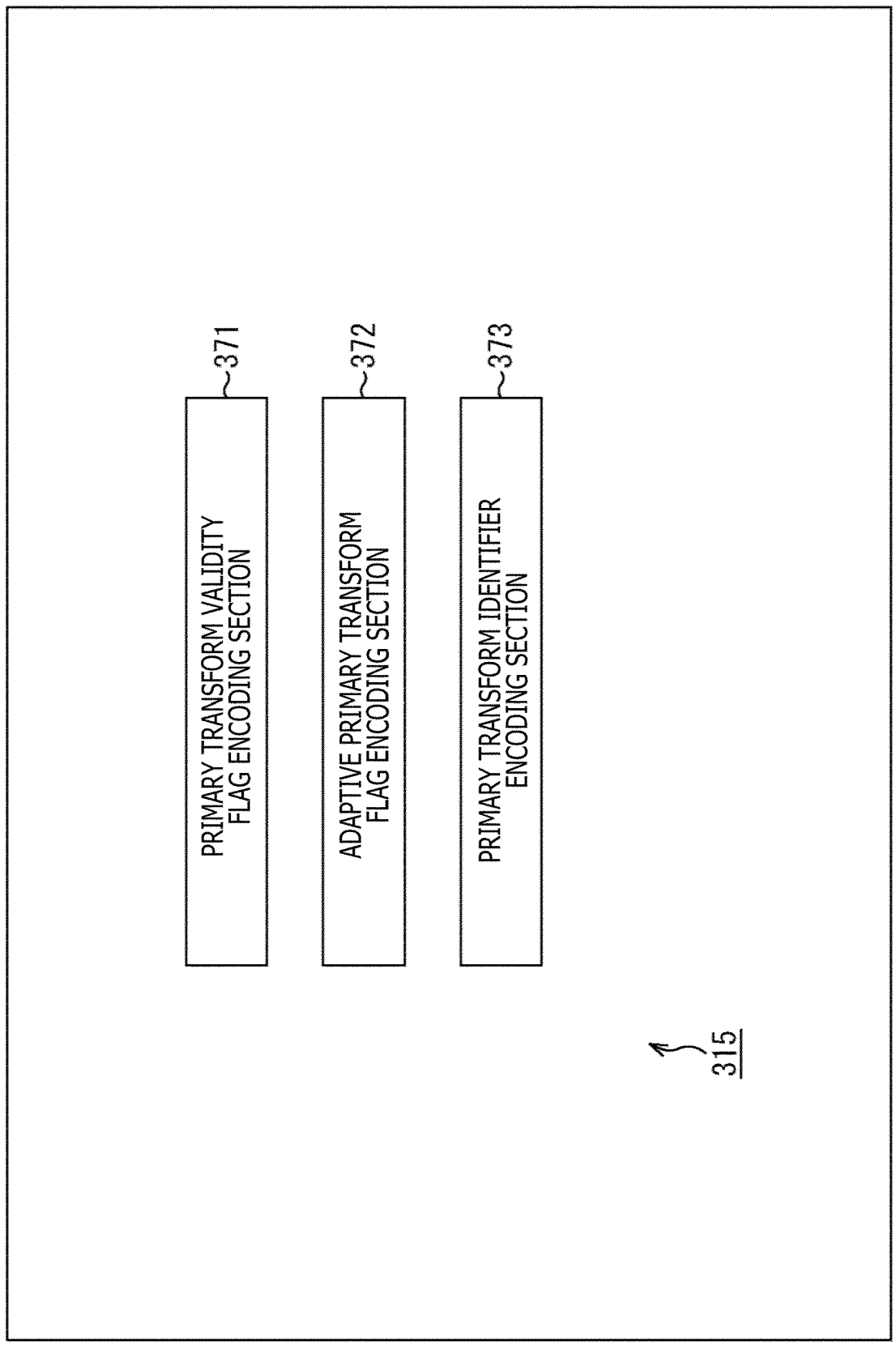
FIG. 34 is a block diagram depicting a principal configuration example of an encoding section.

FIG. 34 is a block diagram depicting a principal configuration example relating to encoding of the primary transform identifier pt_idx of the encoding section 315. As depicted in FIG. 34, the encoding section 315 includes a primary transform validity flag encoding section 371, an adaptive primary transform flag encoding section 372 and a primary transform identifier encoding section 373.

The primary transform validity flag encoding section 371 performs a process relating to encoding of the primary transform validity flag pt_enabled_flag. The adaptive primary transform flag encoding section 372 performs a process relating to encoding of the primary transform flag pt_enabled_flag. The primary transform identifier encoding section 373 performs a process relating to encoding of the primary transform identifier pt_idx.

Figure 35:
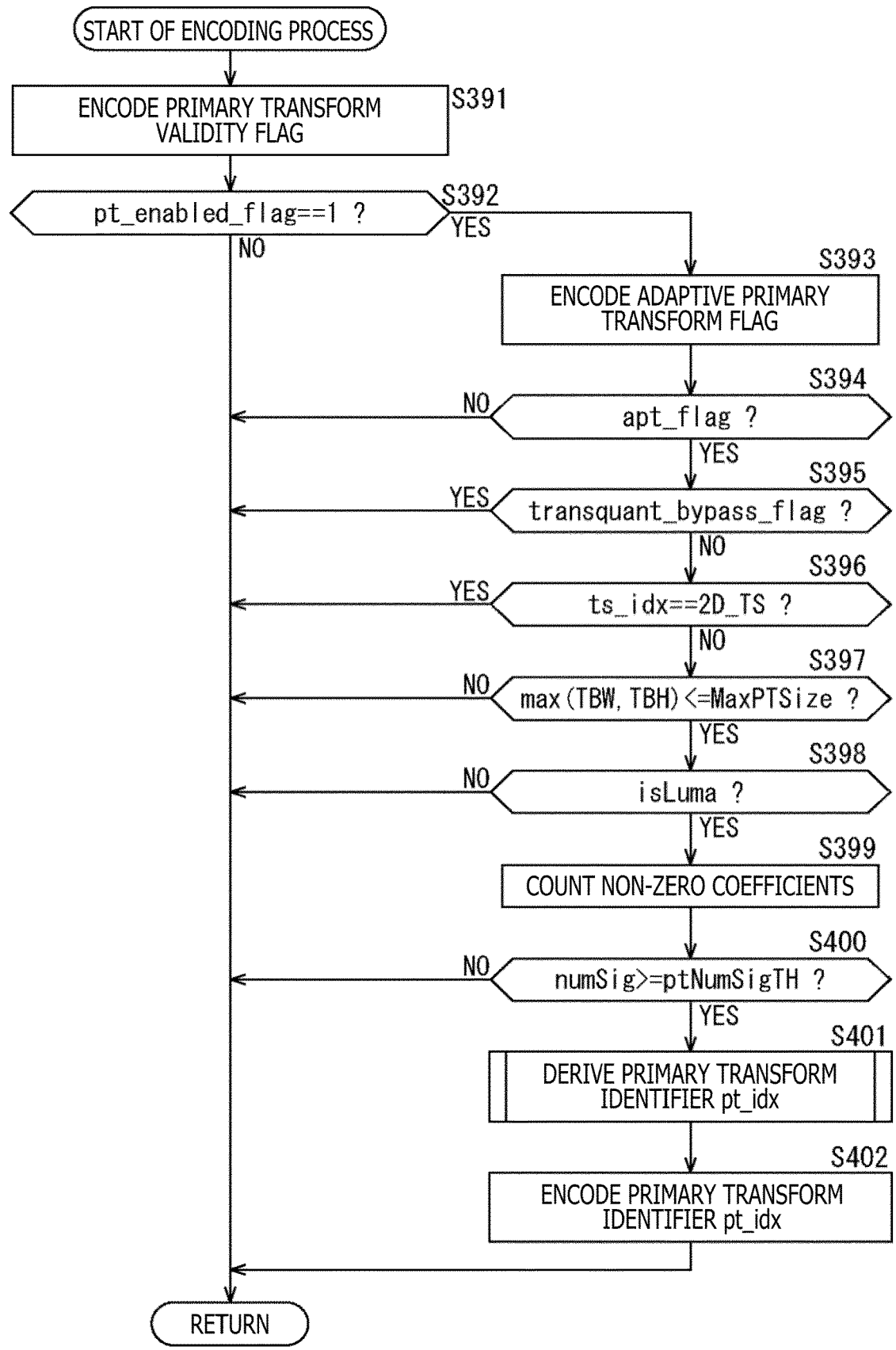
FIG. 35 is a flow chart illustrating an example of a flow of an encoding process.

An example of a flow of the encoding process relating to the primary transform identifier pt_idx, which is executed at step S310 of FIG. 29 by such a encoding section 315 as described above, is described with reference to a flow chart of FIG. 35.

After the encoding process is started, at step S391, the primary transform validity flag encoding section 371 variable length encodes the primary transform validity flag pt_enabled_flag included in the header information HInfo to generate a bit string and outputs the bit string.

At step S392, the adaptive primary transform flag encoding section 372 decides whether or not the primary transform validity flag pt_enabled_flag included in the header information Hinfo is 1 (true). In the case where it is decided that the primary transform validity flag pt_enabled_flag is 0, processes relating to derivation and encoding of the primary transform identifier pt_idx are omitted, and the encoding process ends and the processing returns to FIG. 29. On the other hand, in the case where it is decided that the primary transform validity flag pt_enabled_flag is 1, the processing advances to step S393.

At step S393, the adaptive primary transform flag encoding section 372 variable length encodes the adaptive primary transform flag apt_flag included in the header information HInfo to generate a bit string and outputs the bit string.

At step S394, the adaptive primary transform flag encoding section 372 decides whether or not the adaptive primary transform flag apt_flag is 1 (true). In the case where it is decided that the adaptive primary transform flag apt_flag is 0 (false), processes relating to derivation and encoding of the primary transform identifier pt_idx are omitted and the encoding process is ended, and the processing returns to FIG. 29. On the other hand, in the case where it is decided that the adaptive primary transform flag apt_flag is 1 (true), the processing advances to step S395.

At step S395, the primary transform identifier encoding section 373 decides whether or not the transform quantization bypass flag transquant_bypass_flag is 1 (true). In the case where it is decided that the transform quantization bypass flag transquant_bypass_flag is 1 (true), processes relating derivation and encoding of the primary transform identifier pt_idx are omitted and the encoding process is ended, and the processing returns to FIG. 29. On the other hand, in the case where it is decided that the transform quantization bypass flag transquant_bypass_flag is 0 (false), the processing advances to step S396.

At step S396, the primary transform identifier encoding section 373 decides whether or not the transform skip identifier ts_idx is 2D_TS (two-dimensional transform skip). In the case where it is decided that the transform skip identifier ts_idx is 2D_TS, processes relating to derivation and encoding of the primary transform identifier pt_idx are omitted and the encoding process is ended, and the processing returns to FIG. 29. On the other hand, in the case where it is decided that the transform skip identifier ts_idx is any other than 2D_TS, the processing advances to step S397.

At step S397, the primary transform identifier encoding section 373 decides whether or not at least one of the vertical size or the horizontal size of the transform block is equal to or smaller than the maximum adaptive primary transform block size MaxPTSize (max(TBHSize, TBWSize)<=MaxPTSize). In the case where it is decided that at least one of the vertical size or the horizontal size of the transform block is equal to or smaller than the maximum adaptive primary transform block size MaxPTSize, processes relating to derivation and encoding of the primary transform identifier pt_idx are omitted and the encoding process is ended, and the processing returns to FIG. 29. On the other hand, in the case where it is decided that the transform skip identifier ts_idx is any other than 2D_TS, the processing advances to step S397. In the case where it is decided that both the vertical size and the horizontal size of the transform block are equal to or smaller than the maximum adaptive primary transform block size MaxPTSize, the processing advances to step S398.

At step S398, the primary transform identifier encoding section 398 decides whether or not the transform block of the encoding target is a luminance component. In the case where it is decided that the transform block is not a luminance component, processes relating to derivation and encoding of the primary transform identifier pt_idx are omitted and the encoding process is ended, and the processing returns to FIG. 29. On the other hand, in the case where it is decided that the transform block is a luminance component, the processing advances to step S399.

At step S399, the primary transform identifier encoding section 398 refers to the residual information Rinfo to derive a total number numSig (total number of sig_coeff_flag==1) of non-zero transform coefficients existing in the transform block. After the process at step S399, the processing advances to step S400.

At step S400, the primary transform identifier encoding section 398 decides whether or not the total number numSig of non-zero transform coefficients is equal to or greater than a predetermined threshold value ptNumSigTH (numSig>=ptNumSigTH). In the case where it is decided that the total number numSig of non-zero transform coefficients is smaller than the predetermined threshold value ptNumSigTH, processes relating to derivation and encoding of the primary transform identifier pt_idx are omitted and the encoding process is ended, and the processing returns to FIG. 29. On the other hand, in the case where it is decided that the total number numSig of non-zero transform coefficients is equal to or greater than the predetermined threshold value ptNumSigTH, the processing advances to step S401.

At step S401, the primary transform identifier encoding section 373 refers to the transform skip identifier ts_idx, primary horizontal transform designation flag pt_hor_flag and primary vertical transform designation flag pt_ver_flag to derive a primary transform identifier pt_idx. It is to be noted that detailed derivation of the primary transform identifier pt_idx is hereinafter described.

At step S402, the primary transform identifier encoding section 373 variable length encodes the primary transform identifier pt_idx included in the header information HInfo to generate a bit string and outputs the bit string. When the process at step S402 ends, the encoding process ends and the processing returns to FIG. 29.

Although the foregoing description is directed to processes relating to encoding of the primary transform identifier pt_idx, rearrangement of the processing order of the steps or change of the substance of the processes may be performed as far as practicable.

As described above, in the case where the transform skip identifier ts_idx is 1D_H_TS or 1D_V_TS, since the primary transform identifier pt_idx can be arithmetically encoded as a bin string of 1 bit, the bin string that becomes an encoding target can be reduced from that in an alternative case in which the primary transform identifier pt_idx is arithmetically encoded as a bin string of 2 bits. Accordingly, the processing amount relating to encoding of the primary transform identifier pt_idx can be reduced. Further, since the code amount can be reduced, also enhancement of the encoding efficiency can be implemented.

Figure 36:
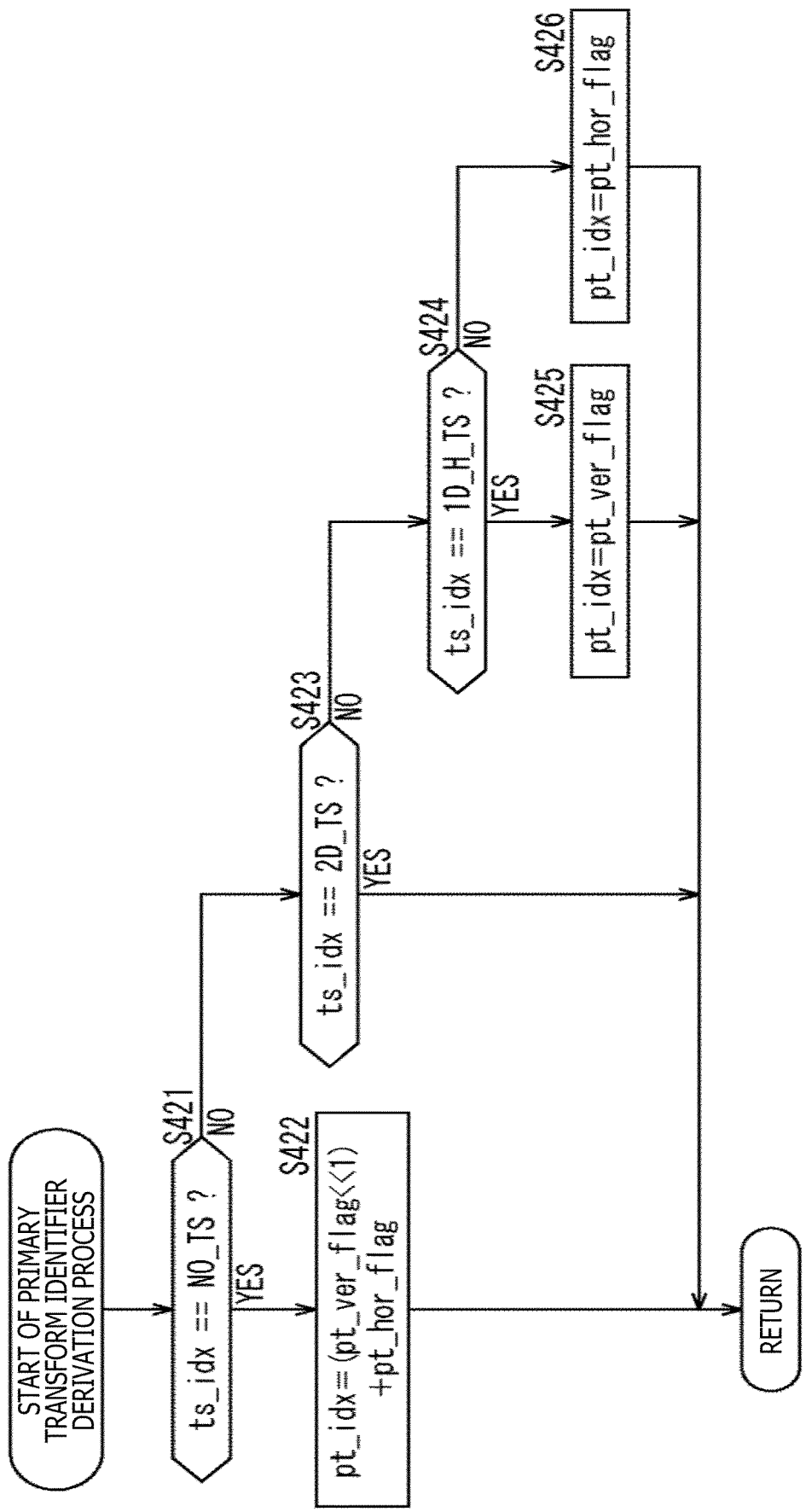
FIG. 36 is a flow chart illustrating an example of a flow of a primary transform identifier derivation process.

Now, an example of a flow of the derivation process of the primary transform identifier pt_idx, which is executed at step S401 of FIG. 35 by the encoding section 315, is described with reference to a flow chart of FIG. 36.

After the primary transform identifier derivation process is started, at step S421, the primary transform identifier encoding section 373 decides whether or not the transform skip identifier ts_idx is NO_TS (not transform skip). In the case where it is decided that the transform skip identifier ts_idx is NO_TS, the processing advances to step S422.

At step S422, the primary transform identifier encoding section 373 derives a primary transform identifier pt_idx from the primary horizontal transform designation flag pt_hor_flag and the primary vertical transform flag pt_ver_flag in accordance with the expression (20) given hereinabove. When the process at step 422 ends, the primary transform identifier derivation process ends and the processing returns to FIG. 35.

On the other hand, in the case where it is decided at step S421 that the transform skip identifier ts_idx is any other than NO_TS, the processing advances to step S423.

At step S423, the primary transform identifier encoding section 373 decides whether or not the transform skip identifier ts_idx is 2D_TS (two-dimensional transform skip). In the case where it is decided that the transform skip identifier ts_idx is 2D_TS, the primary transform identifier derivation process ends, and the processing returns to FIG. 35.

On the other hand, in the case where it is decided at step S423 that the transform skip identifier ts_idx is any other than 2D_TS, the processing advances to step S424.

At step S424, the primary transform identifier encoding section 373 decides whether or not the transform skip identifier ts_idx is 1D_H_TS (one-dimensional transform skip in the horizontal direction). In the case where it is decided that the transform skip identifier ts_idx is 1D_H_TS, the processing advances to step S425.

At step S425, the primary transform identifier encoding section 373 derives the primary transform identifier pt_idx as pt_idx=pt_ver_flag on the basis of the expression (22) given hereinabove. When the process at step S425 ends, the primary transform identifier derivation process ends, and the processing returns to FIG. 35.

On the other hand, in the case where it is decided at step S424 that the transform skip identifier ts_idx is any other than 1D_H_TS, the processing advances to step S426.

At step S426, the primary transform identifier encoding section 373 derives the primary transform identifier pt_idx as pt_idx=pt_hor_flag on the basis of the expression (24) given hereinabove. When the process at step S426 ends, the primary transform identifier derivation process ends, and the processing returns to FIG. 35.

Naturally, also this process may be subjected to rearrangement of the processing order of the steps or change of the substance of the processes as far as practicable.

<Encoding of Secondary Transform Identifier st_idx>

Figure 37:
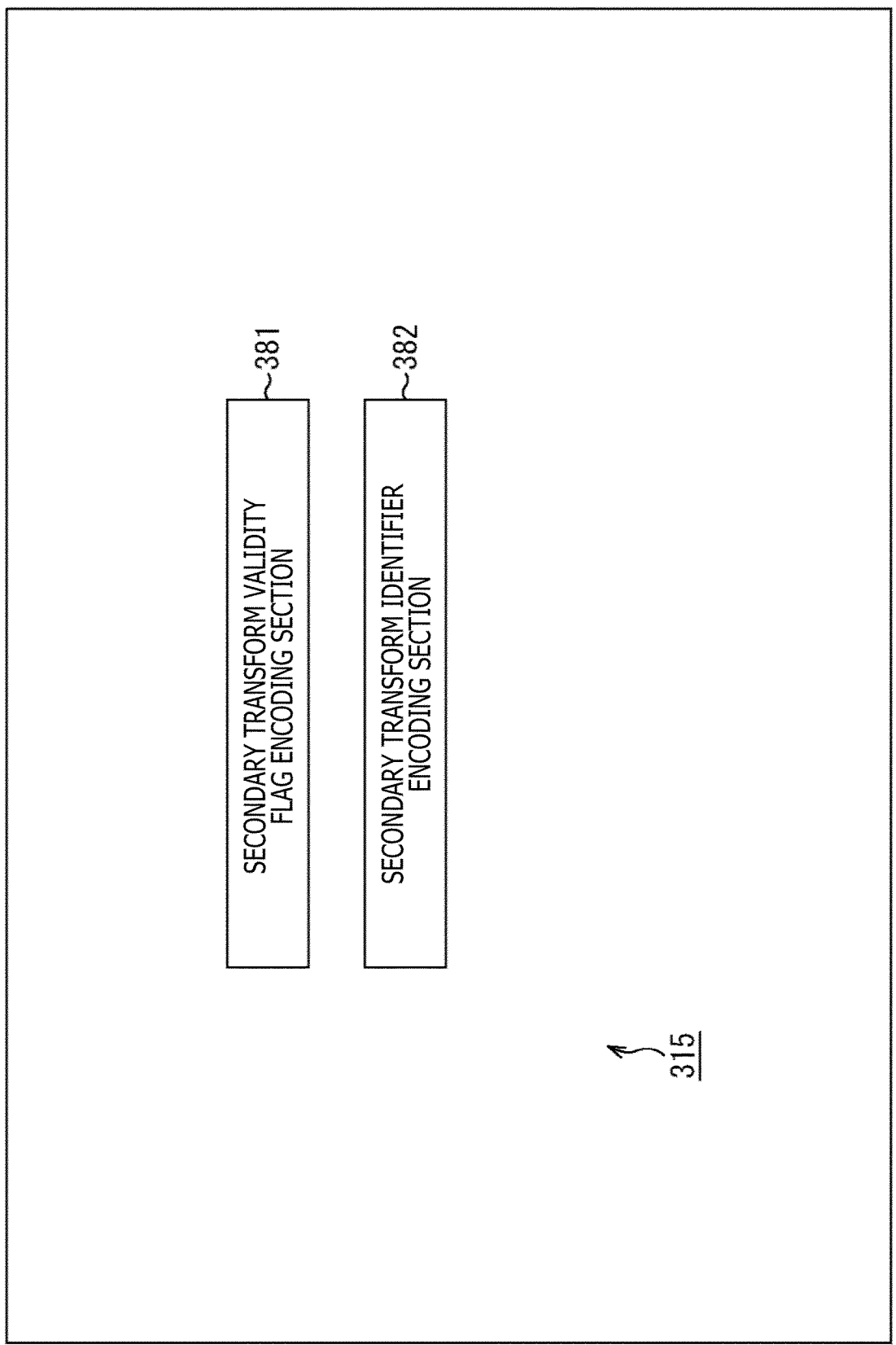
FIG. 37 is a block diagram depicting a principal configuration example of an encoding section.

FIG. 37 is a block diagram depicting a principal configuration example relating to encoding of the secondary transform identifier st_idx of the encoding section 315. As depicted in FIG. 37, the encoding section 315 includes a secondary transform validity flag encoding section 381 and a secondary transform identifier encoding section 382.

The secondary transform validity flag encoding section 381 performs a process relating to encoding of the secondary transform validity flag st_enabled_flag. The secondary transform identifier encoding section 382 performs a process relating to encoding of the secondary transform identifier st_idx.

Figure 38:
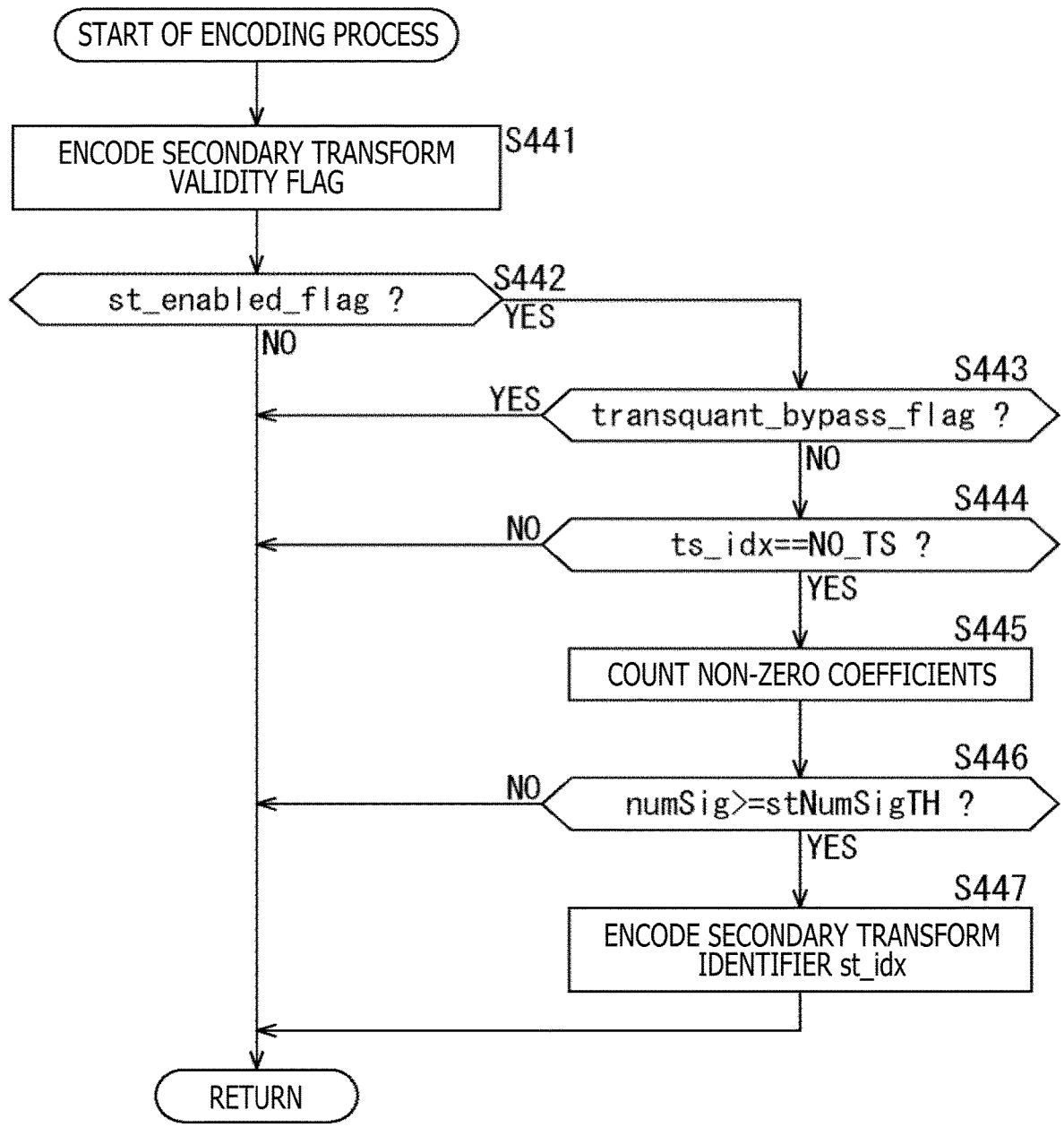
FIG. 38 is a flow chart illustrating an example of a flow of an encoding process.

An example of a flow of the encoding process relating to the secondary transform identifier st_idx, which is executed at step S310 of FIG. 29 by the encoding section 315, is described with reference to a flow chart of FIG. 38.

After the encoding process is started, at step S441, the secondary transform validity flag encoding section 381 variable length encodes the secondary transform validity flag st_enabled_flag included in the header information HInfo to generate a bit string and outputs the bit string.

At step S442, the secondary transform identifier encoding section 382 decides whether or not the secondary transform validity flag st_enabled_flag included in the header information Hinfo is 1 (true). In the case where it is decided that the secondary transform validity flag st_enabled_flag is 0 (false), the encoding process ends and the processing returns to FIG. 29.

On the other hand, in the case where it is decided at step S442 that the secondary transform validity flag st_enabled_flag is 1 (true), the processing advances to step S443.

At step S443, the secondary transform identifier encoding section 382 decides whether or not the transform quantization bypass flag transquant_bypass_flag is 1 (true). In the case where it is decided that the transform quantization bypass flag transquant_bypass_flag is 1 (true), the encoding process is ended and the processing returns to FIG. 29. On the other hand, in the case where it is decided that the transform quantization bypass flag transquant_bypass_flag is 0 (false), the processing advances to step S444.

At step S444, the secondary transform identifier encoding section 382 decides whether or not the transform skip identifier ts_idx is NO_TS (transform skip is not to be performed). In the case where it is decided that the transform skip identifier ts_idx is any other than NO_TS, the encoding process is ended and the processing returns to FIG. 29. On the other hand, in the case where it is decided that the transform skip identifier ts_idx is NO_TS, the processing advances to step S445.

At step S445, the secondary transform identifier encoding section 382 refers to the residual information Rinfo to derive a total number numSig (total number of sig_coeff_flag==1) of non-zero transform coefficients existing in the transform block.

At step S446, the secondary transform identifier encoding section 382 decides whether or not the total number numSig of non-zero transform coefficients is equal to or greater than a predetermined threshold value TH (numSig>=stNumSigTH). In the case where it is decided that the total number numSig of non-zero transform coefficients is smaller than the predetermined threshold value TH (numSig<stNumSigTH), namely, that the logical value of the conditional expression is 0 (false), the secondary transform identifier encoding section 382 ends the encoding process, and the processing returns to FIG. 29. On the other hand, in the case where it is decided that the total number numSig of non-zero transform coefficients is equal to or greater than the predetermined threshold value TH (numSig>=stNumSigTH), namely, that the logical value of the conditional expression is 1 (true), the processing advances to step S447.

At step S447, the secondary transform identifier encoding section 382 variable length encodes the secondary transform identifier st_idx included in the header information HInfo to generate a bit string and outputs the bit string.

When the process at step S447 ends, the encoding process ends, and the processing returns to FIG. 29.

Also this process may be subjected to rearrangement of the processing order of the steps or change of the substance of the processes as far as practicable. Further, although the control parameter for a secondary transform in the foregoing description is the secondary transform identifier st_idx, it may otherwise be the secondary transform flag st_flag.

By the processes described above, in the case where a secondary transform identifier is to be encoded in a transform block unit, the encoding process of a secondary transform identifier can be omitted in the case where two-dimensional transform skip or one-dimensional transform skip is applied in the case of (ts_idx !=NO_TS) in comparison with the related art. In other words, the processing amount relating to encoding of a secondary transform identifier and the code amount can be reduced.

7. Seventh Embodiment

<Encoding of Primary Horizontal Transform Designation Flag and Primary Vertical Transform Designation Flag>

While it is described in the foregoing description that a primary transform identifier pt_idx is derived from a primary horizontal transform designation flag pt_hor_flag and a primary vertical transform designation flag pt_ver_flag, this is not restrictive. For example, in place of encoding the primary transform identifier pt_idx, the primary horizontal transform designation flag pt_hor_flag and the primary vertical transform designation flag pt_ver_flag may be encoded.

Figure 39:
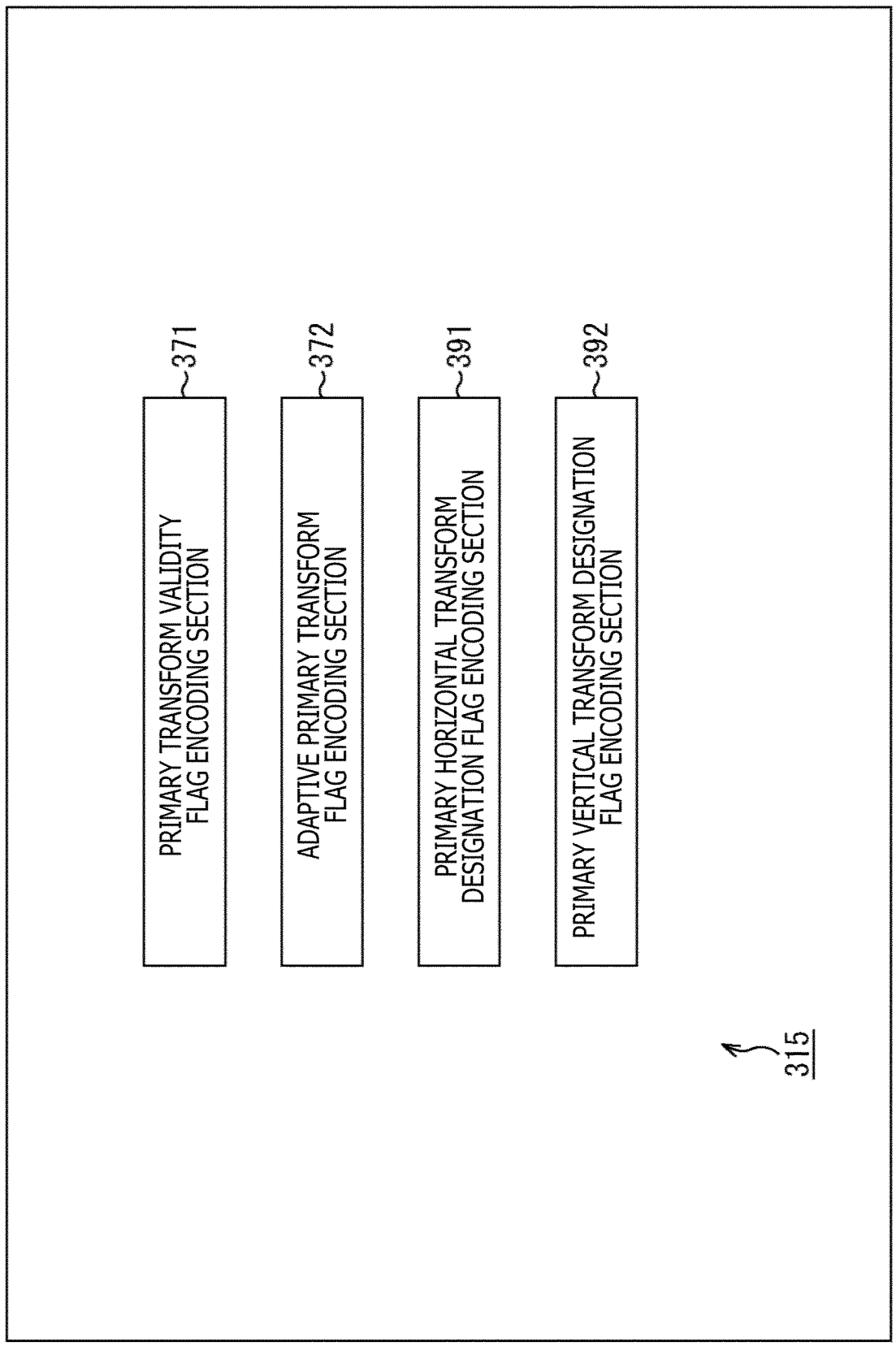
FIG. 39 is a block diagram depicting a principal configuration example of an encoding section.

FIG. 39 is a block diagram depicting a principal configuration example relating to encoding of the primary horizontal transform designation flag pt_hor_flag and the primary vertical transform designation flag pt_ver_flag of the encoding section 315. As depicted in FIG. 39, the encoding section 315 in this case includes a primary transform validity flag encoding section 371, an adaptive primary transform flag encoding section 372, a primary horizontal transform designation flag encoding section 391 and a primary vertical transform designation flag encoding section 392.

The primary horizontal transform designation flag encoding section 391 performs a process relating to encoding of the primary horizontal transform designation flag pt_hor_flag. The primary vertical transform designation flag encoding section 392 performs a process relating to encoding of the primary vertical transform designation flag pt_ver_flag.

The primary horizontal transform designation flag encoding section 391 variable length encodes a primary horizontal transform designation flag pt_hor_flag from a bit string of encoded data #1 in the case where conditions of an if statement to which reference symbol SYN15 is appended in the syntax depicted in FIG. 25, namely, in the case where the transform skip identifier ts_idx is NO_TS or 1D_V_TS (ts_idx==NO_TS||ts_idx==1D_V_TS); the transform quantization bypass flag is 0 (false) (transquant_bypass_flag==0); the transform block is a luminance component (cIdx==0); the adaptive primary transform flag apt_flag is 1 (true) (apt_flag==1); and besides the total number numSig of non-zero transform coefficients in the transform block is equal to or greater than the threshold value ptNumSigTH (numSig>=ptNumSigTH). In any other case, the primary horizontal transform designation flag encoding section 391 omits encoding of the primary horizontal transform designation flag pt_hor_flag.

Similarly, the primary vertical transform designation flag encoding section 392 variable length encodes a primary vertical transform designation flag pt_ver_flag to generate a bit string in the case where conditions of an if statement to which reference symbol SYN17 is appended in the syntax depicted in FIG. 25, namely, in the case where the transform skip identifier ts_idx is NO_TS or 1D_H_TS (ts_idx==NO_TS||ts_idx==1D_H_TS); the transform quantization bypass flag is 0 (false) (transquant_bypass_flag==0); the transform block is a luminance component (cIdx==0); the adaptive primary transform flag apt_flag is 1 (true) (apt_flag==1); and besides the total number numSig of non-zero transform coefficients in the transform block is equal to or greater than the threshold value ptNumSigTH (numSig>=ptNumSigTH). In any other case, the primary vertical transform designation flag encoding section 392 omits encoding of the primary vertical transform designation flag pt_ver_flag.

By the foregoing, in the case where the transform skip identifier ts_idx is 1D_H_TS, encoding of the primary horizontal transform designation flag pt_hor_flag can be omitted. Similarly, in the case where the transform skip identifier ts_idx is 1D_V_TS, encoding of the primary vertical transform designation flag pt_ver_flag can be omitted. Accordingly, the processing amount relating to encoding of the primary horizontal transform designation flag pt_hor_flag and the primary vertical transform designation flag pt_ver_flag can be reduced. Further, since increase of the code amount can be suppressed, the encoding efficiency can be enhanced.

8. Eighth Embodiment

<Other Configuration of Transform Section>

Although it is described that, in the fourth embodiment, in the case where a primary horizontal transform is to be skipped, the switch 342 of the primary transform section 332 supplies a prediction residual D to the switch 344, scaling for quantization may be performed thereupon. Further, although it is described that, in the fourth embodiment, in the case where a primary vertical transform is to be skipped, the switch 344 of the primary transform section 332 outputs transform coefficients Coeff_Phor after a primary horizontal transform as transform coefficients Coeff_P after a primary transform to the outside (secondary transform section 333), scaling for quantization may be performed thereupon.

Figure 40:
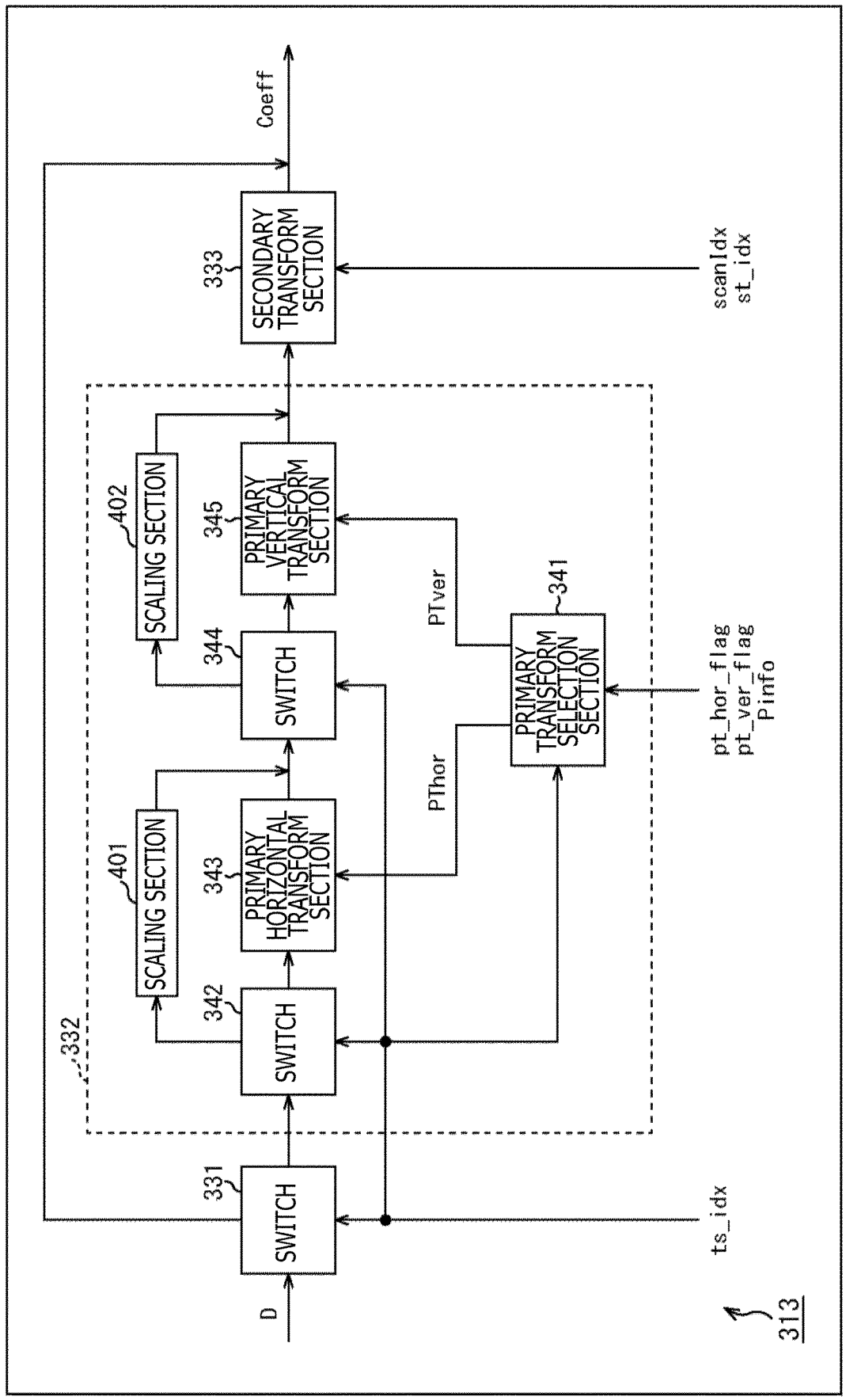
FIG. 40 is a block diagram depicting a principal configuration example of a transform section.

FIG. 40 is a block diagram depicting a principal configuration example of the transform section 313 in this case. As depicted in FIG. 40, the transform section 313 also in this case has a basically similar configuration to that in the case of FIG. 28. It is to be noted, however, that, also in this case, the primary transform section 332 includes a scaling section 401 and another scaling section 402.

In the case where a primary horizontal transform is to be skipped, the switch 342 supplies a transform coefficient D to the scaling section 401. The scaling section 401 performs scaling for the transform coefficient D supplied from the switch 342. For example, the scaling section 401 performs bit shift arithmetic operation of N (N is a natural number) bits for normalizing the transform coefficients supplied thereto such that they have a norm same as that in the case where a primary horizontal transform is carried out. The scaling section 401 supplies the scaled transform coefficients to the switch 344.

In the case where a primary vertical transform is to be skipped, the switch 344 supplies transform coefficients Coeff_Phor after a primary horizontal transform as a prediction residual D' to the scaling section 402. The scaling section 402 performs scaling for the transform coefficients Coeff_Phor after a primary horizontal transform supplied from the switch 344 similarly as in the case of the scaling section 401. For example, the scaling section 402 performs bit shift arithmetic operation of N (N is a natural number) bits for normalizing the transform coefficients supplied thereto such that they have a norm same as that in the case where a primary vertical transform is carried out. The scaling section 402 supplies the scaled prediction residual D' to the outside.

Since this makes it possible to suppress the dynamic range width of the transform coefficients within a predetermined range, increase of the load of decoding can be suppressed.

9. Ninth Embodiment

<Data Unit of Information>

The data units to which information relating to an image or information relating to encoding or decoding of an image described hereinabove (or of data to be made a target) are arbitrary and are not limited to the examples described hereinabove. For example, such information may be set for each of a TU, a TB, a PU, a PB, a CU, an LCU, a sub block, a block, a tile, a slice, a picture, a sequence or a component, or data of such data units may be made a target. Naturally, the data units are set for each piece of information. In short, all information may not be set (or made a target) for each same data unit. It is to be noted that storage locations of such information are arbitrary, and the information may be stored for each header, each parameter set or the like of the data units described above. As an alternative, such information may be stored into a plurality of locations.

<Control Information>

Control information relating to the present technology described hereinabove in connection with the embodiments may be transmitted from the encoding side to the decoding side. For example, control information (for example, enabled_flag) for controlling whether or not it is to be permitted (or inhibited) to apply the present technology described hereinabove. Further, for example, control information that designates an upper limit or a lower limit or both of them to a block size to which application of the present technology described hereinabove is to be permitted (or inhibited) may be transmitted.

<Encoding and Decoding>

The present technology can be applied to arbitrary image encoding or decoding for performing a primary transform and a secondary transform (an inverse secondary transform and an inverse primary transform). In short, specifications for a transform (inverse transform), quantization (dequantization), encoding (decoding), prediction and so forth are arbitrary, and they are not limited to the examples described hereinabove. For example, in a transform (inverse transform), a (inverse) transform other than a (inverse) primary transform and a (inverse) secondary transform (namely, three or more (inverse) transforms) may be performed. Further, encoding (decoding) may be of the reversible type or of the irreversible type. Furthermore, quantization (dequantization), prediction and so forth may be omitted. Further, a process that has not been described such as a filter process may be performed.

<Application Fields of Present Technology>

Systems, apparatuses, processing sections and so forth to which the present technology is applied can be utilized in arbitrary fields such as, for example, transportation, medical care, crime prevention, agriculture, livestock industry, mining, beauty, factory, home appliances, weather, natural surveillance and so forth.

For example, the present technology can be applied also to systems and devices that transmit an image that is provided for viewing. Further, for example, the present technology can be applied also to systems and devices that are provided for transportation. Furthermore, for example, the present technology can be applied also to systems and devices that are provided for security use. Further, for example, the present technology can be applied also to systems and devices that are provided for sports. Furthermore, for example, the present technology can be applied also to systems and devices that are provided for agriculture. Further, for example, the present technology can be applied also to systems and devices that are provided for livestock industry. Furthermore, for example, the present technology can be applied also to systems and devices for monitoring conditions of the nature such as volcanoes, forests, oceans and so forth. Further, the present technology can be applied to a weather observation system or a weather observation apparatus for observing, for example, the weather, temperature, humidity, wind speed, sunshine hours and so forth. Furthermore, the present technology can be applied also to systems, devices and so forth for observing the ecology of wildlife such as, for example, birds, fish, reptiles, amphibians, mammals, insects, plants and so forth.

<Application to Multi-View Image Encoding and Decoding System>

The series of processes described hereinabove can be applied to a multi-view image encoding and decoding system that performs encoding and decoding of a multi-view image including images of a plurality of viewpoints (views (view)). In this case, it is sufficient if the present technology is applied to encoding or decoding of each viewpoint (view (view)).

<Application to Hierarchical Image Encoding and Decoding System>

Further, the series of processes described above can be applied to a hierarchical image encoding (scalable encoding) and decoding system that performs encoding and decoding of a hierarchical image layered (hierarchized) in a plurality of layers (hierarchies) so as to have a scalability (scalability) function in regard to a predetermined parameter. In this case, the present technology may be applied to encoding and decoding of each hierarchy (layer).

<Computer>

While the series of processes described above can be executed by hardware, it may otherwise be executed by software. In the case where the series of processes is executed by software, a program that constructs the software is installed into a computer. Here, the computer includes a computer incorporated in hardware for exclusive use, for example, a personal computer for universal use that can execute various functions by installing various programs, and so forth.

Figure 41:
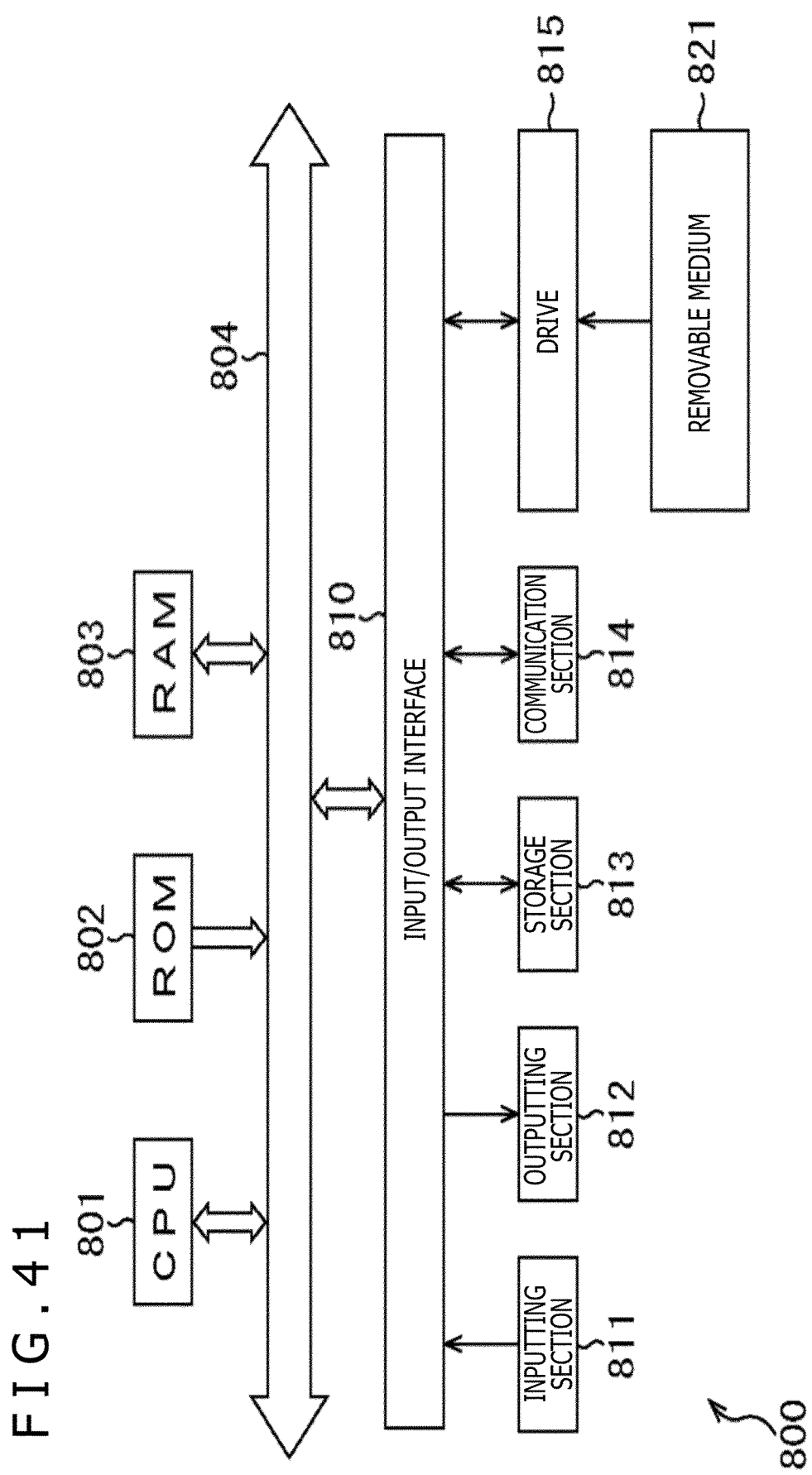
FIG. 41 is a block diagram depicting a principal configuration example of a computer.

FIG. 41 is a block diagram depicting a configuration example of hardware of a computer that executes the series of processes described hereinabove in accordance with a program.

In the computer 800 depicted in FIG. 41, a CPU (Central Processing Unit) 801, a ROM (Read Only Memory) 802 and a RAM (Random Access Memory) 803 are connected to each other by a bus 804.

To the bus 804, also an input/output interface 810 is connected. To the input/output interface 810, an inputting section 811, an outputting section 812, a storage section 813, a communication section 814 and a drive 815 are connected.

The inputting section 811 includes, for example, a keyboard, a mouse, a microphone, a touch panel, input terminals and so forth. The outputting section 812 includes, for example, a display, a speaker, output terminals and so forth. The storage section 813 includes, for example, a hard disk, a RAM disk, a nonvolatile memory and so forth. The communication section 814 includes, for example, a network interface or the like. The drive 815 drives a removable medium 821 such as a magnetic disk, an optical disk, a magneto-optical disk, a semiconductor memory or the like.

In the computer configured in such a manner as described above, the CPU 801 loads a program stored, for example, in the storage section 813 into the RAM 803 through the input/output interface 810 and the bus 804 to perform the series of processes described above. Into the RAM 803, also data and so forth necessary when the CPU 801 executes various processes are suitably stored.

The program that is executed by the computer (CPU 801) can be recorded into and applied to the removable medium 821, for example, as a package medium or the like. In this case, the program can be installed into the storage section 813 through the input/output interface 810 by mounting the removable medium 821 on the drive 815.

Further, the program can be provided through a wired or wireless transmission medium such as a local area network, the Internet, a digital satellite broadcast or the like. In this case, the program can be received by the communication section 814 and installed into the storage section 813.

Further, the program can be installed in advance into the ROM 802 or the storage section 813.

<Application of Present Technology>

The image encoding apparatus 300 and the image decoding apparatus 100 according to the embodiments described above can be applied to various electronic apparatus such as, for example, a transmitter or a receiver in satellite broadcasting, cable broadcasting of a cable TV or the like, delivery on the Internet, delivery to terminals by cellular communication, or a recording apparatus for recording an image on a medium such as an optical disk, a magnetic disk, a flash memory and so forth, a reproduction apparatus that reproduces from an image from such storage media, and so forth.

First Application Example: Television Receiver

Figure 42:
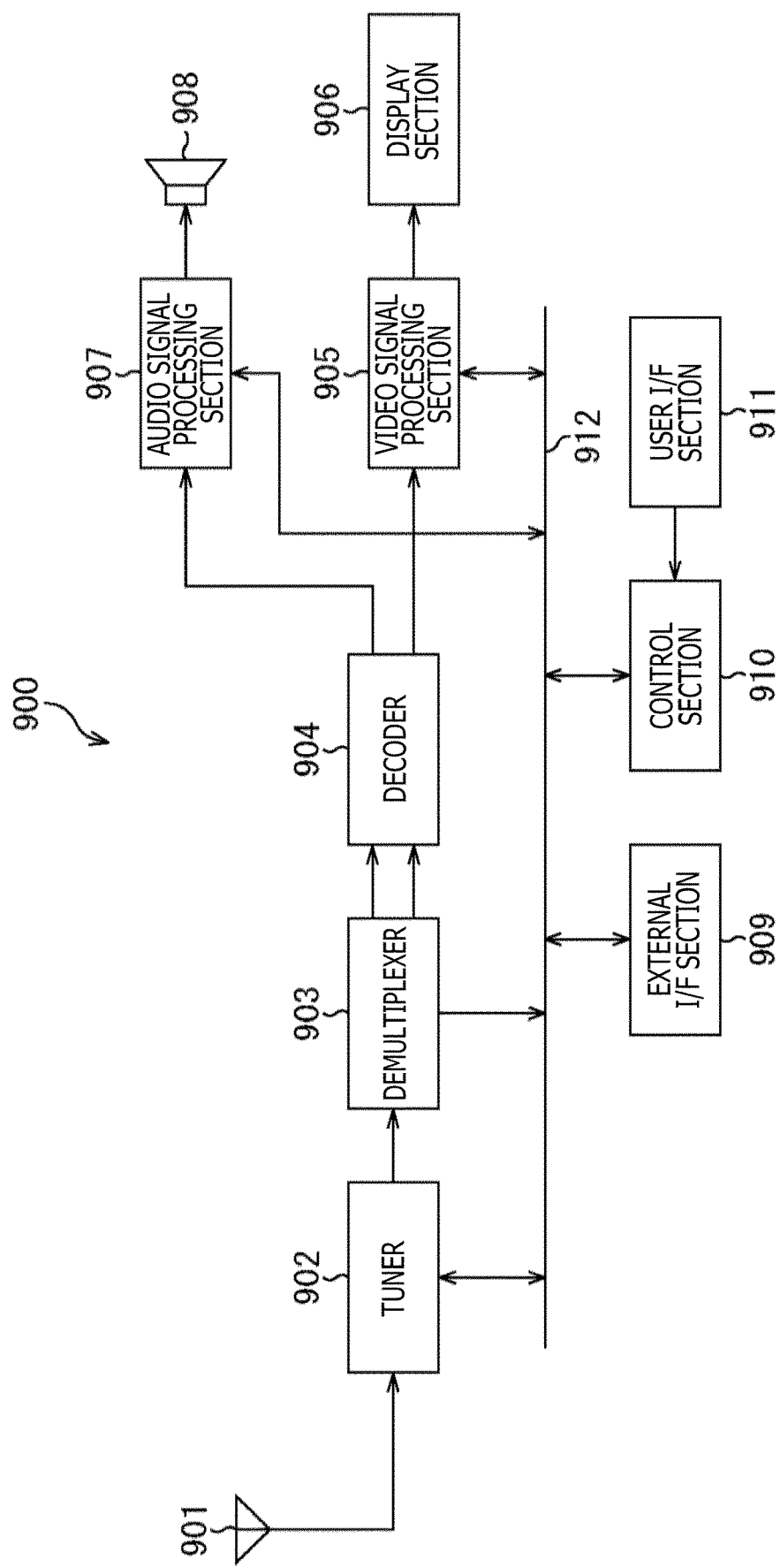
FIG. 42 is a block diagram depicting an example of general configuration of a television apparatus.

FIG. 42 depicts an example of a schematic configuration of a television apparatus to which the embodiments described hereinabove are applied. The television apparatus 900 includes an antenna 901, a tuner 902, a demultiplexer 903, a decoder 904, a video signal processing section 905, a display section 906, an audio signal processing section 907, a speaker 908, an external interface (I/F) section 909, a control section 910, a user interface (I/F) section 911 and a bus 912.

The tuner 902 extracts a signal of a desired channel from broadcasting signals received through the antenna 901 and demodulates the extracted signal. Then, the tuner 902 outputs an encoded bit stream obtained by the demodulation to the demultiplexer 903. In other words, the tuner 902 has a role as a transmission section in the television apparatus 900, which receives an encoded stream in which images are encoded.

The demultiplexer 903 demultiplexes a video stream and an audio stream of a broadcasting program of a viewing target from an encoded bit stream and outputs demultiplexed streams to the decoder 904. Further, the demultiplexer 903 extracts auxiliary data such as an EPG (Electronic Program Guide) from the encoded bit stream and supplies the extracted data to the control section 910. It is to be noted that, in the case where the encoded bit stream is in a scrambled state, the demultiplexer 903 may perform descrambling.

The decoder 904 decodes a video stream and an audio stream inputted from the demultiplexer 903. Then, the decoder 904 outputs video data generated by the decoding process to the video signal processing section 905. Further, the decoder 904 outputs audio data generated by the decoding process to the audio signal processing section 907.

The video signal processing section 905 reproduces video data inputted from the decoder 904 and causes the display section 906 to display a video. Further, the video signal processing section 905 may cause the display section 906 to display an application screen image supplied thereto through a network. Further, the video signal processing section 905 may perform an additional process such as, for example, noise removal from video data in response to settings. Furthermore, the video signal processing section 905 may generate an image of a GUI (Graphical User Interface) such as, for example, a menu, a button or a cursor and superpose the generated image on an output image.

The display section 906 is driven by a driving signal supplied from the video signal processing section 905 and displays a video or an image on a video face of a display device (for example, a liquid crystal display, a plasma display or an OELD (Organic Electro Luminescence Display) (organic EL display) or the like).

The audio signal processing section 907 performs a reproduction process such as D/A conversion and amplification for audio data inputted from the decoder 904 and causes the speaker 908 to output sound. Further, the audio signal processing section 907 may perform an additional process such as noise removal for the audio data.

The external interface section 909 is an interface for connecting the television apparatus 900 and an external apparatus or a network to each other. For example, a video stream or an audio stream received through the external interface section 909 may be decoded by the decoder 904. In particular, also the external interface section 909 has a role as a transmission section in the television apparatus 900, which receives an encoded stream in which an image is encoded.

The control section 910 includes a processor such as a CPU, and a memory such as a RAM and a ROM. The memory stores therein a program to be executed by the CPU, program data, EPG data, data acquired through a network and so forth. The program stored in the memory is read by the CPU and executed, for example, upon activation of the television apparatus 900. The CPU executes the program to control operation of the television apparatus 900, for example, in response to an operation signal inputted from the user interface section 911.

The user interface section 911 is connected to the control section 910. The user interface section 911 includes, for example, buttons and switches for allowing a user to operate the television apparatus 900, a reception section for a remote controlling signal and so forth. The user interface section 911 detects an operation by a user through the components mentioned to generate an operation signal and outputs the generated operation signal to the control section 910.

The bus 912 connects the tuner 902, demultiplexer 903, decoder 904, video signal processing section 905, audio signal processing section 907, external interface section 909 and control section 910 to each other.

In the television apparatus 900 configured in such a manner as described above, the decoder 904 may have the functions of the image decoding apparatus 100 described hereinabove. In short, the decoder 904 may decode encoded data by the methods described in the foregoing description of the embodiments. This makes it possible for the television apparatus 900 to achieve advantageous effects similar to those of the embodiments described hereinabove with reference to FIGS. 1 to 40.

Further, the television apparatus 900 configured in such a manner as described above may be configured such that the video signal processing section 905 can encode image data supplied, for example, from the decoder 904 and output resulting encoded data to the outside of the television apparatus 900 through the external interface section 909. Further, the video signal processing section 905 may have the functions of the image encoding apparatus 300 described hereinabove. In short, the video signal processing section 905 may encode image data supplied from the decoder 904 by the methods described hereinabove in connection with the embodiments described hereinabove. This makes it possible for the television apparatus 900 to achieve advantageous effects similar to those of the embodiments described hereinabove with reference to FIGS. 1 to 40.

Second Application Example: Portable Telephone Set

Figure 43:
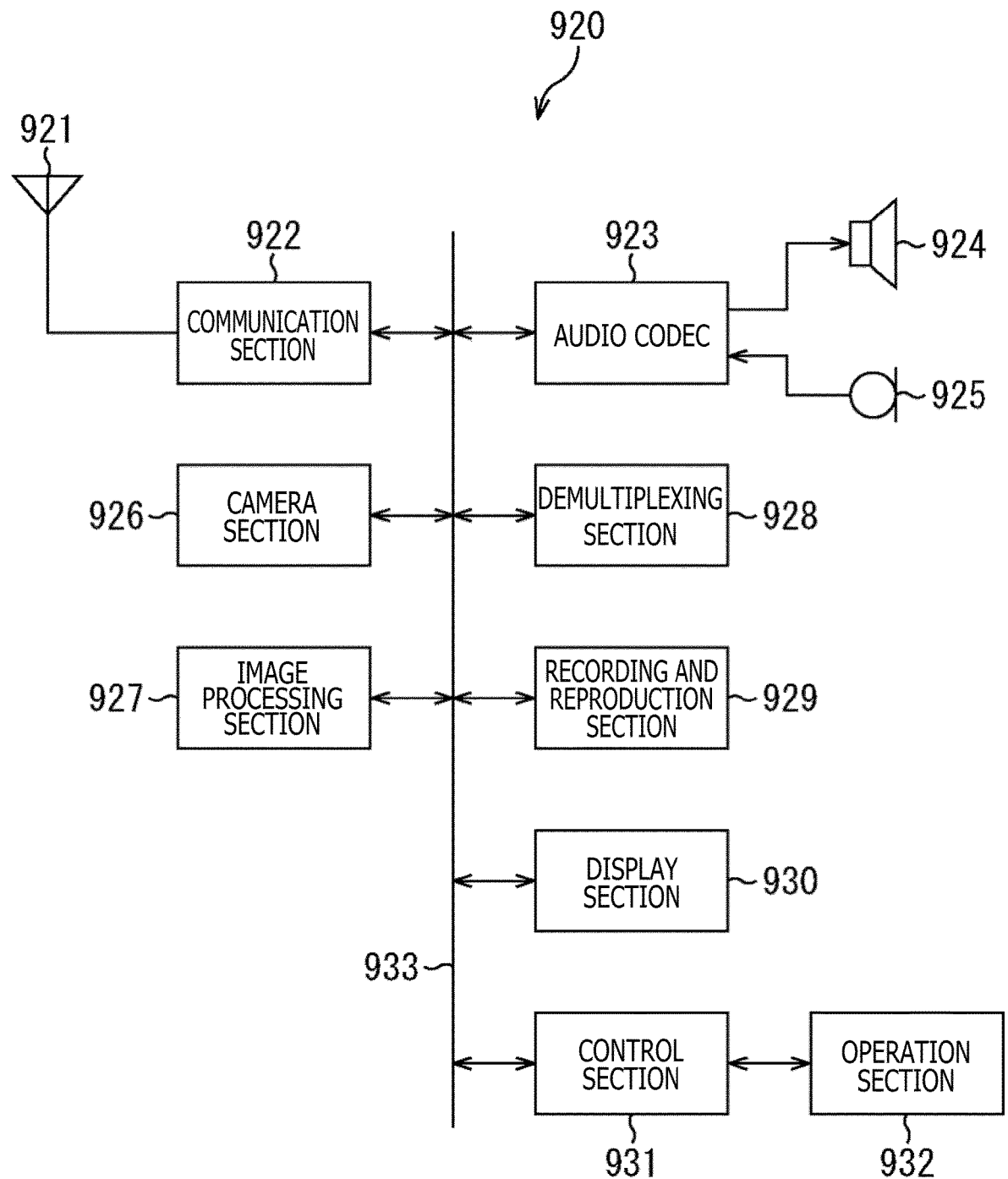
FIG. 43 is a block diagram depicting an example of general configuration of a portable telephone set.

FIG. 43 depicts an example of a schematic configuration of a portable telephone set to which the embodiments described hereinabove are applied. The portable telephone set 920 includes an antenna 921, a communication section 922, an audio codec 923, a speaker 924, a microphone 925, a camera section 926, an image processing section 927, a demultiplexing section 928, a recording and reproduction section 929, a display section 930, a control section 931, an operation section 932 and a bus 933.

The antenna 921 is connected to the communication section 922. The speaker 924 and the microphone 925 are connected to the audio codec 923. The operation section 932 is connected to the control section 931. The bus 933 connects the communication section 922, audio codec 923, camera section 926, image processing section 927, demultiplexing section 928, recording and reproduction section 929, display section 930 and control section 931 to each other.

The portable telephone set 920 performs various operations such as transmission and reception of a voice signal, transmission and reception of an electronic mail or image data, imaging of an image, recording of data and so forth in various operation modes including a speech mode, a data communication mode, an imaging mode and a videophone mode.

In the speech mode, an analog voice signal generated by the microphone 925 is supplied to the audio codec 923. The audio codec 923 converts the analog voice signal into voice data and A/D converts and compresses the voice data after the conversion. Then, the audio codec 923 outputs the compressed voice data to the communication section 922. The communication section 922 encodes and modulates the voice data to generate a transmission signal. Then, the communication section 922 transmits the generated transmission signal to a base station (not depicted) through the antenna 921. Further, the communication section 922 amplifies and frequency converts a wireless signal received through the antenna 921 to acquire a reception signal. Then, the communication section 922 demodulates and decodes the reception signal to generate voice data and outputs the generated voice data to the audio codec 923. The audio codec 923 decompresses and D/A converts the voice data to generate an analog voice signal. Then, the audio codec 923 supplies the generated voice signal to the speaker 924 such that voice is outputted.

On the other hand, in the data communication mode, for example, the control section 931 generates character data that configure an electronic mail in response to an operation by a user through the operation section 932. Further, the control section 931 controls the display section 930 to display characters thereon. Further, the control section 931 generates electronic mail data in response to a transmission instruction from the user through the operation section 932 and outputs the generated electronic mail data to the communication section 922. The communication section 922 encodes and modulates the electronic mail data to generate a transmission signal. Then, the communication section 922 transmits the generated transmission signal to a base station (not depicted) through the antenna 921. Further, the communication section 922 amplifies and frequency converts a wireless signal received through the antenna 921 to acquire a reception signal. Then, the communication section 922 demodulates and decodes the reception signal to restore electronic mail data and outputs the restored electronic mail data to the control section 931. The control section 931 controls the display section 930 to display the substance of the electronic mail and supplies the electronic mail data to the recording and reproduction section 929 such that the electronic mail data is written into a storage medium of the recording and reproduction section 929.

The recording and reproduction section 929 has an arbitrary readable/writable storage medium. For example, the storage medium may be a built-in type storage medium such as a RAM or a flash memory or may be an externally mounted storage medium such as a hard disk, a magnetic disk, a magneto-optical disk, an optical disk, a USB (Universal Serial Bus) memory or a memory card.

Further, in the imaging mode, for example, the camera section 926 images an image pickup object to generate image data and outputs the generated image data to the image processing section 927. The image processing section 927 encodes the image data inputted from the camera section 926 and supplies an encoded stream to the recording and reproduction section 929 such that it is written into a storage medium of the recording and reproduction section 929.

Furthermore, in the image display mode, the recording and reproduction section 929 reads out an encoded stream recorded in a storage medium and outputs the encoded stream to the image processing section 927. The image processing section 927 decodes the encoded stream inputted from the recording and reproduction section 929 and supplies image data to the display section 930 such that an image of the image data is displayed.

Further, in the videophone mode, for example, the demultiplexing section 928 multiplexes a video stream encoded by the image processing section 927 and an audio stream inputted from the audio codec 923 and outputs the multiplexed stream to the communication section 922. The communication section 922 encodes and modulates the stream to generate a transmission signal. Then, the communication section 922 transmits the generated transmission signal to a base station (not depicted) through the antenna 921. Meanwhile, the communication section 922 amplifies and frequency converts a wireless signal received through the antenna 921 to acquire a reception signal. The transmission signal and the reception signal can include an encoded bit stream. Then, the communication section 922 demodulates and decodes the reception signal to restore a stream and outputs the restored stream to the demultiplexing section 928. The demultiplexing section 928 demultiplexes a video stream and an audio stream from the inputted stream and outputs the video stream to the image processing section 927 while it outputs the audio stream to the audio codec 923. The image processing section 927 decodes the video stream to generate video data. The video data is supplied to the display section 930, by which a series of images are displayed. The audio codec 923 decompresses and D/A converts the audio stream to generate an analog voice signal. Then, the audio codec 923 supplies the generated voice signal to the speaker 924 such that voice is outputted from the speaker 924.

In the portable telephone set 920 configured in this manner, for example, the image processing section 927 may have the functions of the image encoding apparatus 300 described hereinabove. In short, the image processing section 927 may encode image data by any of the methods described hereinabove in connection with the embodiments. This makes it possible for the portable telephone set 920 to achieve advantageous effects similar to those of the embodiments described hereinabove with reference to FIGS. 1 to 40.

Further, in the portable telephone set 920 configured in such a manner as described above, for example, the image processing section 927 may have the functions of the image decoding apparatus 100 described hereinabove. In short, the image processing section 927 may decode encoded data by any of the methods described hereinabove in connection with the embodiments. This makes it possible for the portable telephone set 920 to achieve advantageous effects similar to those of the embodiments described hereinabove with reference to FIGS. 1 to 40.

Third Application Example: Recording and Reproduction Apparatus

Figure 44:
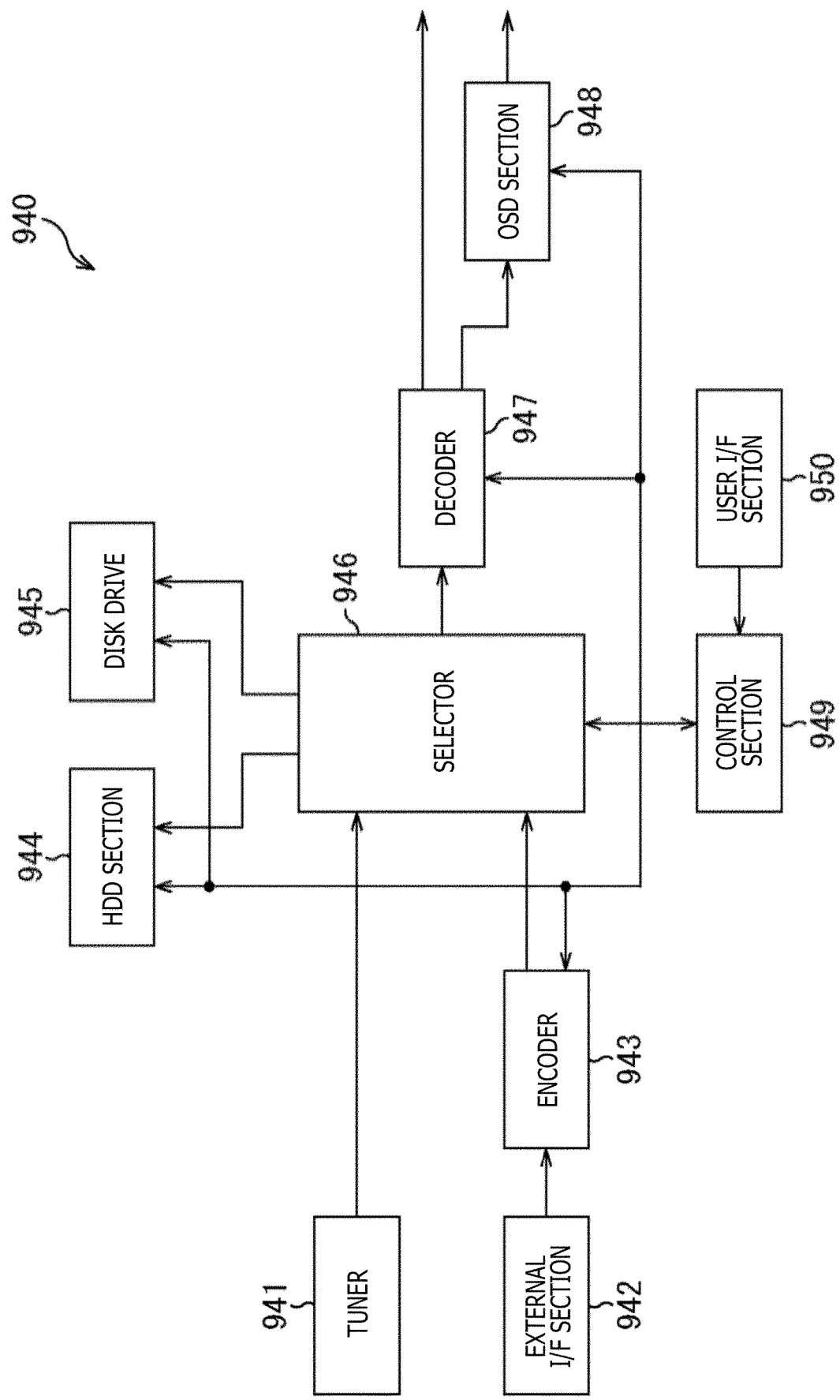
FIG. 44 is a block diagram depicting an example of general configuration of a recording and reproduction apparatus.

FIG. 44 depicts an example of a schematic configuration of a recording and reproduction apparatus to which the embodiments described hereinabove are applied. The recording and reproduction apparatus 940 encodes and records, for example, audio data and video data of a received broadcasting program into a recording medium. Further, the recording and reproduction apparatus 940 may encode and record audio data and video data acquired, for example, from a different apparatus into a recording medium. Further, the recording and reproduction apparatus 940 reproduces data recorded in the recording medium on a monitor and a speaker, for example, in response to an instruction of a user. At this time, the recording and reproduction apparatus 940 decodes audio data and video data.

The recording and reproduction apparatus 940 includes a tuner 941, an external interface (I/F) section 942, an encoder 943, an HDD (Hard Disk Drive) section 944, a disk drive 945, a selector 946, a decoder 947, an OSD (On-Screen Display) section 948, a control section 949, and a user interface (I/F) section 950.

The tuner 941 extracts a signal of a desired channel from broadcasting signals received through an antenna (not depicted) and demodulates the extracted signal. Then, the tuner 941 outputs an encoded bit stream obtained by the demodulation to the selector 946. In other words, the tuner 941 has a role as a transmission section in the recording and reproduction apparatus 940.

The external interface section 942 is an interface for connecting the recording and reproduction apparatus 940 and an external apparatus or a network to each other. The external interface section 942 may be, for example, an IEEE (Institute of Electrical and Electronic Engineers) 1394 interface, a network interface, a USB interface, a flash memory interface or the like. For example, video data and audio data received through the external interface section 942 are inputted to the encoder 943. In other words, the external interface section 942 has a role as a transmission section in the recording and reproduction apparatus 940.

The encoder 943 encodes video data and audio data inputted form the external interface section 942 in the case where the video data and the audio data are not in an encoded form. Then, the encoder 943 outputs an encoded bit stream to the selector 946.

The HDD section 944 records an encoded bit stream, in which content data of videos and audios are compressed, various programs and other data on an internal hard disk thereof. Further, upon reproduction of videos and audios, the HDD section 944 reads out such data from the hard disk.

The disk drive 945 performs recording and reading out of data on and from a recording medium loaded therein. The recording medium to be loaded into the disk drive 945 may be, for example, a DVD (Digital Versatile Disc) disk (DVD-Video, DVD-RAM (DVD-Random Access Memory), DVD-R (DVD-Readable), DVD-RW (DVD-Rewritable), DVD+R (DVD+Recordable), DVD+RW (DVD+Rewritable) and so forth) or a Blu-ray (registered trademark) disk or the like.

Upon recording of videos and audios, the selector 946 selects an encoded bit stream inputted from the tuner 941 or the encoder 943 and outputs the selected encoded bit stream to the HDD section 944 or the disk drive 945. On the other hand, upon reproduction of videos and audios, the selector 946 outputs an encoded bit stream inputted from the HDD section 944 or the disk drive 945 to the decoder 947.

The decoder 947 decodes an encoded bit stream to generate video data and audio data. Then, the decoder 947 outputs the generated video data to the OSD section 948. Meanwhile, the decoder 947 outputs the generated audio data to an external speaker.

The OSD section 948 reproduces video data inputted from the decoder 947 to display a video. Further, the OSD section 948 may superimpose an image of a GUI such as, for example, a menu, a button or a cursor on the video to be displayed.

The control section 949 includes a processor such as a CPU and a memory such as a RAM and a ROM. The memory stores therein a program to be executed by the CPU, program data and so forth. The program stored in the memory is read into and executed by the CPU, for example, upon activation of the recording and reproduction apparatus 940. The CPU executes the program to control operation of the recording and reproduction apparatus 940 in response to an operation signal inputted, for example, from the user interface section 950.

The user interface section 950 is connected to the control section 949. The user interface section 950 has buttons and switches for allowing, for example, a user to operate the recording and reproduction apparatus 940 and a reception section for a remote controlling signal and so forth. The user interface section 950 detects an operation by the user through the components mentioned to generate an operation signal and outputs the generated operation signal to the control section 949.

In the recording and reproduction apparatus 940 configured in this manner, for example, the encoder 943 may have the functions of the image encoding apparatus 300 described hereinabove. In short, the encoder 943 may encode image data by a method described in connection with the embodiments. This makes it possible for the recording and reproduction apparatus 940 to achieve advantageous effects similar to those of the embodiments described hereinabove with reference to FIGS. 1 to 40.

Further, in the recording and reproduction apparatus 940 configured in this manner, for example, the decoder 947 may have the functions of the image decoding apparatus 100 described hereinabove. In short, the decoder 947 may decode encoded data by any method described in the foregoing description of the embodiments. This makes it possible for the recording and reproduction apparatus 940 to achieve advantageous effects similar to those of the embodiments described hereinabove with reference to FIGS. 1 to 40.

Fourth Application Example: Imaging Apparatus

Figure 45:
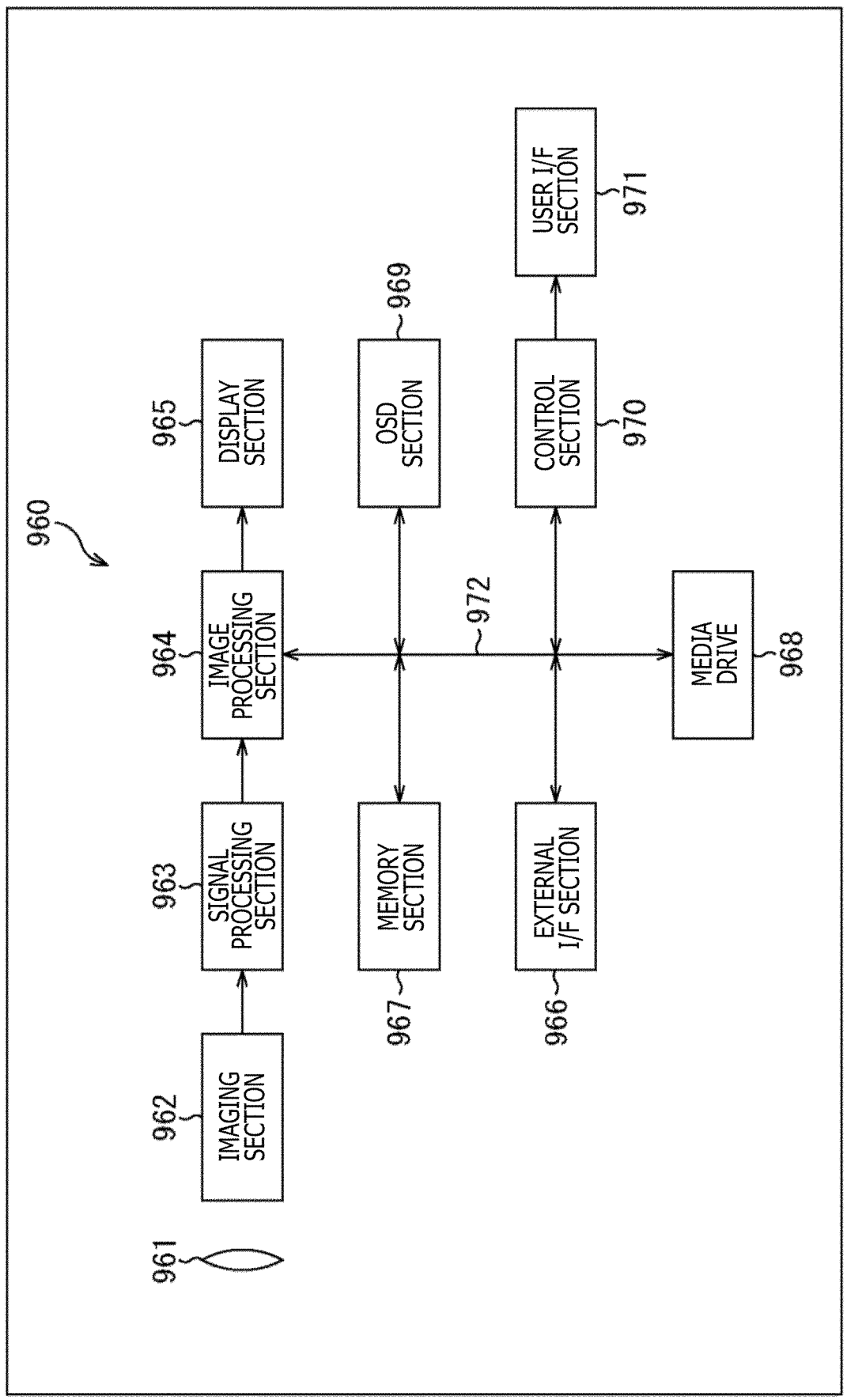
FIG. 45 is a block diagram depicting an example of general configuration of an imaging apparatus.

FIG. 45 depicts an example of a schematic configuration of an imaging apparatus to which the embodiments described above are applied. The imaging apparatus 960 images an image pickup object to generate an image and encodes and records image data into a recording medium.

The imaging apparatus 960 includes an optical block 961, an imaging section 962, a signal processing section 963, an image processing section 964, a display section 965, an external interface (I/F) section 966, a memory section 967, a media drive 968, an OSD section 969, a control section 970, a user interface (I/F) section 971 and a bus 972.

The optical block 961 is connected to the imaging section 962. The imaging section 962 is connected to the signal processing section 963. The display section 965 is connected to the image processing section 964. The user interface section 971 is connected to the control section 970. The bus 972 connects the image processing section 964, external interface section 966, memory section 967, media drive 968, OSD section 969 and control section 970 to each other.

The optical block 961 has a focus lens, a diaphragm mechanism and so forth. The optical block 961 forms an optical image of an image pickup object on an imaging face of the imaging section 962. The imaging section 962 includes an image sensor such as a CCD (Charge Coupled Device) image sensor or a CMOS (Complementary Metal Oxide Semiconductor) image sensor and converts the optical image formed on the imaging face into an image signal as an electric signal by photoelectric conversion. Then, the imaging section 962 outputs the image signal to the signal processing section 963.

The signal processing section 963 performs various camera signal processes such as knee correction, gamma correction and color correction for the image signal inputted from the imaging section 962. The signal processing section 963 outputs image data after the camera signal processes to the image processing section 964.

The image processing section 964 encodes the image data inputted from the signal processing section 963 to generate encoded data. Then, the image processing section 964 outputs the generated encoded data to the external interface section 966 or the media drive 968. Further, the image processing section 964 decodes encoded data inputted from the external interface section 966 or the media drive 968 to generate image data. Then, the image processing section 964 outputs the generated image data to the display section 965. Further, the image processing section 964 may output the image data inputted from the signal processing section 963 to the display section 965 such that an image is displayed on the display section 965. Further, the image processing section 964 may superimpose displaying data acquired from the OSD section 969 on the image to be outputted to the display section 965.

The OSD section 969 generates an image of a GUI such as, for example, a menu, a button or a cursor and outputs the generated image to the image processing section 964.

The external interface section 966 is configured, for example, as USB input/output terminals. The external interface section 966 connects the imaging apparatus 960 and a printer to each other, for example, upon printing of the image. Further, a drive is connected to the external interface section 966 as occasion demands. A removable medium such as, for example, a magnetic disk or an optical disk is mounted on the drive, and a program read out from the removable medium can be installed into the imaging apparatus 960. Further, the external interface section 966 may be configured as a network interface that is connected to a network such as a LAN or the Internet. In particular, the external interface section 966 has a role as a transmission section in the imaging apparatus 960.

The recording medium to be mounted on the media drive 968 may be an arbitrary rewritable removable medium such as, for example, a magnetic disk, a magneto-optical disk, an optical disk or a semiconductor memory. Further, the recording medium may be fixedly mounted on the media drive 968 such that a non-portable storage section like, for example, a built-in hard disk drive or an SSD (Solid State Drive) is configured.

The control section 970 includes a processor such as a CPU and a memory such as a RAM and a RAM. The memory has a program to be executed by the CPU, program data and so forth stored therein. The program stored in the memory is read into and executed by the CPU upon activation of the imaging apparatus 960. The CPU executes the program to control operation of the imaging apparatus 960 in accordance with, for example, an operation signal inputted from the user interface section 971.

The user interface section 971 is connected to the control section 970. The user interface section 971 has, for example, buttons, switches and so forth for operation of the imaging apparatus 960 by the user. The user interface section 971 detects an operation by the user through the components described above to generate an operation signal and outputs the generated operation signal to the control section 970.

In the imaging apparatus 960 configured in such a manner as described above, for example, the image processing section 964 may have the functions of the image encoding apparatus 300 described above. In particular, the image processing section 964 may encode image data by any method described in connection with the embodiments described above. This makes it possible for the imaging apparatus 960 to achieve advantageous effects similar to those of the embodiments described hereinabove with reference to FIGS. 1 to 40.

Further, in the imaging apparatus 960 configured in such a manner as described above, for example, the image processing section 964 may have the functions of the image decoding apparatus 100 described hereinabove. In particular, the image processing section 964 may decode encoded data by any method described in connection with the embodiments described above. This makes it possible for the imaging apparatus 960 to achieve advantageous effects similar to those of the embodiments described hereinabove with reference to FIGS. 1 to 40.

Fifth Application Example: Video Set

Figure 46:
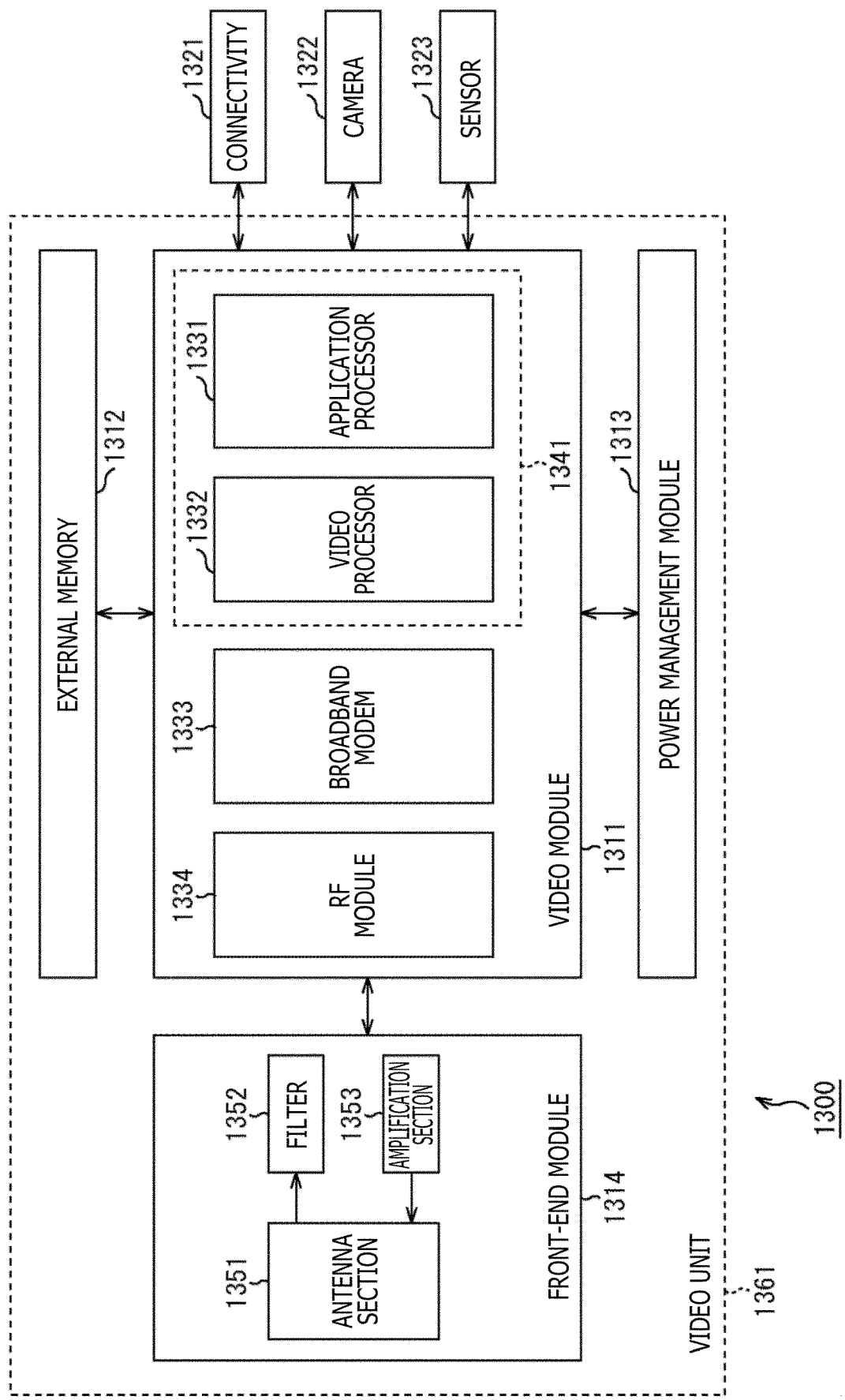
FIG. 46 is a block diagram depicting an example of general configuration of a video set.

Further, the present technology can be carried out as any configuration to be incorporated in an arbitrary apparatus or an apparatus configuring a system such as, for example, a processor as a system LSI (Large Scale Integration) or the like, a module in which a plurality of processors or the like are used, a unit in which a plurality of modules are used, a set in which a different function is further added to the unit (namely, part of the configuration of the apparatus). FIG. 46 depicts an example of a schematic configuration of a video set to which the present technology is applied.

In recent years, multifunctionalization of electronic equipment has been and is being advanced, and, in the case where some component is carried out as selling, provision or the like in development or fabrication of the electronic equipment, not only a case in which the component is carried out as a component having one function but also a case in which a plurality of components having functions relating to each other are combined and carried out as one set having a plurality of functions are seen frequently.

A video set 1300 depicted in FIG. 46 has such a multifunctionalized configuration as described above and is an apparatus in which a device having functions relating to encoding and decoding of an image (one of or both encoding and decoding may be applied) and another device having other functions relating to the functions are combined.

As depicted in FIG. 46, the video set 1300 includes a module group including a video module 1311, an external memory 1312, a power management module 1313 and a front-end module 1314 and a device having relating functions such as a connectivity 1321, a camera 1322, a sensor 1323 and so forth.

A module is a part in which several part functions relating to each other are combined so as to have coherent functions. Although a particular physical configuration is arbitrary, a physical configuration is conceivable in which, for example, a plurality of processors individually having functions, electronic circuit devices such as resisters and capacitors, other devices and so forth are disposed and integrated on a wiring board or the like. Also it is conceivable to combine a different module, a processor or the like with a module to produce a new module.

In the case of the example of FIG. 46, the video module 1311 is a combination of components having functions relating to image processing and includes an application processor, a video processor, a broadband modem 1333 and an RF module 1334.

The processor is an integration of a component having a predetermined function with a semiconductor chip by SoC (System On a Chip), and also a processor called, for example, as system LSI (Large Scale Integration) or the like is available. The component that has a predetermined function may be a logic circuit (hardware configuration) or may be a CPU, a ROM, a RAM and so forth and a program executed using them or else may be a combination of both of them. For example, the processor may include a logic circuit, a CPU, a ROM, a RAM and so forth such that part of functions are implemented by the logic circuit (hardware configuration) and the remaining part of the functions are implemented by the program to be executed by the CPU (software configuration).

The application processor 1331 of FIG. 46 is a processor that executes an application relating to an image process. In order to implement a predetermined function, the application to be executed by the application processor 1331 not only can perform an arithmetic operation process but also can control, as occasion demands, the components of the inside and the outside of the video module 1311 such as, for example, the video processor 1332.

The video processor 1332 is a processor having functions relating to (one of or both) encoding and decoding of an image.

The broadband modem 1333 converts data (digital signal) to be transmitted by wire or wireless (or both) broadband communication performed through a broadband line such as the Internet or a public telephone network into an analog signal by digital modulation of the data or the like or converts an analog signal received by the broadband communication into data (digital signal) by demodulation of the analog signal. The broadband modem 1333 processes arbitrary information such as, for example, image data to be processed by the video processor 1332, a stream in which image data is encoded, an application program or setting data.

The RF module 1334 is a module that performs frequency conversion, modulation and demodulation, amplification, filter processing and so forth for an RF (Radio Frequency) signal sent and received through an antenna. For example, the RF module 1334 performs frequency conversion and so forth for a baseband signal generated by the broadband modem 1333 to generate an RF signal. Further, for example, the RF module 1334 performs frequency conversion and so forth for an RF signal received through the front-end module 1314 to generate a baseband signal.

It is to be noted that, as depicted by a broken line 1341 in FIG. 46, the application processor 1331 and the video processor 1332 may be integrated so as to be configured as one processor.

The external memory 1312 is a module that is provided on the outside of the video module 1311 and has a storage device to be utilized by the video module 1311. While the storage device of the external memory 1312 may be implemented by any physical component, since generally the storage device is frequently utilized for storage of a great amount of data like image data of a frame unit, it is desirable to implement the storage device by a comparatively-low-price and great-capacity semiconductor memory such as, for example, a DRAM (Dynamic Random Access Memory).

The power management module 1313 manages and controls power supply to the video module 1311 (components in the video module 1311).

The front-end module 1314 is a module that provides a front-end function (circuit at a transmission or reception end on the antenna side) to the RF module 1334. As depicted in FIG. 46, the front-end module 1314 includes, for example, an antenna section 1351, a filter 1352 and an amplification section 1353.

The antenna section 1351 includes an antenna for transmitting and receiving a wireless signal and peripheral components of the antenna. The antenna section 1351 transmits a signal supplied from the amplification section 1353 as a wireless signal and supplies a received wireless signal as an electric signal (RF signal) to the filter 1352. The filter 1352 performs a filter process and so forth for the RF signal received through the antenna section 1351 and supplies the RF signal after the process to the RF module 1334. The amplification section 1353 amplifies and supplies an RF signal supplied from the RF module 1334 to the antenna section 1351.

The connectivity 1321 is a module having a function relating to connection to the outside. The physical configuration of the connectivity 1321 is arbitrary. For example, the connectivity 1321 has a component having a communication function of a communication standard, which is different from that with which the broadband modem 1333 is compatible, external input/output terminals and so forth.

For example, the connectivity 1321 may include a module having a communication function that complies with a wireless communication standard such as Bluetooth (registered trademark), IEEE 802.11 (for example, Wi-Fi (Wireless Fidelity, registered trademark)), NFC (Near Field Communication) or IrDA (InfraRed Data Association), an antenna for transmitting and receiving a signal that complies with the standard and so forth. Further, for example, the connectivity 1321 may include a module having a communication function that complies with a wire communication standard such as USB (Universal Serial Bus), HDMI (registered trademark) (High-Definition Multimedia Interface) or the like and a terminal that complies with the standard. Furthermore, for example, the connectivity 1321 may have a different data (signal) transmission function or the like such as analog input/output terminals or the like.

It is to be noted that the connectivity 1321 may include a device of a transmission destination of data (signal). For example, the connectivity 1321 may include a drive that performs reading out and writing of data from and into a recording medium such as a magnetic disk, an optical disk, a magneto-optical disk or a semiconductor memory (include not only a drive for a removable medium but also a drive for a hard disk, an SSD (Solid State Drive), an NAS (Network Attached Storage)) or the like. Further, the connectivity 1321 may include an outputting device for an image or sound (a monitor, a speaker or the like).

The camera 1322 is a module having a function for imaging an image of an imaging object to obtain image data of the imaging object. The image data obtained by imaging of the camera 1322 is supplied to and encoded by, for example, the video processor 1332.

The sensor 1323 is a module having an arbitrary sensor function of, for example, a sound sensor, an ultrasonic sensor, an optical sensor, an illumination sensor, an infrared sensor, an image sensor, a rotation sensor, an angle sensor, an angular velocity sensor, a velocity sensor, an acceleration sensor, an inclination sensor, a magnetic identification sensor, a shock sensor, a temperature sensor or the like. Data detected by the sensor 1323 is supplied, for example, to the application processor 1331 and is utilized by an application or the like.

The components described as the modules in the foregoing description may be implemented as a processor, or conversely the component described as a processor may be implemented as a module.

In the video set 1300 having such a configuration as described above, the present technology can be applied to the video processor 1332 as hereinafter described. Accordingly, the video set 1300 can be carried out as a set to which the present technology is applied.

<Configuration Example of Video Processor>

Figure 47:
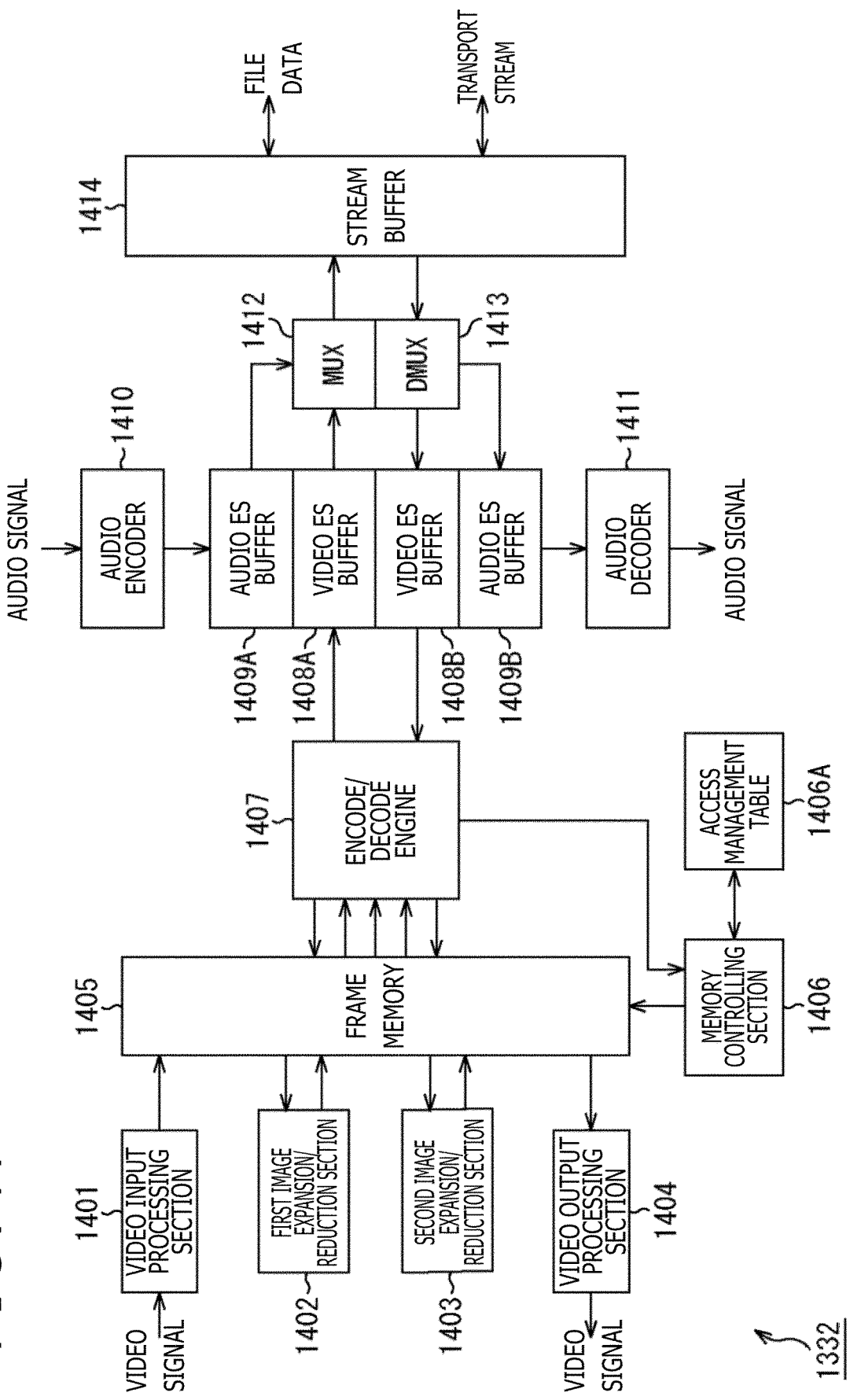
FIG. 47 is a block diagram depicting an example of general configuration of a video processor.

FIG. 47 depicts an example of a schematic configuration of the video processor 1332 (FIG. 46) to which the present technology is applied.

In the case of the example of FIG. 47, the video processor 1332 has a function for receiving an input of a video signal and an audio signal and encoding the signals by a predetermined method and another function for decoding video data and audio data in an encoded form and reproducing and outputting a video signal and an audio signal.

As depicted in FIG. 47, the video processor 1332 includes a video input processing section 1401, a first image expansion/reduction section 1402, a second image expansion/reduction section 1403, a video output processing section 1404, a frame memory 1405 and a memory controlling section 1406. The video processor 1332 further includes an encode/decode engine 1407, video ES (Elementary Stream) buffers 1408A and 1408B, and audio ES buffers 1409A and 1409B. The video processor 1332 further includes an audio encoder 1410, an audio decoder 1411, a multiplexing section (MUX (Multiplexer)) 1412, a demultiplexing section (DMUX (Demultiplexer)) 1413, and a stream buffer 1414.

The video inputting processing section 1401 acquires a video signal inputted, for example, from the connectivity 1321 (FIG. 46) or the like and converts the acquired video signal into digital image data. The first image expansion/reduction section 1402 performs format conversion, an expansion/reduction process of an image and so forth for the image data. The second image expansion/reduction section 1403 performs an expansion/reduction process of an image in accordance with a format at a destination of outputting through the video output processing section 1404 and performs format conversion, an expansion/reduction process of an image or the like similar to that of the first image expansion/reduction section 1402 for the image data. The video output processing section 1404 performs format conversion, conversion into an analog signal and so forth for the image data and outputs resulting data as a reproduced video signal, for example, to the connectivity 1321 and so forth.

The frame memory 1405 is a memory for image data shared by the video inputting processing section 1401, first image expansion/reduction section 1402, second image expansion/reduction section 1403, video output processing section 1404 and encode/decode engine 1407. The frame memory 1405 is implemented as a semiconductor memory such as, for example, a DRAM.

The memory controlling section 1406 receives a synchronizing signal from the encode/decode engine 1407 and controls accessing for writing and reading out to the frame memory 1405 in accordance with an access schedule to the frame memory 1405 written in an access management table 1406A. The access management table 1406A is updated by the memory controlling section 1406 in response to a process executed by the encode/decode engine 1407, first image expansion/reduction section 1402, second image expansion/reduction section 1403 or the like.

The encode/decode engine 1407 performs an encoding process of image data and a decoding process of a video stream that is data encoded from image data. For example, the encode/decode engine 1407 encodes image data read out from the frame memory 1405 and successively writes the encoded image data as a video stream into the video ES buffer 1408A. Further, the encode/decode engine 1407 successively reads out a video stream, for example, from the video ES buffer 1408B and decodes the video stream, and successively writes the decoded video stream as image data into the frame memory 1405. The encode/decode engine 1407 uses the frame memory 1405 as a working area in the encoding and decoding. Further, the encode/decode engine 1407 outputs a synchronizing signal to the memory controlling section 1406, for example, at a timing at which processing for each macro block is to be started.

The video ES buffer 1408A buffers a video stream generated by the encode/decode engine 1407 and supplies the resulting video stream to the multiplexing section (MUX) 1412. The video ES buffer 1408B buffers a video stream supplied from the demultiplexing section (DMUX) 1413 and supplies the resulting video stream to the encode/decode engine 1407.

The audio ES buffer 1409A buffers an audio stream generated by the audio encoder 1410 and supplies the resulting audio stream to the multiplexing section (MUX) 1412. The audio ES buffer 1409B buffers an audio stream supplied from the demultiplexing section (DMUX) 1413 and supplies the resulting audio stream to the audio decoder 1411.

The audio encoder 1410 performs, for example, digital conversion for an audio signal inputted, for example, from the connectivity 1321 or the like and encodes the resulting audio signal by a predetermined method such as, for example, an MPEG audio method or an AC3 (AudioCode number 3) method. The audio encoder 1410 successively writes the audio stream that is data encoded from the audio signal into the audio ES buffer 1409A. The audio decoder 1411 decodes an audio stream supplied from the audio ES buffer 1409B and performs, for example, conversion into an analog signal or the like and then supplies the resulting analog signal as a reproduced audio signal, for example, to the connectivity 1321 and so forth.

The multiplexing section (MUX) 1412 multiplexes a video stream and an audio stream. The method of the multiplexing (namely, format of a bit stream generated by multiplexing) is arbitrary. Further, upon such multiplexing, the multiplexing section (MUX) 1412 can also add predetermined header information and so forth to the bit stream. In short, the multiplexing section (MUX) 1412 can convert the format of a stream by multiplexing. For example, the multiplexing section (MUX) 1412 multiplexes a video stream and an audio stream to convert them into a transport stream that is a bit stream of a transfer format. Further, for example, the multiplexing section (MUX) 1412 multiplexes the video stream and the audio stream to convert them into data of a recording file format (file data).

The demultiplexing section (DMUX) 1413 demultiplexes a bit stream, in which a video stream and an audio stream are multiplexed, by a method corresponding to the multiplexing by the multiplexing section (MUX) 1412. In particular, the demultiplexing section (DMUX) 1413 extracts the video stream and the audio stream from the bit stream read out from the stream buffer 1414 (separates the video stream and the audio stream). In short, the demultiplexing section (DMUX) 1413 can convert the format of the stream by the demultiplexing (inverse conversion to the conversion by the multiplexing section (MUX) 1412). For example, the demultiplexing section (DMUX) 1413 can acquire a transport stream supplied, for example, from the connectivity 1321, broadband modem 1333 or the like through the stream buffer 1414 and demultiplex the acquired stream so as to convert it into a video stream and an audio stream. Further, for example, the demultiplexing section (DMUX) 1413 can acquire file data read out from various recording media, for example, by the connectivity 1321 and can demultiplex the read out file data so as to convert it into a video stream and an audio stream.

The stream buffer 1414 buffers a bit stream. For example, the stream buffer 1414 buffers a transport stream supplied from the multiplexing section (MUX) 1412 and supplies the buffered transport stream, for example, to the connectivity 1321, broadband modem 1333 or the like at a predetermined timing or on the basis of a request from the outside or the like.

Further, for example, the stream buffer 1414 buffers file data supplied from the multiplexing section (MUX) 1412 and supplies the buffered file data, for example, to the connectivity 1321 or the like so as to be recorded on various recording media at a predetermined timing or on the basis of a request from the outside or the like.

Furthermore, the stream buffer 1414 buffers a transport stream acquired, for example, through the connectivity 1321, broadband modem 1333 or the like and supplies the buffered transport stream to the demultiplexing section (DMUX) 1413 at a predetermined timing or on the basis of a request from the outside or the like.

Further, the stream buffer 1414 buffers file data read out from various recording media, for example, by the connectivity 1321 or the like and supplies the buffered file data to the demultiplexing section (DMUX) 1413 at a predetermined timing or on the basis of a request from the outside or the like.

Now, an example of operation of the video processor 1332 having such a configuration as described above is described. For example, a video signal inputted from the connectivity 1321 or the like to the video processor 1332 is converted into digital image data of a predetermined method such as a 4:2:2Y/Cb/Cr method by the video inputting processing section 1401 and successively written into the frame memory 1405. The digital image data is read out by the first image expansion/reduction section 1402 or the second image expansion/reduction section 1403, subjected to format conversion into that of a predetermined method such as a 4:2:0Y/Cb/Cr method and an expansion/reduction process, and written back into the frame memory 1405. This image data is encoded by the encode/decode engine 1407 and written as a video stream into the video ES buffer 1408A.

Further, an audio signal inputted from the connectivity 1321 or the like to the video processor 1332 is encoded by the audio encoder 1410 and written as an audio stream into the audio ES buffer 1409A.

The video stream of the video ES buffer 1408A and the audio stream of the audio ES buffer 1409A are read out to and multiplexed by the multiplexing section (MUX) 1412, by which they are converted into a transport stream, file data or the like. The transport stream generated by the multiplexing section (MUX) 1412 is buffered by the stream buffer 1414 and then outputted to the external network, for example, through the connectivity 1321, broadband modem 1333 and so forth. Further, the file data generated by the multiplexing section (MUX) 1412 is buffered by the stream buffer 1414, whereafter it is outputted, for example, to the connectivity 1321 or the like and recorded on various recording media.

Further, a transport stream inputted from the external network to the video processor 1332, for example, through the connectivity 1321, broadband modem 1333 or the like is buffered by the stream buffer 1414 and then demultiplexed by the demultiplexing section (DMUX) 1413. Further, file data read out from various recording media, for example, by the connectivity 1321 or the like and inputted to the video processor 1332 is buffered by the stream buffer 1414 and then demultiplexed by the demultiplexing section (DMUX) 1413. In short, a transport stream or file data inputted to the video processor 1332 is separated into a video stream and an audio stream by the demultiplexing section (DMUX) 1413.

The audio stream is supplied through the audio ES buffer 1409B to and decoded by the audio decoder 1411 such that an audio signal is reproduced. Meanwhile, the video stream is written into the video ES buffer 1408B, and then is successively read out and decoded by the encode/decode engine 1407 and written into the frame memory 1405. The decoded image data is subjected to an expansion/reduction process by the second image expansion/reduction section 1403 and written into the frame memory 1405. Then, the decoded image data is read out by the video output processing section 1404 and subjected to format conversion to a format of a predetermined method such as a 4:2:2Y/Cb/Cr method, whereafter it is converted further into an analog signal such that a video signal is reproduced and outputted.

In the case where the present technology is applied to the video processor 1332 configured as in this manner, it is sufficient if the present technology according to the embodiments described above is applied to the encode/decode engine 1407. In particular, for example, the encode/decode engine 1407 may have the functions of the image encoding apparatus 300 or the functions of the image decoding apparatus 100 described above or both of them. This makes it possible for the video processor 1332 to achieve advantageous effects similar to those of the embodiments described above with reference to FIGS. 1 to 40.

It is to be noted that, in the encode/decode engine 1407, the present technology (namely, the functions of the image encoding apparatus 300 or the functions of the image decoding apparatus 100 or both of them) may be implemented by hardware such as a logic circuit or may be implemented by software such as an embedded program, or may be implemented by both of them.

<Different Configuration Example of Video Processor>

Figure 48:
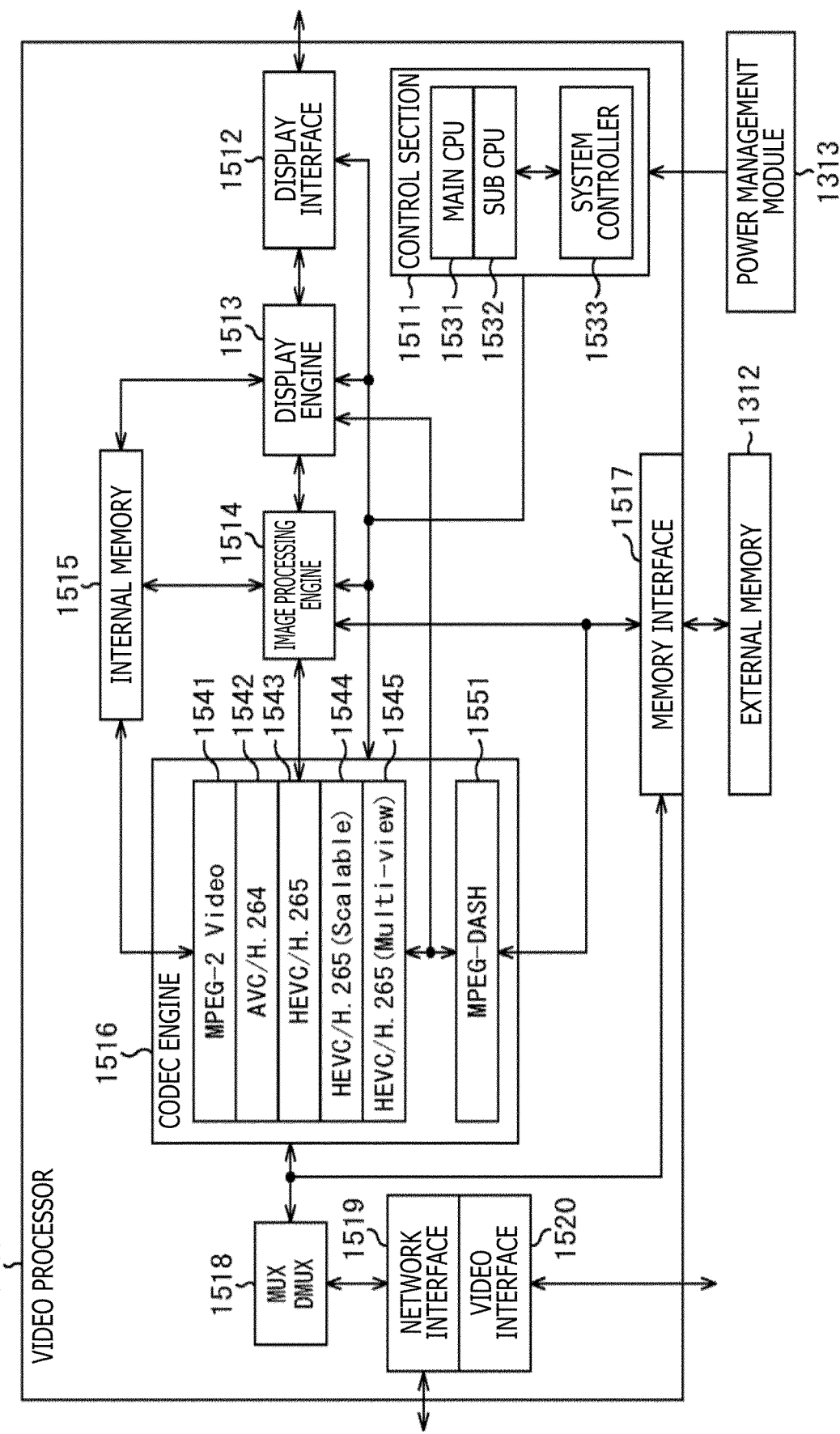
FIG. 48 is a block diagram depicting another example of general configuration of a video processor.

FIG. 48 depicts another example of a schematic configuration of the video processor 1332 to which the present technology is applied. In the case of the example of FIG. 48, a video processor 1332 has a function for encoding and decoding video data by a predetermined method.

More particularly, as depicted in FIG. 48, the video processor 1332 includes a control section 1511, a display interface 1512, a display engine 1513, an image processing engine 1514 and an internal memory 1515. The video processor 1332 further includes a codec engine 1516, a memory interface 1517, a multiplexing and demultiplexing section (MUX DMUX) 1518, a network interface 1519 and a video interface 1520.

The control section 1511 controls operation of processing sections in the video processor 1332 such as the display interface 1512, display engine 1513, image processing engine 1514 and codec engine 1516.

As depicted in FIG. 48, the control section 1511 includes, for example, a main CPU 1531, a sub CPU 1532 and a system controller 1533. The main CPU 1531 executes a program for controlling operation of the processing sections in the video processor 1332 and so forth. The main CPU 1531 generates control signals in accordance with the program and so forth and supplies the control signal to the processing sections (namely, controls operation of the processing sections). The sub CPU 1532 plays an auxiliary role for the main CPU 1531. For example, the sub CPU 1532 executes a child process, a sub routine and so forth of the program and so forth to be executed by the main CPU 1531. The system controller 1533 controls operation of the main CPU 1531 and the sub CPU 1532 such as designation of a program to be executed by the main CPU 1531 and the sub CPU 1532 or the like.

The display interface 1512 outputs image data, for example, to the connectivity 1321 or the like under the control of the control section 1511. For example, the display interface 1512 converts image data of digital data into an analog signal and outputs the analog signal as a reproduced video signal or outputs the image data of digital data as it is to a monitor apparatus or the like of the connectivity 1321.

The display engine 1513 performs various transform processes such as format conversion, size conversion and color gamut conversion for image data under the control of the control section 1511 so as to match with hardware specifications for a monitor apparatus for displaying an image and so forth.

The image processing engine 1514 performs a predetermined image process such as, for example, a filter process for picture quality improvement for the image data under the control of the control section 1511.

The internal memory 1515 is a memory provided in the inside of the video processor 1332 and commonly used by the display engine 1513, image processing engine 1514 and codec engine 1516. The internal memory 1515 is utilized, for example, for sending and reception of data performed between the display engine 1513, image processing engine 1514 and codec engine 1516. For example, the internal memory 1515 stores data supplied from the display engine 1513, image processing engine 1514 or codec engine 1516 and supplies the data to the display engine 1513, image processing engine 1514 or codec engine 1516 as occasion demands (for example, in response to a request). While the internal memory 1515 may be implemented by any storage device, since generally the internal memory 1515 is frequently utilized for storage of a small amount of data such as image data in a block unit or a parameter, it is desirable to implement the internal memory 1515 from a semiconductor memory having a high response speed although it has a comparatively small capacity (for example, in comparison with that of the external memory 1312) such as, for example, an SRAM (Static Random Access Memory).

The codec engine 1516 performs a process relating to encoding and decoding of image data. The method of encoding and decoding with which the codec engine 1516 is compatible is arbitrary, and the number of such methods may be one or a plural number. For example, the codec engine 1516 may have a plurality of codec functions for encoding and decoding method such that encoding of image data or decoding of encoded data is performed by a selected one of the methods.

In the example depicted in FIG. 48, as functional blocks of a process relating to the codec, the codec engine 1516 includes, for example, an MPEG-2 Video 1541, an AVC/H.264 1542, an HEVC/H.265 1543, an HEVC/H.265 (Scalable) 1544, an HEVC/H.265 (Multi-view) 1545 and an MPEG-DASH 1551.

The MPEG-2 Video 1541 is a functional block that encodes and decodes image data by the MPEG-2 method. The AVC/H.264 1542 is a functional block that encodes and decodes image data by the AVC method. The HEVC/H.265 1543 is a functional block that encodes and decodes image data by the HEVC method. The HEVC/H.265 (Scalable) 1544 is a functional block that performs scalable encoding or scalable encoding for image data by the HEVC method. The HEVC/H.265 (Multi-view) 1545 is a functional block that performs multi-view encoding or multi-view decoding for image data by the HEVC method.

The MPEG-DASH 1551 is a functional block that transmits and receives image data by the MPEG-DASH (MPEG-Dynamic Adaptive Streaming over HTTP) method. The MPEG-DASH is a technology by which streaming of a video is performed using the HTTP (HyperText Transfer Protocol), and it is one of characteristics that suitable encoded data from among a plurality of encoded data prepared in advance and having resolutions or the like different from each other is selected and transmitted in a segment unit. The MPEG-DASH 1551 performs generation of a stream in compliance with the standard, transmission control of the stream and so forth, and utilizes the MPEG-2 Video 1541 to HEVC/H.265 (Multi-view) 1545 described above in encoding and decoding of image data.

The memory interface 1517 is an interface for the external memory 1312. Data supplied from the image processing engine 1514 or the codec engine 1516 is supplied to the external memory 1312 through the memory interface 1517. Further, data read out from the external memory 1312 is supplied to the video processor 1332 (image processing engine 1514 or the codec engine 1516) through the memory interface 1517.

The multiplexing and demultiplexing section (MUX DMUX) 1518 performs multiplexing and demultiplexing of various data relating to an image such as a bit stream of encoded data, image data, a video signal and so forth. The method for the multiplexing and demultiplexing is arbitrary. For example, upon multiplexing, the multiplexing and demultiplexing section (MUX DMUX) 1518 not only can unite a plurality of data into one data but also can add predetermined header information or the like to the data. Further, upon demultiplexing, the multiplexing and demultiplexing section (MUX DMUX) 1518 not only can divide one data into a plurality of data but also can add predetermined header information or the like to each of the divisional data. In short, the multiplexing and demultiplexing section (MUX DMUX) 1518 can convert the format of data by multiplexing or demultiplexing. For example, the multiplexing and demultiplexing section (MUX DMUX) 1518 can convert a bit stream into a transport stream that is a bit stream of a format for transfer or data of a file format for recoding (file data) by multiplexing the bit stream. Naturally, inverse conversion to the conversion is possible by demultiplexing.

The network interface 1519 is an interface, for example, for the broadband modem 1333, connectivity 1321 and so forth. The video interface 1520 is an interface, for example, for the connectivity 1321, camera 1322 and so forth.

Now, an example of operation of such a video processor 1332 as described above is described. For example, if a transport stream is received from an external network through the connectivity 1321, broadband modem 1333 or the like, then the transport stream is supplied through the network interface 1519 to and demultiplexed by the multiplexing and demultiplexing section (MUX DMUX) 1518 and is decoded by the codec engine 1516. Image data obtained by the decoding of the codec engine 1516 is subjected to a predetermined image process, for example, by the image processing engine 1514, subjected to predetermined conversion by the display engine 1513 and supplied, for example, to the connectivity 1321 or the like through the display interface 1512 such that an image thereof is displayed on a monitor. Further, for example, the image data obtained by the decoding of the codec engine 1516 is re-encoded by the codec engine 1516, multiplexed by the multiplexing and demultiplexing section (MUX DMUX) 1518 so as to be converted into file data, outputted, for example, to the connectivity 1321 or the like through the video interface 1520 and then recorded on various recording media.

Furthermore, for example, file data of encoded data encoded from image data after read out from a recording medium not depicted by the connectivity 1321 or the like is supplied through the video interface 1520 to and demultiplexed by the multiplexing and demultiplexing section (MUX DMUX) 1518 and decoded by the codec engine 1516. Image data obtained by the decoding of the codec engine 1516 is subjected to a predetermined image process by the image processing engine 1514, subjected to predetermined conversion by the display engine 1513, and supplied, for example, to the connectivity 1321 or the like through the display interface 1512 such that an image is displayed on the monitor. Further, for example, the image data obtained by the decoding of the codec engine 1516 is re-encoded by the codec engine 1516, multiplexed by the multiplexing and demultiplexing section (MUX DMUX) 1518 so as to be converted into a transport stream, supplied, for example, to the connectivity 1321, broadband modem 1333 or the like through the network interface 1519 and then transmitted to a different apparatus not depicted.

It is to be noted that sending and reception of image data or other data between the processing sections in the video processor 1332 are performed, for example, utilizing the internal memory 1515 or the external memory 1312. Further, the power management module 1313 controls power supply, for example, to the control section 1511.

In the case where the present technology is applied to the video processor 1332 configured in this manner, it is sufficient if the present technology according to any embodiment described hereinabove is applied to the codec engine 1516. In short, it is sufficient, for example, if the codec engine 1516 has the functions of the image encoding apparatus 300 or the functions of the image decoding apparatus 100 described hereinabove or both of them. This makes it possible for the video processor 1332 to achieve advantageous effects similar to those of the embodiments described hereinabove with reference to FIGS. 1 to 40.

It is to be noted that, in the codec engine 1516, the present technology (namely, the functions of the image encoding apparatus 300) may be implemented by hardware such as logic circuits or may be implemented by software such as an embedded program or else may be implemented by both of them.

While two examples of the configuration of the video processor 1332 are exemplified above, the configuration of the video processor 1332 is arbitrary and may be any other than the two examples described above. Further, although the video processor 1332 may be configured as one semiconductor chip, it may otherwise be configured as a plurality of semiconductor chips. For example, the video processor 1332 may be formed as a three-dimensional stacked LSI in which a plurality of semiconductors are stacked. Alternatively, the video processor 1332 may be implemented by a plurality of LSIs.

<Application Example to Apparatus>

The video set 1300 can be incorporated into various apparatus by which image data is processed. For example, the video set 1300 can be incorporated into the television apparatus 900 (FIG. 42), portable telephone set 920 (FIG. 43), recording and reproduction apparatus 940 (FIG. 44), imaging apparatus 960 (FIG. 45) and so forth. By incorporating the video set 1300, the apparatus can achieve advantageous effects similar to those of the embodiments described hereinabove with reference to FIGS. 1 to 40.

It is to be noted that, if even part of the components of the video set 1300 described above include the video processor 1332, it can be carried out as a configuration to which the present technology is applied. For example, it is possible to carry out only the video processor 1332 as a video processor to which the present technology is applied. Further, it is possible to carry out the processor, video module 1311 and so forth indicated by a broken line 1341 as a processor, a module or the like to which the present technology is applied as described hereinabove. Furthermore, it is possible to combine, for example, the video module 1311, external memory 1312, power management module 1313 and front-end module 1314 so as to be carried out as the video unit 1361 to which the present technology is applied. In the case of any of the configurations, advantageous effects similar to those of the embodiments described hereinabove with reference to FIGS. 1 to 40 can be achieved.

In short, if the video processor 1332 is included, then any configuration can be incorporated into various apparatus that process image data similarly as in the case of the video set 1300. For example, the video processor 1332, processor indicated by the broken line 1341, video module 1311 or video unit 1361 can be incorporated into the television apparatus 900 (FIG. 42), portable telephone set 920 (FIG. 43), recording and reproduction apparatus 940 (FIG. 44), imaging apparatus 960 (FIG. 45) and so forth. Then, by incorporating some of the components to which the present technology is applied into an apparatus, the apparatus can achieve advantageous effects similar to those by the embodiments described hereinabove with reference to FIGS. 1 to 40 similarly as in the case of video set 1300.

Sixth Application Example: Network System

Figure 49:
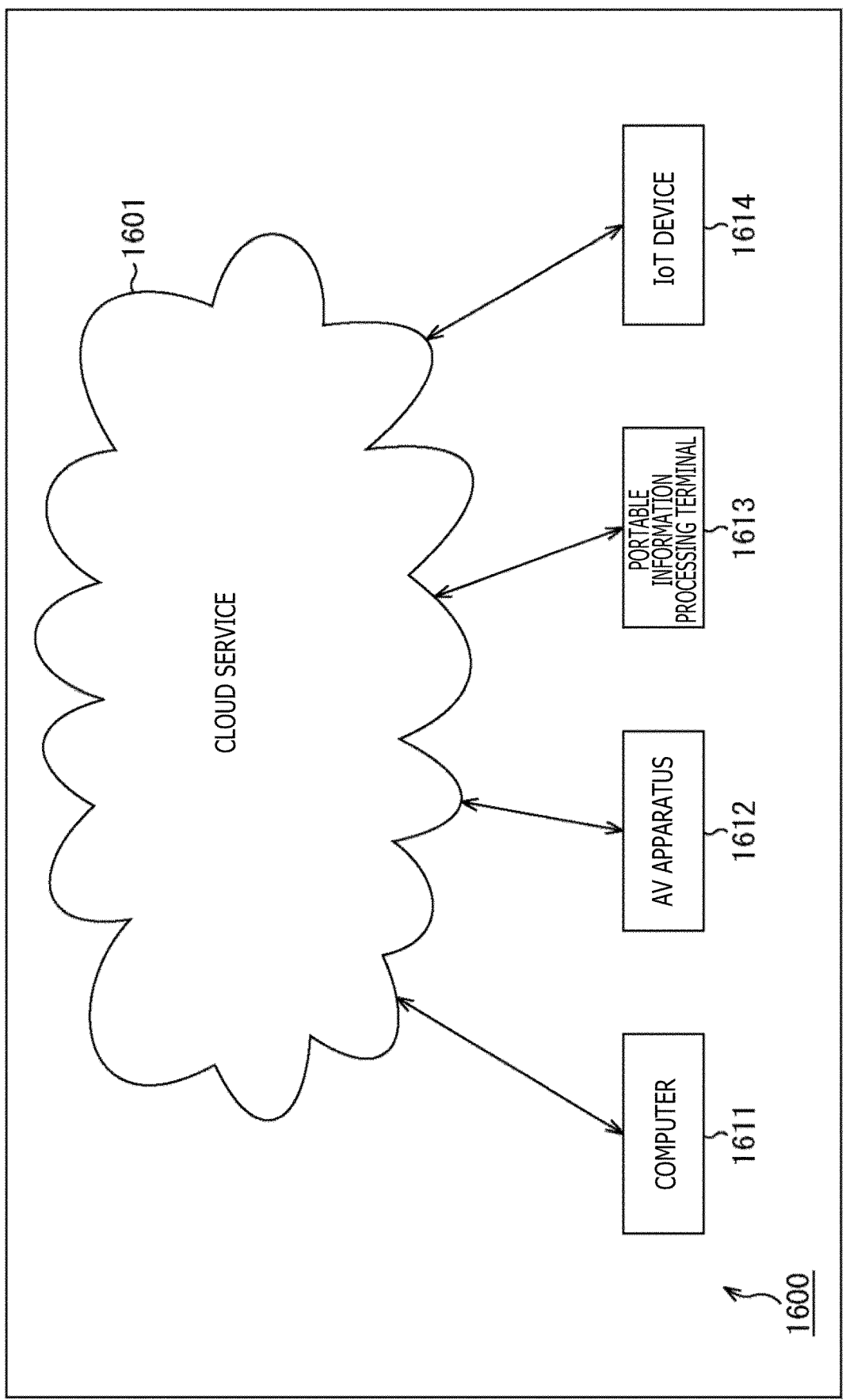
FIG. 49 is a block diagram depicting an example of general configuration of a network system.

Also it is possible to apply the present technology to a network system including a plurality of apparatus. FIG. 49 depicts an example of a schematic configuration of a network system to which the present technology is applied.

The network system 1600 depicted in FIG. 49 is a system in which different apparatus send and receive information relating to an image (video) through a network. A cloud service 1601 of the network system 1600 is a system that provides a service relating to an image (video) to terminals connected for communication thereto such as a computer 1611, an AV (Audio Visual) apparatus 1612, a portable information processing terminal 1613, an IoT (Internet of Things) device 1614 and so forth. For example, the cloud service 1601 provides a supplying service of a content of an image (video) like so-called video distribution (on-demand or live distribution) to the terminals. Further, for example, the cloud service 1601 provides a backup service of receiving and saving a content of an image (video) from the terminals. Further, for example, the cloud service 1601 provides a service of mediating the transfer of a content of an image (video) between the terminals.

The physical configuration of the cloud service 1601 is arbitrary. For example, the cloud service 1601 may include various servers such as a server that stores and manages videos, a server that distributes a video to the terminals, a server that acquires a video from the terminals, and a server that manages users (terminals) and accounting, or an arbitrary network such as the Internet or a LAN.

The computer 1611 includes an information processing apparatus such as, for example, a personal computer, a server or a work station. The AV apparatus 1612 includes an image processing apparatus such as, for example, a television receiver, a hard disk recorder, a game machine or a camera. The portable information processing terminal 1613 includes a portable information processing apparatus such as, for example, a notebook type personal computer, a tablet terminal, a portable telephone set or a smartphone. The IoT device 1614 includes an arbitrary object that performs processing relating to an image such as, for example, a machine, consumer electronics, furniture, some other article, an IC tag or a card type device. All of the terminals mentioned have a communication function and can connect to (establish a session with) the cloud service 1601 to perform sending and reception of information to and from (namely, to perform communication with) the cloud service 1601. Further, each terminal can perform communication also with the other terminals. Communication between the terminals may be performed through the cloud service 1601 or may be performed without the intervention of the cloud service 1601.

The present technology may be applied to such a network system 1600 as described above such that, when data of an image (video) is to be transferred between the terminals or between the terminals and the cloud service 1601, the image data is encoded and decoded in such a manner as described hereinabove in connection the embodiments. In short, the terminals (computer 1611 to IoT device 1614) and the cloud service 1601 may individually have the functions of the image encoding apparatus 300 or the image decoding apparatus 100 described hereinabove. This makes it possible for the terminals (computer 1611 to IoT device 1614) that send and receive image data and the cloud service 1601 to achieve advantageous effects similar to those by the embodiments described hereinabove with reference to FIGS. 1 to 40.

<Others>

It is to be noted that various kinds of information relating to encoded data (bit stream) may be multiplexed into and transmitted or recorded together with the encoded data or may be transmitted or recorded as separate data associated with the encoded data without being multiplexed with the encoded data. Here, the term "associate" signifies to make it possible, for example, when one data is to be processed, to utilize (link with) the other data. In short, data associated with each other may be united into one data or may remain individual data. For example, information associated with encoded data (image) may be transmitted on a transmission line separate from that for the encoded data (image). Further, for example, information associated with encoded data may be recorded on a recording medium different from that for the encoded data (image) (or into a recording area of the same recording medium). It is to be noted that this "association" may be not of entire data but of part of data. For example, an image and information corresponding to the image may be associated with each other in an arbitrary unit such as a plurality of frames, one frame or part in a frame.

Further, as described hereinabove, such terms in the present specification as "synthesize," "multiplex," "add," "unite," "include," "store," "put in," "plug in" and "insert" signify to combine multiple things to one such as, for example, to combine encoded data and metadata into one data and each signifies one method of the "association" described above.

Further, the embodiment of the present technology is not limited to the embodiments described hereinabove, and various alterations are possible without departing from the subject matter of the present disclosure.

For example, in the present specification, the term system signifies a set of plural components (apparatus, modules (parts) and so forth) and does not matter whether or not all components are placed in a same housing. Accordingly, both of a plurality of apparatus that are accommodated in separate housings and are connected to each other by a network and one apparatus in which a plurality of modules are accommodated in one housing are systems.

Further, for example, a constitution described as one apparatus (or one processing section) may be divided into and configured as a plurality of apparatus (or processing sections). Conversely, constitutions described as a plurality of apparatus (or processing sections) in the foregoing description may be collected such that they are configured as one apparatus (or one processing section). Further, a constitution other than those may naturally be added to the configuration of each apparatus (or each processing section). Furthermore, if a constitution or operation as an entire system is substantially same, then part of constitutions of a certain apparatus (or a certain processing section) may be included in constitutions of a different apparatus (or a difference processing section).

Further, for example, the present technology can assume a configuration for cloud computing in which one function is shared and processed in cooperation by a plurality of apparatus through a network.

Further, for example, the program described hereinabove can be executed by an arbitrary apparatus. In this case, it is sufficient if the apparatus is configured such that it has necessary functions (functional blocks and so forth) and can acquire necessary information.

Further, for example, the steps described in connection with the flow charts described hereinabove can be executed by one apparatus and further can be shared and executed by a plurality of apparatus. Furthermore, in the case where a plurality of processes are included in one step, the plurality of processes included in the one step can be executed by one apparatus and also can be shared and executed by a plurality of apparatus.

It is to be noted that the program to be executed by the computer may be of the type by which the processes at steps by which the program is described are executed in a time series in the order as described in the present specification or of the type by which the processes are executed in parallel or executed individually at necessary timings such as when the process is called. Furthermore, the processes at the steps by which the program is executed may be executed in parallel to processes of a different program or may be executed in combination with processes of a different apparatus.

It is to be noted that the plurality of present technologies described in the present specification can individually be carried out solely and independently of each other unless inconsistency occurs. Naturally, also it is possible to carry out an arbitrary plurality of present technologies in combination. For example, also it is possible to carry out the present technology described in the description of any embodiment in combination with the present technology described in the description of a different embodiment. Also it is possible to carry out an arbitrary one of the present technologies described hereinabove in combination with a different technology that is not described hereinabove.

It is to be noted that the present technology can assume also such a configuration as described below.

(1)

An image processing apparatus, including:

a decoding section configured to decode encoded data;

an inverse primary vertical transform controlling section configured to control, based on a value of a transform skip identifier obtained by the decoding of the encoded data by the decoding section, execution of an inverse primary vertical transform that is an inverse primary transform in a vertical direction for transform coefficient data transformed from image data; and an inverse primary horizontal transform controlling section configured to control, based on the value of the transform skip identifier, execution of an inverse primary horizontal transform that is an inverse primary transform in a horizontal direction for the coefficient data transformed from the image data.

(2)

The image processing apparatus according to (1), in which the inverse primary vertical transform controlling section controls the execution of the inverse primary vertical transform such that, where the transform skip identifier indicates that a one-dimensional transform in the vertical direction is not to be skipped, the inverse primary vertical transform for the transform coefficient data is executed, but where the transform skip identifier indicates that a one-dimensional transform in the vertical direction is to be skipped, the inverse primary vertical transform for the transform coefficient data is omitted.

(3)

The image processing apparatus according to (1) or (2), in which the inverse primary horizontal transform controlling section controls the execution of the inverse primary horizontal transform such that, where the transform skip identifier indicates that a one-dimensional transform in the horizontal direction is not to be skipped, the inverse primary horizontal transform for the transform coefficient data is executed, but where the transform skip identifier indicates that a one-dimensional transform in the horizontal direction is to be skipped, the inverse primary horizontal transform for the transform coefficient data is omitted.

(4)

The image processing apparatus according to any one of (1) to (3), further including:
a selection section configured to select an orthogonal transform that is to be applied to the inverse primary vertical transform and the inverse primary horizontal transform.

(5)

The image processing apparatus according to (4), in which
the selection section
selects an orthogonal transform to be applied as the inverse primary vertical transform based on a vertical transform set identifier and a primary vertical transform designation flag obtained by the decoding of the encoded data by the decoding section, and
selects an orthogonal transform to be applied as the inverse primary horizontal transform based on a horizontal transform set identifier and a primary horizontal transform designation flag obtained by the decoding of the encoded data by the decoding section.

(6)

The image processing apparatus according to (5), in which
the decoding section derives the primary vertical transform designation flag and the primary horizontal transform designation flag from a primary transform identifier in response to the value of the transform skip identifier.

(7)

The image processing apparatus according to (6), in which
the decoding section
derives, where the transform skip identifier indicates that a two-dimensional transform is not to be skipped, the primary vertical transform designation flag and the primary horizontal transform designation flag by processing the primary transform identifier as a 2-bit bin string, and
derives, where the transform skip identifier indicates that a one-dimensional transform in the vertical direction or the horizontal direction is not to be skipped, the primary vertical transform designation flag and the primary horizontal transform designation flag by processing the primary transform identifier as a 1-bit bin string.

(8)

The image processing apparatus according to any one of (5) to (7), in which
the decoding section decodes the primary vertical transform designation flag and the primary horizontal transform designation flag included in the encoded data.

(9)

The image processing apparatus according to any one of (1) to (8), in which,
where the transform skip identifier indicates that a one-dimensional transform in the vertical direction or the horizontal direction or a two-dimensional transform is not to be skipped, the decoding section omits decoding of a secondary transform identifier and sets the secondary transform identifier to a value that indicates that a secondary transform is not to be performed.

(10)

An image processing method, including:
decoding encoded data;
controlling, based on a value of a transform skip identifier obtained by the decoding of the encoded data, execution of an inverse primary vertical transform that is an inverse primary transform in a vertical direction for transform coefficient data transformed from image data; and
controlling, based on the value of the transform skip identifier, execution of an inverse primary horizontal transform that is an inverse primary transform in a horizontal direction for the coefficient data transformed from the image data.

(11)

An image processing apparatus, including:
a primary horizontal transform controlling section configured to control execution of a primary horizontal transform that is a primary transform in a horizontal direction for residual data between an image and a prediction image based on a value of a transform skip identifier;
a primary vertical transform controlling section configured to control, based on a value of the transform skip identifier, execution of a primary vertical transform that is a primary transform in a vertical direction for the residual data between the image and the prediction image; and
an encoding section configured to encode the transform skip identifier.

(12)

The image processing apparatus according to (11), in which
the primary horizontal transform controlling section controls the execution of the primary horizontal transform such that,
where the transform skip identifier indicates that a one-dimensional transform in the horizontal direction is not to be skipped, the primary horizontal transform for the residual data is executed, but
where the transform skip identifier indicates that a one-dimensional transform in the horizontal direction is to be skipped, the primary horizontal transform for the residual data is omitted.

(13)

The image processing apparatus according to (11) or (12), in which
the primary vertical transform controlling section controls the execution of the primary horizontal transform such that,
where the transform skip identifier indicates that a one-dimensional transform in the vertical direction is not to be skipped, the primary vertical transform for the residual data is executed, but
where the transform skip identifier indicates that a one-dimensional transform in the vertical direction is to be skipped, the primary vertical transform for the residual data is omitted.

(14)

The image processing apparatus according to any one of (11) to (13), further including:
a selection section configured to select an orthogonal transform that is to be applied to the primary horizontal transform and the inverse primary vertical transform.

(15)

The image processing apparatus according to (14), in which
the selection section
selects an orthogonal transform to be applied as the primary horizontal transform based on a horizontal transform set identifier and a primary horizontal transform designation flag, and
selects an orthogonal transform to be applied as the primary vertical transform based on a vertical transform set identifier and a primary vertical transform designation flag.

(16)

The image processing apparatus according to (15), in which the encoding section derives a primary transform identifier from the primary horizontal transform designation flag and the primary vertical transform designation flag in response to the value of the transform skip identifier.

(17)

The image processing apparatus according to (16), in which the encoding section derives, where the transform skip identifier indicates that a two-dimensional transform is not to be skipped, the primary transform identifier of a 2-bit bin string using the primary horizontal transform designation flag and the primary vertical transform designation flag, and derives, where the transform skip identifier indicates that a one-dimensional transform in the vertical direction or the horizontal direction is not to be skipped, the primary transform identifier of a 1-bit bin string using the primary horizontal transform designation flag or the primary vertical transform designation flag.

(18)

The image processing apparatus according to any one of (15) to (17), in which the encoding section encodes the primary horizontal transform designation flag and the primary vertical transform designation flag.

(19)

The image processing apparatus according to any one of (11) to (18), in which, where the transform skip identifier indicates that a one-dimensional transform in the vertical direction or the horizontal direction or a two-dimensional transform is not to be skipped, the encoding section omits encoding of a secondary transform identifier.

(20)

An image processing method, including:

controlling execution of a primary horizontal transform that is a primary transform in a horizontal direction for residual data between an image and a prediction image based on a value of a transform skip identifier;

controlling, based on a value of the transform skip identifier, execution of a primary vertical transform that is a primary transform in a vertical direction for the residual data between the image and the prediction image; and encoding the transform skip identifier.

REFERENCE SIGNS LIST

100 Image decoding apparatus, 111 Decoding section, 112 Dequantization section, 113 Inverse transform section, 114 Arithmetic operation section, 115 Frame memory, 116 Prediction section, 121 Switch, 122 Inverse secondary transform section, 123 Inverse primary transform section, 131 Inverse primary transform selection section, 132 Switch, 133 Inverse primary vertical transform section, 134 Switch, 135 Inverse primary horizontal transform section, 151 Transform skip validity flag decoding section, 152 Maximum transform skip block size decoding section, 153 Transform quantization bypass flag decoding section, 154 Transform skip identifier decoding section, 161 Primary transform validity flag decoding section, 162 Adaptive primary transform flag decoding section, 163 Primary transform identifier decoding section, 171 Secondary transform validity flag decoding section, 172 Secondary transform identifier decoding section, 181 Primary horizontal transform designation flag decoding section, 182 Primary vertical transform designation flag decoding section, 191 and 192 Scaling section, 300 Image encoding apparatus, 311 Control section, 312 Arithmetic operation section, 313 Transform section, 314 Quantization section, 315 Encoding section, 316 Dequantization section, 317 Inverse transform section, 318 Arithmetic operation section, 319 Frame memory, 320 Prediction section, 331 Switch, 332 primary transform section, 333 Secondary transform section, 341 Primary transform selection section, 342 Switch, 343 Primary horizontal transform section, 344 Switch, 345 Primary vertical transform section, 361 Transform skip validity flag encoding section, 362 Maximum transform skip block size encoding section, 363 Transform quantization bypass flag encoding section, 364 Transform skip identifier encoding section, 371 Primary transform validity flag encoding section, 372 Adaptive primary transform flag encoding section, 373 Primary transform identifier encoding section, 381 Secondary transform validity flag encoding section, 382 Secondary transform identifier encoding section, 391 Primary horizontal transform designation flag encoding section, 392 Primary vertical transform designation flag encoding section, 401 and 402 Scaling section

The invention claimed is:

1. An image processing apparatus, comprising:

a decoding section configured to decode encoded data;

an inverse primary vertical transform controlling section configured to control, based on a value of a transform skip identifier obtained by the decoding of the encoded data by the decoding section, execution of an inverse primary vertical transform that is an inverse primary transform in a vertical direction for transform coefficient data transformed from image data; and an inverse primary horizontal transform controlling section configured to control, based on the value of the transform skip identifier, execution of an inverse primary horizontal transform that is an inverse primary transform in a horizontal direction for the transform coefficient data transformed from the image data, wherein the decoding section determines, based on the transform skip identifier indicating that a one-dimensional transform in the vertical direction or the horizontal direction or a two-dimensional transform is not to be skipped, whether or not to decode a secondary transform identifier indicating an inverse secondary transform different than the inverse primary transform, and wherein the decoding section, the inverse primary vertical transform controlling section, and the inverse primary horizontal transform controlling section are each implemented via at least one processor.

2. The image processing apparatus according to claim 1, wherein the inverse primary vertical transform controlling section controls the execution of the inverse primary vertical transform such that, where the transform skip identifier indicates that the one-dimensional transform in the vertical direction is not to be skipped, the inverse primary vertical transform for the transform coefficient data is executed, and where the transform skip identifier indicates that the one-dimensional transform in the vertical direction is to be skipped, the inverse primary vertical transform for the transform coefficient data is omitted.

3. The image processing apparatus according to claim 1, wherein the inverse primary horizontal transform controlling section controls the execution of the inverse primary horizontal transform such that,
  where the transform skip identifier indicates that the one-dimensional transform in the horizontal direction is not to be skipped, the inverse primary horizontal transform for the transform coefficient data is executed, and
  where the transform skip identifier indicates that the one-dimensional transform in the horizontal direction is to be skipped, the inverse primary horizontal transform for the transform coefficient data is omitted.

4. The image processing apparatus according to claim 1, further comprising:
  a selection section configured to select an orthogonal transform that is to be applied to the inverse primary vertical transform and the inverse primary horizontal transform,
  wherein the selection section is implemented via at least one processor.

5. The image processing apparatus according to claim 4, wherein the selection section
  selects an orthogonal transform to be applied as the inverse primary vertical transform based on a vertical transform set identifier and a primary vertical transform designation flag obtained by the decoding of the encoded data by the decoding section, and
  selects an orthogonal transform to be applied as the inverse primary horizontal transform based on a horizontal transform set identifier and a primary horizontal transform designation flag obtained by the decoding of the encoded data by the decoding section.

6. The image processing apparatus according to claim 5, wherein
  the decoding section derives the primary vertical transform designation flag and the primary horizontal transform designation flag from a primary transform identifier in response to the value of the transform skip identifier.

7. The image processing apparatus according to claim 6, wherein
  the decoding section
    derives, where the transform skip identifier indicates that the two-dimensional transform is not to be skipped, the primary vertical transform designation flag and the primary horizontal transform designation flag by processing the primary transform identifier as a 2-bit bin string, and
    derives, where the transform skip identifier indicates that the one-dimensional transform in the vertical direction or the horizontal direction is not to be skipped, the primary vertical transform designation flag and the primary horizontal transform designation flag by processing the primary transform identifier as a 1-bit bin string.

8. The image processing apparatus according to claim 5, wherein
  the decoding section decodes the primary vertical transform designation flag and the primary horizontal transform designation flag included in the encoded data.

9. The image processing apparatus according to claim 1, wherein,
  where the transform skip identifier indicates that the one-dimensional transform in the vertical direction or the horizontal direction or the two-dimensional transform is not to be skipped, the decoding section omits decoding of the secondary transform identifier and sets the secondary transform identifier to a value that indicates that the secondary transform is not to be performed.

10. An image processing method, comprising:
  decoding encoded data;
  controlling, based on a value of a transform skip identifier obtained by the decoding of the encoded data, execution of an inverse primary vertical transform that is an inverse primary transform in a vertical direction for transform coefficient data transformed from image data;
  controlling, based on the value of the transform skip identifier, execution of an inverse primary horizontal transform that is an inverse primary transform in a horizontal direction for the transform coefficient data transformed from the image data; and
  determining, based on the transform skip identifier indicating that a one-dimensional transform in the vertical direction or the horizontal direction or a two-dimensional transform is not to be skipped, whether or not to decode a secondary transform identifier indicating an inverse secondary transform different than the inverse primary transform and whether to set the secondary transform identifier to a value that indicates that the inverse secondary transform is not to be performed.

11. An image processing apparatus, comprising:
  a primary horizontal transform controlling section configured to control execution of a primary horizontal transform that is a primary transform in a horizontal direction for residual data between an image and a prediction image based on a value of a transform skip identifier;
  a primary vertical transform controlling section configured to control, based on a value of the transform skip identifier, execution of a primary vertical transform that is a primary transform in a vertical direction for the residual data between the image and the prediction image; and
  an encoding section configured to encode the transform skip identifier,
  wherein the encoding section determines, based on the transform skip identifier indicating that a one-dimensional transform in the vertical direction or the horizontal direction or a two-dimensional transform is not to be skipped, whether or not to encode a secondary transform identifier indicating a secondary transform different than the primary transform, and
  wherein the primary horizontal transform controlling section, the primary vertical transform controlling section, and the encoding section are each implemented via at least one processor.

12. The image processing apparatus according to claim 11, wherein
  the primary horizontal transform controlling section controls the execution of the primary horizontal transform such that,
    where the transform skip identifier indicates that the one-dimensional transform in the horizontal direction is not to be skipped, the primary horizontal transform for the residual data is executed, and
    where the transform skip identifier indicates that the one-dimensional transform in the horizontal direction is to be skipped, the primary horizontal transform for the residual data is omitted.

13. The image processing apparatus according to claim 11, wherein the primary vertical transform controlling section controls the execution of the primary horizontal transform such that, where the transform skip identifier indicates that the one-dimensional transform in the vertical direction is not to be skipped, the primary vertical transform for the residual data is executed, and where the transform skip identifier indicates that the one-dimensional transform in the vertical direction is to be skipped, the primary vertical transform for the residual data is omitted.

14. The image processing apparatus according to claim 11, further comprising:

a selection section configured to select an orthogonal transform that is to be applied to the primary horizontal transform and the primary vertical transform, wherein the selection section is implemented via at least one processor.

15. The image processing apparatus according to claim 14, wherein the selection section selects an orthogonal transform to be applied as the primary horizontal transform based on a horizontal transform set identifier and a primary horizontal transform designation flag, and selects an orthogonal transform to be applied as the primary vertical transform based on a vertical transform set identifier and a primary vertical transform designation flag.

16. The image processing apparatus according to claim 15, wherein the encoding section derives a primary transform identifier from the primary horizontal transform designation flag and the primary vertical transform designation flag in response to the value of the transform skip identifier.

17. The image processing apparatus according to claim 16, wherein the encoding section derives, where the transform skip identifier indicates that the two-dimensional transform is not to be skipped, the primary transform identifier of a 2-bit bin string using the primary horizontal transform designation flag and the primary vertical transform designation flag, and derives, where the transform skip identifier indicates that the one-dimensional transform in the vertical direction or the horizontal direction is not to be skipped, the primary transform identifier of a 1-bit bin string using the primary horizontal transform designation flag or the primary vertical transform designation flag.

18. The image processing apparatus according to claim 15, wherein the encoding section encodes the primary horizontal transform designation flag and the primary vertical transform designation flag.

19. The image processing apparatus according to claim 11, wherein, where the transform skip identifier indicates that the one-dimensional transform in the vertical direction or the horizontal direction or the two-dimensional transform is not to be skipped, the encoding section omits encoding of the secondary transform identifier.

20. An image processing method, comprising:

controlling execution of a primary horizontal transform that is a primary transform in a horizontal direction for residual data between an image and a prediction image based on a value of a transform skip identifier;

controlling, based on a value of the transform skip identifier, execution of a primary vertical transform that is a primary transform in a vertical direction for the residual data between the image and the prediction image;

encoding the transform skip identifier; and determining, based on the transform skip identifier indicating that a one-dimensional transform in the vertical direction or the horizontal direction or a two-dimensional transform is not to be skipped, whether or not to encode a secondary transform identifier indicating a secondary transform different than the primary transform.

* * * * *